(12) United States Patent
Mizutani et al.

(10) Patent No.: US 7,835,914 B2
(45) Date of Patent: *Nov. 16, 2010

(54) DIALOG SUPPORTING APPARATUS

(75) Inventors: Kenji Mizutani, Nara (JP); Yoshiyuki Okimoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 133 days.

This patent is subject to a terminal disclaimer.

(21) Appl. No.: 11/987,245

(22) Filed: Nov. 28, 2007

(65) Prior Publication Data

US 2008/0215338 A1    Sep. 4, 2008

Related U.S. Application Data

(60) Division of application No. 11/353,199, filed on Feb. 14, 2006, now Pat. No. 7,346,515, which is a continuation of application No. PCT/JP2005/018426, filed on Oct. 5, 2005.

(30) Foreign Application Priority Data

Oct. 8, 2004    (JP) .............................. 2004-296776

(51) Int. Cl.
G06F 17/20 (2006.01)
G06F 17/28 (2006.01)
G06F 17/27 (2006.01)
G10L 11/00 (2006.01)

(52) U.S. Cl. .............................. 704/277; 704/1; 704/2; 704/3; 704/4; 704/9; 704/275

(58) Field of Classification Search ................. 704/1–4, 704/7, 9, 275, 277
See application file for complete search history.

(56) References Cited

U.S. PATENT DOCUMENTS 5,216,603 A * 6/1993 Flores et al. ................... 704/1
5,682,539 A * 10/1997 Conrad et al. .................. 704/9
5,748,841 A    5/1998 Morin et al.
5,812,126 A * 9/1998 Richardson et al. ......... 715/741

(Continued)

FOREIGN PATENT DOCUMENTS

JP    2003-030187    1/2003

(Continued)

OTHER PUBLICATIONS

Reithinger et al. "Predicting Dialogue Acts for a Speech-to-Speech Translation System". In Proceedings of ICSLP 96, Philadelphia, pp. 654-657.*

(Continued)

*Primary Examiner*—James S Wozniak
*Assistant Examiner*—Paras Shah
(74) *Attorney, Agent, or Firm*—Wenderoth, Lind & Ponack, L.L.P.

(57) ABSTRACT

A dialog supporting apparatus which can support an on-going dialog so that the dialog is smoothly completed. The dialog supporting apparatus includes an utterance receiving unit receiving an utterance of a dialog participant and outputting utterance information, an utterance processing unit translating the utterance identified by the utterance information, an utterance output unit outputting the translated utterance information, a dialog history database, an utterance prediction generating a first utterance prediction information based on the first utterance prediction information and the second utterance prediction information.

16 Claims, 47 Drawing Sheets

U.S. PATENT DOCUMENTS

| | | | |
|---|---|---|---|
| 5,854,997 A * | 12/1998 | Sukeda et al. ................ 704/3 |
| 6,233,561 B1 | 5/2001 | Junqua et al. |
| 6,321,188 B1 * | 11/2001 | Hayashi et al. ............... 704/4 |
| 6,505,162 B1 | 1/2003 | Wang et al. |
| 6,622,119 B1 * | 9/2003 | Ramaswamy et al. .......... 704/9 |
| 6,792,406 B1 * | 9/2004 | Fujimura et al. ............ 704/257 |
| 6,917,920 B1 * | 7/2005 | Koizumi et al. ............ 704/277 |
| 7,050,979 B2 | 5/2006 | Mizutani et al. |
| 7,162,412 B2 | 1/2007 | Yamada et al. |
| 7,251,595 B2 * | 7/2007 | Yasuda et al. ................ 704/9 |
| 7,346,515 B2 * | 3/2008 | Mizutani et al. ............ 704/277 |
| 7,505,893 B2 * | 3/2009 | Mizutani et al. ............... 704/2 |
| 2002/0120436 A1 | 8/2002 | Mizutani et al. |
| 2004/0172236 A1 * | 9/2004 | Fraser ........................ 704/4 |

FOREIGN PATENT DOCUMENTS

JP  2003-288339  10/2003

OTHER PUBLICATIONS

Reithinger et al. "Predicting Dialogue Acts for a Speech-to-Speech Translation System," in Proceedings of ICSLP 96, Philadelphia, pp. 654-657, 1996.

Alexandersson et al. "A Robust and Efficient Three-layered Dialogue Component for a Speech-to-Speech Translation System," in Proceedings of the 7$^{th}$ Conference of the European Chapter of the ACL (EACL-95), Dublin, Ireland, 1995, pp. 188-193.

Waibel, "Interactive Translation of Conversational Speech," Computer, vol. 29, No. 7, Jul. 1996, pp. 41-48.

Bub et al., "VERBMOBIL: The Evolution of a Complex Large Speech-to-Speech Translation System," Spoken Language, 1996. ICSLP 96, Proceedings, Fourth International Conference on, vol. 4, Oct. 3-6, 1996, pp. 2371-2374.

Wahlster. "Mobile Speech-to-Speech Translation of Spontaneous Dialogs: An Overview of the Final Verbmobil System," in "Verbmobil: Foundations of Speech-to-Speech Translation," ed. W. Wahlster, Springer., 2000, pp. 3-21.

International Search Report, issued Nov. 8, 2005, in PCT/JP2005/018426, of which U.S. Appl. No. 11/353,199 is a continuation application.

International Preliminary Report on Patentability (English translation), issued Apr. 11, 2007, in PCT/JP2005/018426, of which U.S. Appl. No. 11/353,199 is a continuation application.

Written Opinion of the International Searching Authority (English translation), in PCT/JP2005/018426, of which U.S. Appl. No. 11/353,199 is a continuation application, Issued Apr. 19, 2007.

\* cited by examiner

FIG. 3

| Utterance No. | Input | Output |
|---|---|---|
| 1 | いらっしゃいませ。 | May I help you? |
| 2 | チェックインをお願いします。 | Check-in, please. |
| 3 | 予約はされていますか? | Have you made reservation? |
| 4 | はい。 | Yes. |
| 5 | 喫煙の部屋でよろしいでしょうか。 | Do you prefer smoking room? |
| 6 | 禁煙でおねがいします。 | Non-smoking room, please. |
| 7 | かしこまりました。 | Certainly. |
| 8 | このカードに記入してください。 | Please fill in the form. |
| 9 | いいえ。 | No. |
| 10 | ありがとうございます。 | Thank you. |
| 11 | パスポートを見せて下さい。 | Please show me your passport. |
| 12 | クレジットカードを確認させてください。 | Please let me confirm your credit card. |
| 13 | クレジットカードで支払えますか。 | May I pay by credit card? |
| 14 | タクシーを呼んでください。 | Please call me taxi. |
| 15 | ホテルの電話番号を教えてください。 | Please tell me telephone number of this hotel. |
| 16 | 部屋でインターネットは使えますか? | Can I use internet in my room? |
| 17 | 朝食は何時からですか? | What time can I have breakfast? |
| 18 | 8時です。 | Eight o'clock. |
| 19 | 電話番号は222-2222です。 | The telephone number is 222-2222. |
| 20 | いってらっしゃいませ。 | Have a nice day. |
| ... | ... | ... |

FIG. 4

| Utterance No. | Input | Output |
|---|---|---|
| 1 | May I help you? | いらっしゃいませ。 |
| 2 | Check-in, please. | チェックインをお願いします。 |
| 3 | Have you made reservation? | 予約はされていますか。 |
| 4 | Yes. | はい。 |
| 5 | Do you prefer smoking room? | 喫煙の部屋でよろしいでしょうか。 |
| 6 | Non-smoking room, please. | 禁煙でおねがいします。 |
| 7 | Certainly. | かしこまりました。 |
| 8 | Please fill in the form. | このカードに記入して下さい。 |
| 9 | No. | いいえ。 |
| 10 | Thank you. | ありがとうございます。 |
| 11 | Please show me your passport. | パスポートを見せて下さい。 |
| 12 | Please let me confirm your credit card. | クレジットカードを確認させて下さい。 |
| 13 | May I pay by credit card? | クレジットカードで支払えますか。 |
| 14 | Please call me taxi. | タクシーを呼んで下さい。 |
| 15 | Please tell me telephone number of this hotel. | ホテルの電話番号を教えて下さい。 |
| 16 | Can I use Internet in my room? | 部屋でインターネットは使えますか? |
| 17 | What time can I have breakfast? | 朝食は何時からですか? |
| 18 | Eight o'clock. | 8時です。 |
| 19 | The telephone number is 222-2222. | 電話番号は222-2222です。 |
| 20 | Have a nice day. | いってらっしゃいませ。 |
| ... | ... | ... |

FIG. 5A

```
Dialog history database of dialog participant 1

Dialog history d1    J@(チェックイン,Check-in)

E1: May I help you?
    J2: チェックインをお願いします。
    E3: Have you made reservation?
    J4: はい。
    E5: Do you prefer smoking room?
    J6: 禁煙でお願いします。
    E7: Certainly.
    E8: Please fill in the form.

Dialog history d2    J@(貸出し,Rental)

E1: May I help you?
    E11: Please show me your passport.
    J4: はい。
    E12: Please let me confirm your credit card.
    J4: はい。
    E10: Thank you.
    E20: Have a nice day.
```

FIG. 5B

```
Dialog history database of dialog participant 2

Dialog history d3    E@(チェックイン,Check-in)

E1: May I help you?
    E3: Have you made reservation?
    J4: はい。
    J2: チェックインをお願いします。
    E8: Please fill in the form.
    E5: Do you prefer smoking room?
    J6: 禁煙でお願いします。
    E7: Certainly.

Dialog history d4    E@(サービス,Service)

E1: May I help you?
    J15: ホテルの電話番号を教えて下さい。
    E19: 電話番号は222-2222です。
    J10: ありがとうございます。
    E20: Have a nice day.
```

FIG. 10

1. Initialization step

The number of utterances m included in dialog 1
The number of utterances n included in dialog 2
Generate array of a[0~m][0~n], and set initial value
a[i][0]=i (i=0~m)
a[0][j]=j (j=0~n)

2. Calculation step for i=1 to m
  for j=1 to n
  Calculate a[i][j] using following three expressions, and select and record resulting smallest value 1. a[i-1][j-1]+(ith utterance of dialog 1 and jth utterance of dialog 2 are Same→0, Different→1)
  2. a[i-1][j]+1
  3. a[i][j-1]+1 next j
next i

3. Result obtainment step

Output selection of a[0][0] to a[m][n], and assign φ to nonmatching utterance

Dialog history x

E1: May I help you?
E8: Please fill in this form.
E3: Have you made reservation?
J4: はい。
E5: Do you prefer smoking room?
J6: 禁煙でお願いします。

Dialog history x'

E1: May I help you?
E8: Please fill in this form.
E3: Have you made reservation?
J4: はい。
E5: Do you prefer smoking room?
J6: 禁煙でお願いします。
φ :
φ :

FIG. 20

```
Newly generated dialog d':E1,E3,J4,J2,E5,J6,E7,E8
-----------------------------------------------
 E1: May I help you?
 E3: Have you made reservation?
 J4: はい。
 J2: チェックインをお願いします。
 E5: Do you prefer smoking room?
 J6: 禁煙でお願いします。
 E7: Certainly.
 E8: Please fill in the form.
```

FIG. 21A

Similarity degree of dialog history da to dialog history db $$r(d_a, d_b) = \frac{1}{size(d_a)^2} \sqrt{\sum_{b \in d_a} size(b)^2}$$

FIG. 21B

Example of calculation for similarity degree

Dialog history da:
- b1: Utterance u1, Utterance u2, Utterance u3, Utterance u4, Utterance u5
- b2: Utterance u6, Utterance u7
- b3: Utterance u8, Utterance u9, Utterance u10, Utterance u11
- b4: Utterance u12

Dialog history db:
- Utterance u6, Utterance u7
- Utterance u1, Utterance u2, Utterance u3, Utterance u4, Utterance u5
- Utterance u8, Utterance u9, Utterance u10, Utterance u11
- Utterance u13

$$r(d_a \mid d_b) = \frac{1}{4^2} \sqrt{5^2 + 2^2 + 4^2 + 1^2} \approx 0.424$$

FIG. 24A

Newly generated dialog d": E1,E3,J4,J2,E5,J6,E7,E8

E1: May I help you?
E3: Have you made reservation?
J4: はい。
E5: Do you prefer smoking room?
J6: 禁煙でお願いします。
E7: Certainly.
J2: チェックインをお願いします。
E8: Please fill in the form.

FIG. 24B d1: E1,J2,(E3,J4,E5,J6,E7),E8
d": E1,(E3,J4,E5,J6,E7),J2,E8 r(d1 | d") = 0.33

Newly generated dialog d"

d3: (E1,E3,J4),(J2,E8),(E5,J6,E7)
d": (E1,E3,J4),(E5,J6,E7),(J2,E8)

r(d3 | d") = 0.52

Dialog history of J d1 r(d1 | d3) = 0.16

Dialog history of E d3

FIG. 25

| Utterance No. | Input | Output |
|---|---|---|
| 1 | 欢迎光临。 | May I help you? |
| 2 | 可以办退入住吗？ | Check-in, please. |
| 3 | 您预订过了吗？ | Have you made reservation? |
| 4 | 是。 | Yes. |
| 5 | 您吸烟吗？ | Do you prefer smoking room? |
| 6 | 我想要禁烟的房间。 | Non-smoking room, please. |
| 7 | 知道了。 | Certainly. |
| 8 | 请填写在这张单子上。 | Please fill in the form. |
| 9 | 不。 | No. |
| 10 | 多谢。 | Thank you. |
| 11 | 请出示护照。 | Please show me your passport. |
| 12 | 我来确认一下信用卡。 | Please let me confirm your credit card. |
| 13 | 可以用信用卡支付吗？ | May I pay by credit card? |
| 14 | 能给叫辆出租车吗？ | Please call me taxi. |
| 15 | 请问饭店的电话号码是多少？ | Please tell me telephone number of this hotel. |
| 16 | 房间内能上网吗？ | Can I use internet in my room? |
| 17 | 什么时候早餐？ | What time can I have breakfast? |
| 18 | 8点。 | Eight o'clock. |
| 19 | 电话号码是 222-2222。 | The telephone number is 222-2222. |
| 20 | 祝你一天过得愉快。 | Have a nice day. |
| ... | ... | ... |

FIG. 26

| Utterance No. | Input | Output |
|---|---|---|
| 1 | May I help you? | 欢迎光临。 |
| 2 | Check-in, please. | 可以办理入住吗? |
| 3 | Have you made reservation? | 您预订过了吗? |
| 4 | Yes. | 是。 |
| 5 | Do you prefer smoking room? | 您吸烟吗? |
| 6 | Non-smoking room, please. | 我想要禁烟的房间。 |
| 7 | Certainly. | 知道了。 |
| 8 | Please fill in the form. | 请写在这张单子上。 |
| 9 | No. | 不。 |
| 10 | Thank you. | 多谢。 |
| 11 | Please show me your passport. | 请出示护照。 |
| 12 | Please let me confirm your credit card. | 我来确认一下信用卡。 |
| 13 | May I pay by credit card? | 可以有信用卡支付吗? |
| 14 | Please call me taxi. | 能给叫辆出租车吗? |
| 15 | Please tell me telephone number of this hotel. | 请问饭店的电话号码是多少? |
| 16 | Can I use Internet in my room? | 房间内能上网吗? |
| 17 | What time can I have breakfast? | 什么时候早餐? |
| 18 | Eight o'clock. | 8点。 |
| 19 | The telephone number is 222-2222. | 电话号码是222-2222。 |
| 20 | Have a nice day. | 祝你一天过得愉快。 |
| ... | ... | ... |

FIG. 27A

Dialog history database of dialog participant 1

Dialog history d5 — C@(登记, Check-in)

E1: May I help you?
C2: 可以办理入住吗？
E3: Have you made reservation?
C4: 是。
E5: Do you prefer smoking room?
C6: 我想要禁烟的房间。
E7: Certainly.
E8: Please fill in the form.

Dialog history d6 — C@(出租, Rental)

E1: May I help you?
E11: Please show me your passport.
C4: 是。
E12: Please let me confirm your credit card.
C4: 是。
E10: Thank you.
E20: Have a nice day.

FIG. 27B

Dialog history database of dialog participant 2

Dialog history d7 — E@(登记, Check-in)

E1: May I help you?
E3: Have you made reservation?
C4: 是。
C2: 可以办理入住吗？
E8: Please fill in the form.
E5: Do you prefer smoking room?
C6: 我想要禁烟的房间。
E7: Certainly.

Dialog history d8 — E@(招待, Service)

E1: May I help you?
C15: 请问饭店的电话号码是多少？
E19: 电话号码是222-2222。
C10: 多谢。
E20: Have a nice day.

FIG. 37

| Newly generated dialog d':E1,E3,C4,C2,E5,C6,E7,E8 |
| --- |
| E1: May I help you? |
| E3: Have you made reservation? |
| J4: 是。 |
| J2: 可以办理入住吗？ |
| E5: Do you prefer smoking room? |
| J6: 我想要禁烟的房间。 |
| E7: Certainly. |
| E8: Please fill in the form. |

DIALOG SUPPORTING APPARATUS

CROSS REFERENCES TO RELATED APPLICATIONS

This is a divisional application of U.S. application Ser. No. 11/353,199, filed Feb. 14, 2006, now U.S. Pat. No. 7,346,515, which is a continuation application of PCT application No. PCT/JP2005/018426, filed Oct. 5, 2005, designating the United States of America.

BACKGROUND OF THE INVENTION (1) Field of the Invention

The present invention relates to a dialog supporting apparatus which supports an on-going dialog between people.

(2) Description of the Related Art

Conventionally, a translation device has been developed with a purpose of supporting an on-going dialog in different languages, respectively, spoken by travelers and local people at travel destinations abroad or the like. A representative example is a translation apparatus which is obtained by providing a translation scheme based on text and translation of example sentences and example usages, on a small information processing apparatus such as a PDA (Personal Digital Assistant). Such an apparatus is provided with thousands of example usages in order to cover general travel conversation, and requires a user to select a desired example usage by viewing the list of example usages. Hence, the apparatus has a usability problem when it comes to actual use. Especially in the case where the apparatus has a small display for displaying a list of example usages and thus the number of example usages which can be viewed at one time is small, this problem is more noticeable. In addition, assuming a general use status of a translation apparatus, example usages corresponding to several sentences must be used in the dialog with the other party in a great many cases. Thus, it takes more time than expected to complete an on-going dialog by means of a translation apparatus. Therefore, in order to achieve a final purpose of supporting an on-going dialog made between people, there is a need to add a supplementary function for enabling a user to immediately select a desired example usage from among the list of large number of example usages.

As a method for solving this problem, there has been provided an approach for narrowing down candidate next utterances of a user using example dialog models or conversation training history corpuses (for example, refer to Japanese Laid-open Patent Application No. 2003-30187).

BRIEF SUMMARY OF THE INVENTION

Narrowing down candidate next utterances based on past dialog history of a user of the translation device is effective in the case where the utterances of the other party are included in the utterances. In addition, the narrowing down of candidate next utterances based on a virtual dialog which has been previously uttered in training or typical dialog patterns is effective in the case where the other party utters in compliance with the dialog pattern as expected by the user. However, it is common that dialog patterns vary among people. Here is an example case where a traveler starts a dialog with a waiter of a restaurant in order to reserve a table. In response to the traveler's utterance of "I'd like to reserve a table", a waiter may start the dialog with an utterance relating to the date and time of a reservation saying "What date and time would you like to reserve a table?" and another waiter may start the dialog with an utterance relating to the number of people saying "How many people are in your party?". Such being the case, there is a problem that the narrowing-down of the candidate utterances fails depending on the other party in an on-going dialog. An additional problem is that inappropriate narrowing-down confuses dialog participants, resulting in increasing the time to complete the dialog, contrary to the purpose. Especially, in the case of traveling in a region where no communication infrastructure is established, such a problem must be solved only using the translation apparatus of a user without using any network.

The present invention has been conceived in view of these circumstances. An object of the present invention is to provide a dialog supporting apparatus which can support an on-going dialog so that the dialog is smoothly completed irrespective of who the other party is, even in the case where no network is available.

In order to achieve the above-described object, the dialog supporting apparatus of the present invention supports an on-going dialog made by dialog participants. The dialog supporting apparatus includes: a dialog history database in which a dialog history of one of the dialog participants is stored; and an utterance prediction unit which generates a first utterance prediction information based on the dialog history stored in the dialog history database, obtains a second utterance prediction information from the other dialog supporting apparatus, and predicts the next utterance in the dialog of the dialog participant who uses the dialog supporting apparatus.

The dialog supporting apparatus of the present invention enables a user to easily select example usages from among the candidate next utterances of the user. Thus, it eliminates the necessity for the other party to wait, and therefore the dialog supported by the dialog supporting apparatus can be smoothly advanced. In addition, since a candidate next utterance is generated based on only the dialog histories of the user and the other party, there is no need to install information such as typical dialog patterns in the apparatus, and thus it becomes possible to reduce the implementation scale of the whole apparatus.

FURTHER INFORMATION ABOUT TECHNICAL BACKGROUND TO THIS APPLICATION

The disclosure of Japanese Patent Application No. 2004-296776 filed on Oct. 8, 2004 including specification, drawings and claims is incorporated herein by reference in its entirety.

The disclosure of PCT application No. PCT/JP2005/018426, filed Oct. 5, 2005, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing an example of the interrelationship among the utterance numbers, the input utterances and the output utterances in one of the dialog supporting apparatuses;

FIG. 4 is a diagram showing an example of the interrelationship among the utterance numbers, the input utterances and the output utterances in the other dialog supporting apparatus;

FIGS. 5A and 5B each is a diagram showing an example of a dialog history stored in a dialog history database;

FIG. 10 is a diagram showing an example of an algorithm for dynamic programming that adjusts the numbers of utterances in dialog histories;

FIG. 20 is a diagram showing a newly generated dialog d';

FIG. 21A is a diagram showing an equation defining the degree of similarity of a dialog history;

FIG. 21B is a diagram showing an example of calculating the degree of similarity;

FIG. 24A is a diagram showing the newly generated dialog d";

FIG. 24B is a diagram showing the degrees of similarity of dialog histories when compared with each other;

FIG. 25 is a diagram showing an example of the interrelationship among the utterance numbers, the input utterances and the output utterances in one of the dialog supporting apparatus;

FIG. 26 is a diagram showing an example of the interrelationship among the utterance numbers, the input utterances and the output utterances in the other dialog supporting apparatus;

FIGS. 27A and 27B are each a diagram showing an example of a dialog history stored in the dialog history database;

FIG. 37 is a diagram showing a newly generated dialog f;

DETAILED DESCRIPTION OF THE INVENTION

The dialog supporting apparatus of the embodiment of the present invention supports an on-going dialog made by dialog participants. The dialog supporting apparatus includes: a dialog history database in which a dialog history of one of the dialog participants is stored; and an utterance prediction unit which (a) generates a first utterance prediction information based on the dialog history stored in the dialog history database, (b) obtains a second utterance prediction information from the other dialog supporting apparatus, and (c) predicts the next utterance in the dialog of the dialog participant who uses the dialog supporting apparatus.

This makes it possible to predict the next utterance, based on only the dialog histories of the user and the other party. Therefore, the dialog supporting apparatus can support an on-going dialog so that the dialog is smoothly completed irrespective of the other party in the dialog.

Here, it is preferable that the utterance prediction unit extracts the dialog history whose situation is most similar to the dialog history of the dialog from among the dialog histories stored in the dialog history database, and the extracted dialog history is the first utterance prediction information.

In addition, in one aspect of the present invention, it is preferable that the utterance prediction unit of the dialog supporting apparatus generates a prediction stack based on an assembly which corresponds to successive utterances and is commonly included in the dialog histories, respectively, included in the first utterance prediction information and the second utterance prediction information.

This makes it possible to predict the next utterance of one of the dialog participants, based on the dialog history whose dialog situation is most similar.

In another aspect of the present invention, the dialog supporting apparatus may further include: an utterance receiving unit which receives an utterance of one of the dialog participants; an utterance processing unit which transforms the utterance received by the utterance receiving unit into an other utterance form; and an utterance output unit which outputs the utterance of the other utterance form transformed by the utterance processing unit.

This makes it possible to support an on-going dialog where different languages such as Japanese and English are used.

Note that the present invention can be realized not only as a dialog supporting apparatus, but also as a dialog supporting method having steps corresponding to the unique units which are provided to the dialog supporting apparatus, and as a program causing a computer to execute these steps. Of course, the program can be distributed through a recording medium such as a CD-ROM and a communication medium such as the Internet.

The embodiment of the present invention will be described with reference to figures.

Figure 1:
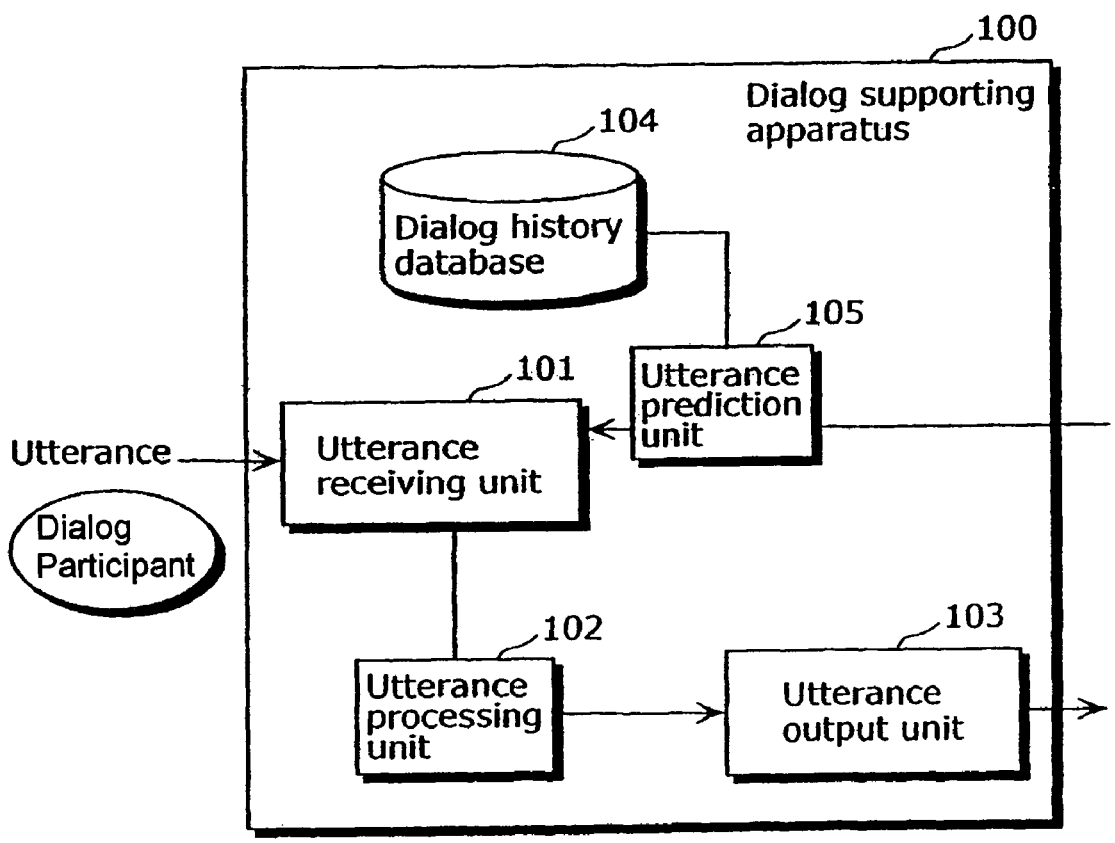
FIG. 1 is a block diagram showing the configuration of an embodiment of the dialog supporting system of the present invention.

FIG. 1 is a block diagram showing the configuration of an embodiment of the dialog supporting system of the present invention.

The dialog supporting apparatus 100 is intended for supporting an on-going dialog made between people. As shown in FIG. 1, the dialog supporting apparatus 100 includes: an utterance receiving unit 101; an utterance processing unit 102; an utterance output unit 103; a dialog history database 104; and an utterance prediction unit 105.

The utterance receiving unit 101 receives an utterance of a dialog participant, and outputs the utterance information for identifying the utterance. The utterance processing unit 102 transforms the utterance identified by the utterance information outputted by the utterance receiving unit 101 into an other utterance form. The utterance output unit 103 outputs the utterance information transformed into the other utterance form as the utterance to the other dialog participant. The dialog history database 104 stores a dialog history where two or more pieces of past utterance information of the dialog participants are placed in time sequence.

The utterance prediction unit 105 generates a first utterance prediction information, based on the dialog history stored in the dialog history database 104. In addition, the utterance prediction unit 105 obtains a second utterance prediction information from the other dialog supporting apparatus. Further, the utterance prediction unit 105 predicts the next utterance of the dialog participant who uses a dialog supporting apparatus 100, based on the first utterance prediction information and the second utterance prediction information, in a dialog that the dialog participants will start to make. In addition, the utterance prediction unit 105 notifies the generated first utterance prediction information to the other dialog supporting apparatus.

Figure 2:
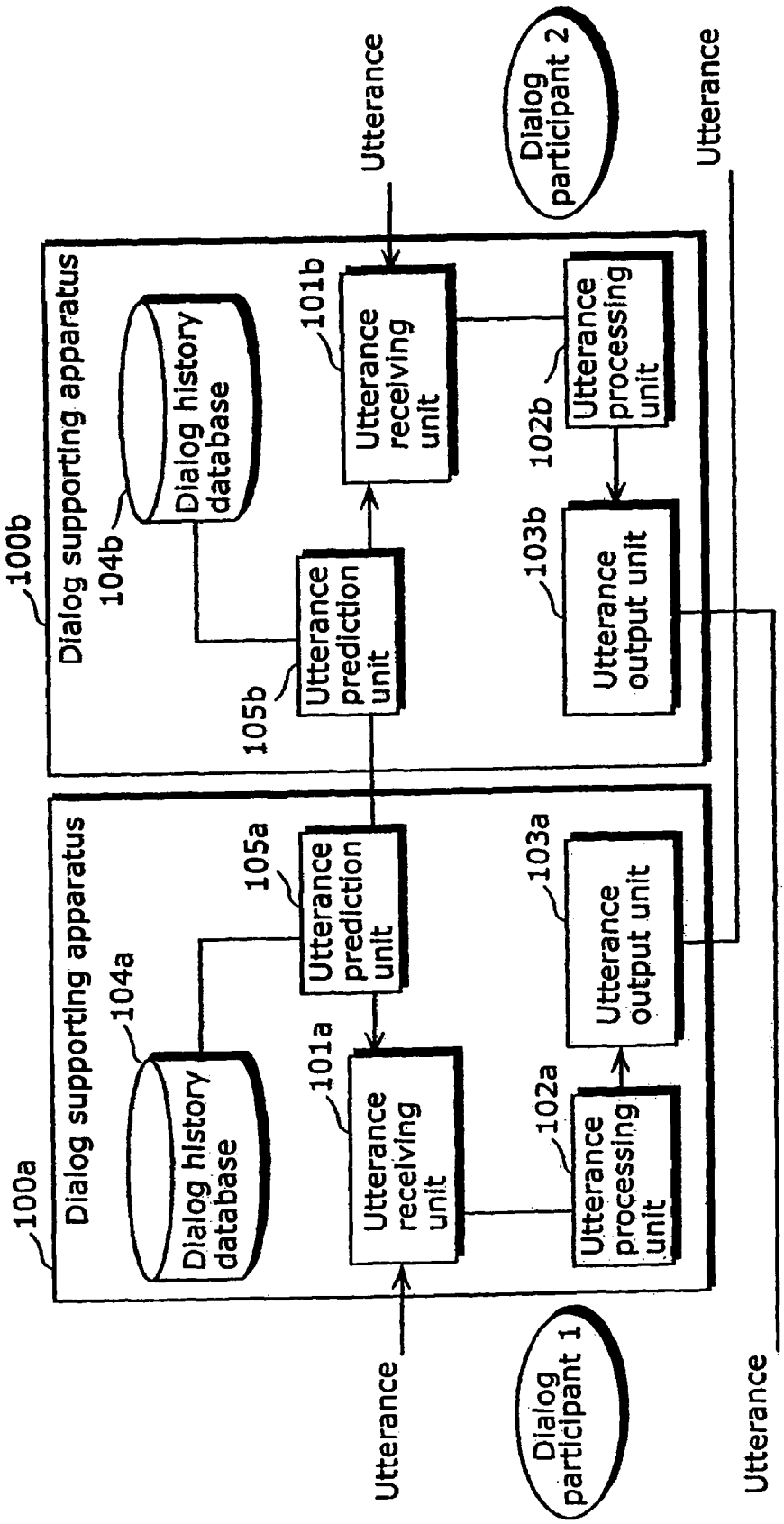
FIG. 2 is a block diagram showing the configuration of an embodiment in the case of making a dialog using two dialog supporting apparatuses.

The dialog supporting apparatus 100 shown in FIG. 1 is a basic configuration of the present invention, and in the basic configuration each dialog participant uses a dialog supporting apparatus. Since a dialog is made by two people in general, two dialog supporting apparatuses 100 are used when an actual dialog is made. FIG. 2 is a block diagram showing the configuration of the embodiment in the case where a dialog is made using two dialog supporting apparatuses.

Next, an operation performed in the case of supporting an on-going dialog in different languages using the dialog supporting apparatuses configured like described above will be described below. It is assumed here that the dialog participant 1 who speaks Japanese uses a dialog supporting apparatus 100a and the dialog participant 2 who speaks English uses a dialog supporting apparatus 100b. FIG. 3 is a diagram showing an example of the interrelationship among the utterance numbers, the input utterances, and the output utterances in the dialog supporting apparatus 100a.

The utterance receiving unit 101a transforms the received utterance of the dialog participant 1 into the corresponding utterance information. The utterance information is, for example, an utterance number in FIG. 3. The utterance processing unit 102a translates an utterance (Japanese) of the dialog participant 1 into the corresponding utterance (English) of the dialog participant 2, and outputs the corresponding character string. For example, in the case where an utterance number 1 is inputted, the utterance processing unit 102a outputs the character string of "May I help you?" to the utterance output unit 103a as utterance information.

In contrast to the dialog supporting apparatus 100a, the utterance processing unit 102b of the dialog supporting apparatus 100b transforms an utterance of the dialog participant 2 into corresponding utterance information. FIG. 4 is a diagram showing an example of the interrelationship among the utterance numbers, the input utterances and the output utterances in the dialog supporting apparatus 100b. The utterances identified by the respective utterance numbers are the same both in FIG. 3 and FIG. 4, but language directions of the utterances are different between FIG. 3 and FIG. 4. Utterance information is, for example, utterance numbers in FIG. 4. The utterance receiving unit 101b translates an utterance (English) of the dialog participant 2 into the corresponding utterance (Japanese) of the dialog participant 1, and outputs the corresponding character string. For example, in the case where the utterance number 1 is inputted, the utterance processing unit 102a outputs the character string of 「いらっしゃい」which is the utterance information to the utterance output unit 103b. After that, in order to simplify the following description considering the language directions, the utterance number 1 inputted by the dialog participant 1 is abbreviated as J1 and an utterance number 2 inputted by the dialog participant 2 is abbreviated as E1.

The utterance receiving unit 101a allows the dialog participant 1 to directly select an utterance from the list of Japanese utterances in FIG. 3, and outputs the utterance number which is the utterance information. In addition, the utterance receiving unit 101b allows the dialog participant 2 to directly select an utterance from the list of English utterances in FIG. 4, and outputs the utterance number which is the utterance information. As for the configuration of the utterance receiving unit 101a or the utterance receiving unit 101b, it may be realized by the processing of projecting the speech of each dialog participant to one of the utterance numbers using a speech recognition processing. In addition, it is realized by the processing of allowing a dialog participant to input a transcription or a character string corresponding to the pronunciation of the utterance through a keyboard and projecting the speech to one of the utterance numbers.

FIG. 5A to 5E each is a diagram showing an example of a dialog history stored in the dialog history database 104a and the dialog history database 104b. Dialog histories are histories of utterances made in the past by dialog participants, and in each dialog history the utterances of the dialog participants are placed in time sequence. Each utterance corresponds to one of the utterances defined in FIG. 3 or FIG. 4. There is a need to distinguish even the same utterance number depending on a dialog participant. Thus, J is assigned to the utterances made in Japanese and E is assigned to the utterances made in English, and the J and E each is defined as a label of each utterance in the dialog history. After that, in order to simplify the following descriptions, a dialog history is described using column labels. For example, the dialog history d1 is described as d1: E1, J2, E3, J4, E5, J6, E7 and E8. The information of the dialog participants who made the dialog and the topic of the dialog are recorded in the dialog history.

Figure 6:
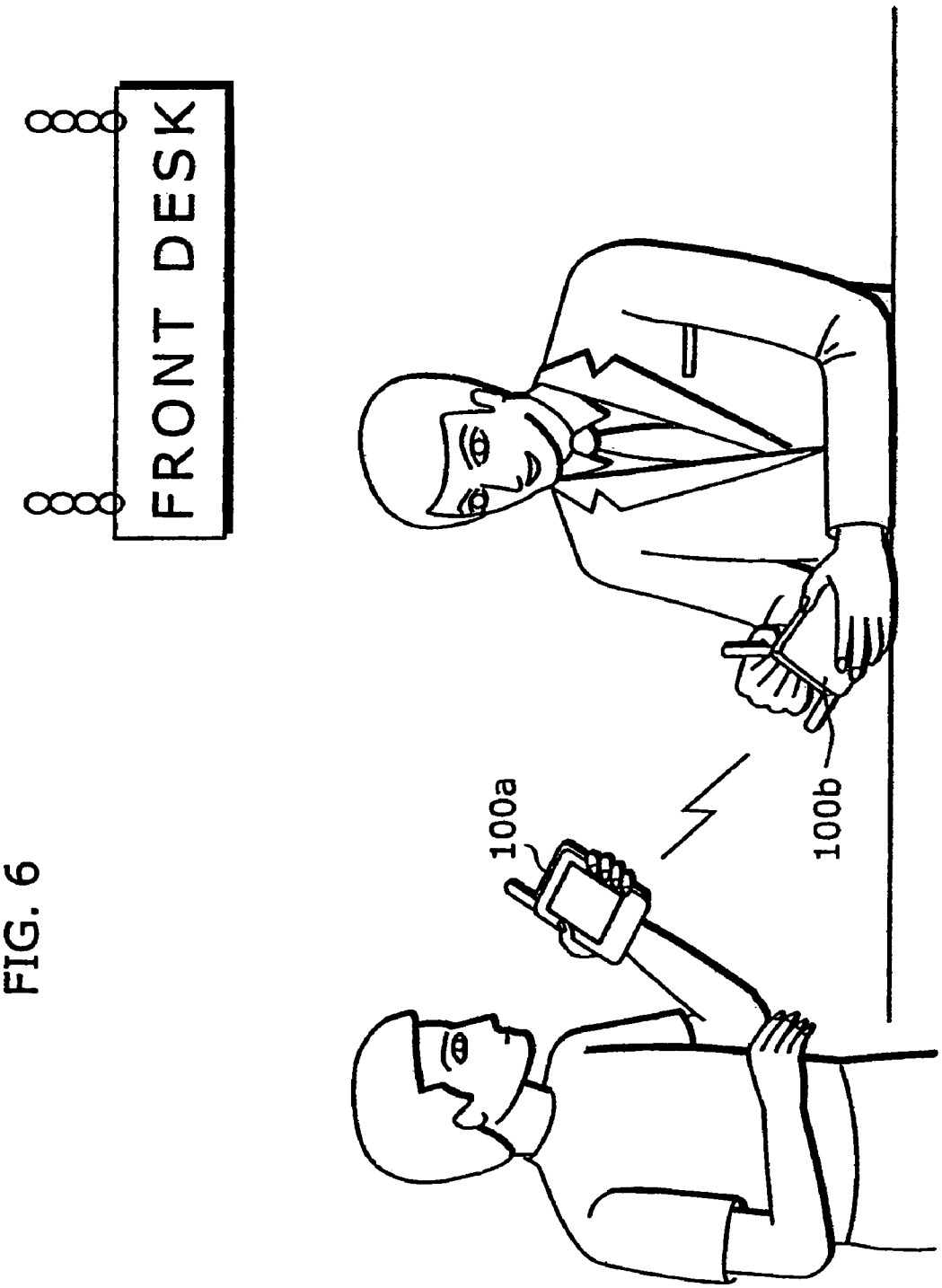
FIG. 6 is a diagram showing an example scene where the dialog supporting apparatuses of the present invention are used.

Here will be described, as shown in FIG. 6, an example case where the dialog participant 1 is a Japanese traveler and the dialog participant 2 is a clerk of a hotel who speaks English, and they make a dialog for check-in to the hotel.

Figure 7:
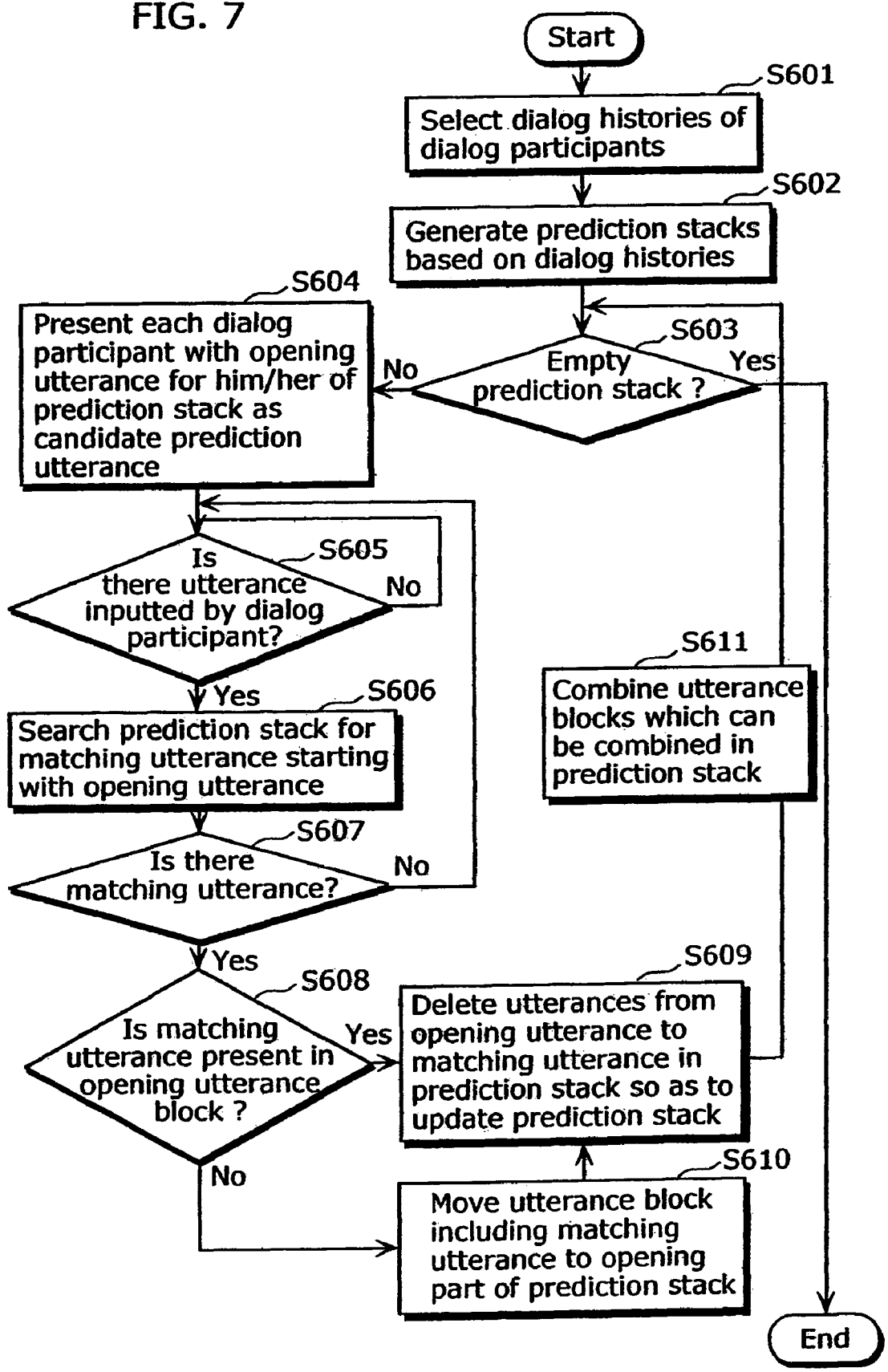
FIG. 7 is a flow chart showing an operation flow of an input prediction unit.

FIG. 7 is a flow chart showing an operation flow of the utterance prediction unit 105a and the utterance prediction unit 105b. The utterance prediction unit 105a and the utterance prediction unit 105b are independent from each other in configuration, but they must exchange information in order to operate in association. The information needed for this association operation is called utterance prediction information.

Figure 8A:
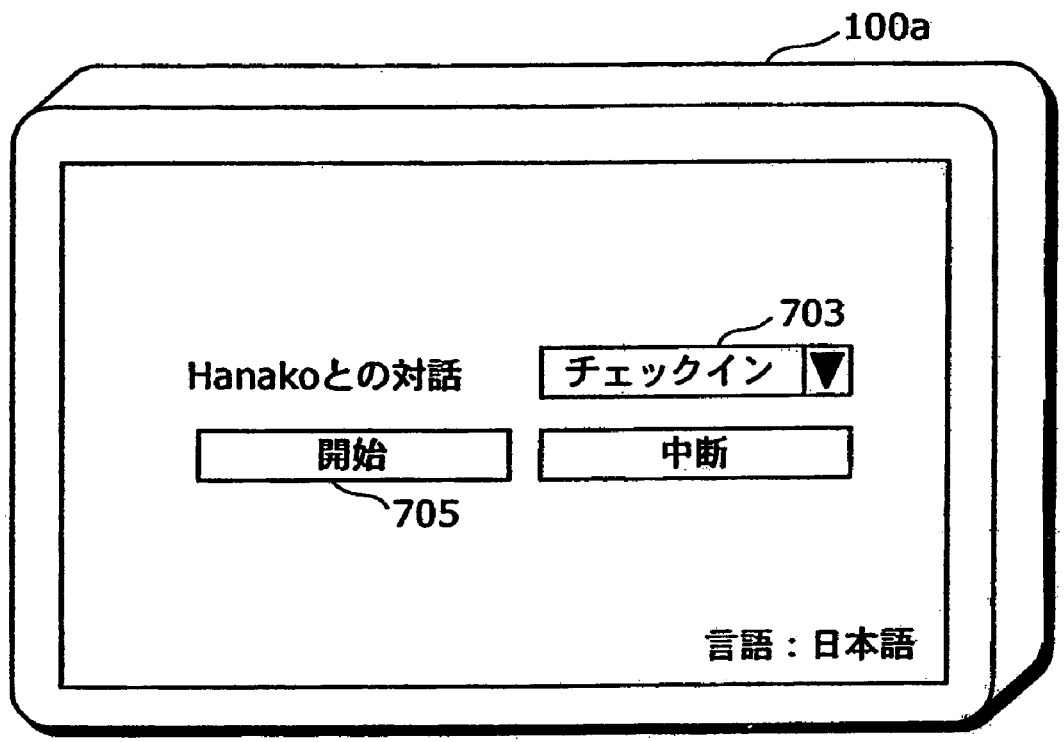
FIGS. 8A and 8B are each a diagram showing a display example of the dialog supporting apparatus of the present invention.
Figure 8B:
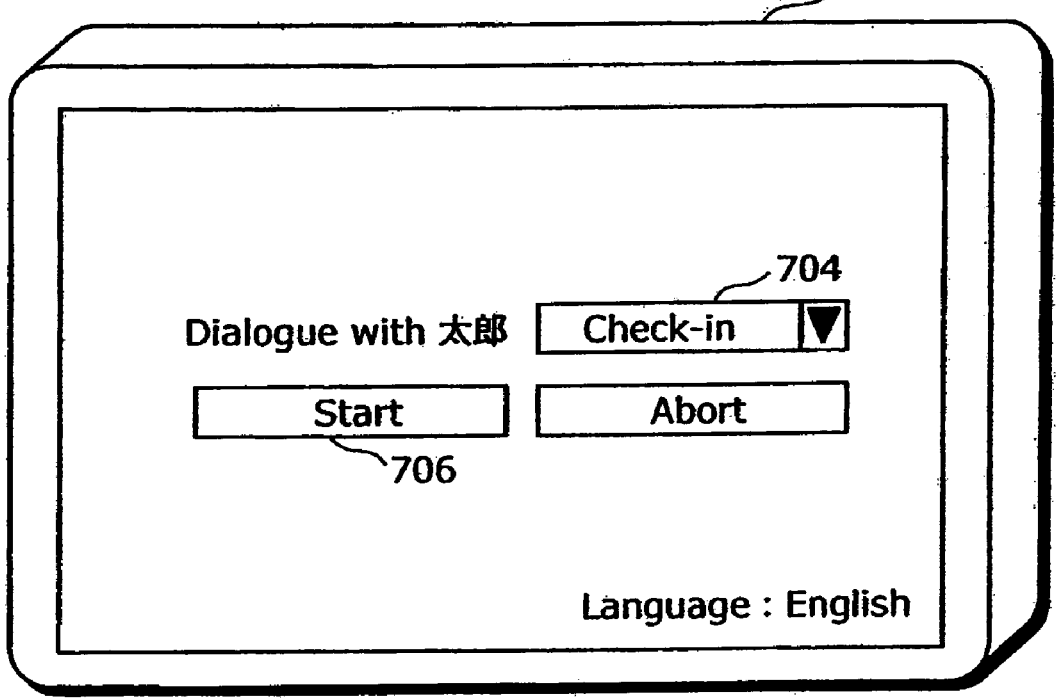

The utterance prediction unit 105a and the utterance prediction unit 105b specify the topic of a dialog first in order to search, respectively, the corresponding dialog history database 104a and the dialog history database 104b for the dialog history needed for performing utterance prediction (Step S601). The utterance prediction unit 105a searches the dialog history database 104a for the needed dialog history, and the utterance prediction unit 105b searches the dialog history database 104b for the needed dialog history. For example, the dialog participant 1 uses the dialog supporting apparatus 100a realized as, for example, a PDA shown in FIG. 8, and the dialog participant 2 uses the dialog supporting apparatus 100b. As for the topic of a dialog, information on a topic is obtained by allowing each dialog participant to directly input the information using a topic input area 703 and a topic input area 704. In addition, as for obtaining the topic of the dialog, the topic of the dialog may be obtained by a method for automatically associating with the automatically-obtainable information related to the position where a PDA is placed (the information includes the information related to the location such as a restaurant, hospital and hotel).

When a dialog start button 705 and a dialog start button 706 are pressed by the respective dialog participants, the utterance prediction unit 105a selects a dialog history d1 for the dialog participant 1, and the utterance prediction unit 105b selects a dialog history d3 for the dialog participant 2. This is because the topics of the dialog history d1 and the dialog history d3 relate to a hotel. The dialog history d2 and the dialog history d4 are not selected because their topics are different. After that, the utterance prediction unit 105a notifies the utterance prediction unit 105b of the dialog history d1 which is the first utterance prediction information, and the utterance prediction unit 105b notifies the utterance prediction unit 105a of the dialog history d3 which is the second utterance prediction information.

Next, the utterance prediction unit 105a and the utterance prediction unit 105b start to generate prediction stacks using the dialog history d1: E1, J2, E3, J4, E5, J6, E7, E8 and the dialog history d3: E1, E3, J4, J2, E8, E5, J6, E7, respectively (Step S602).

Figure 9:
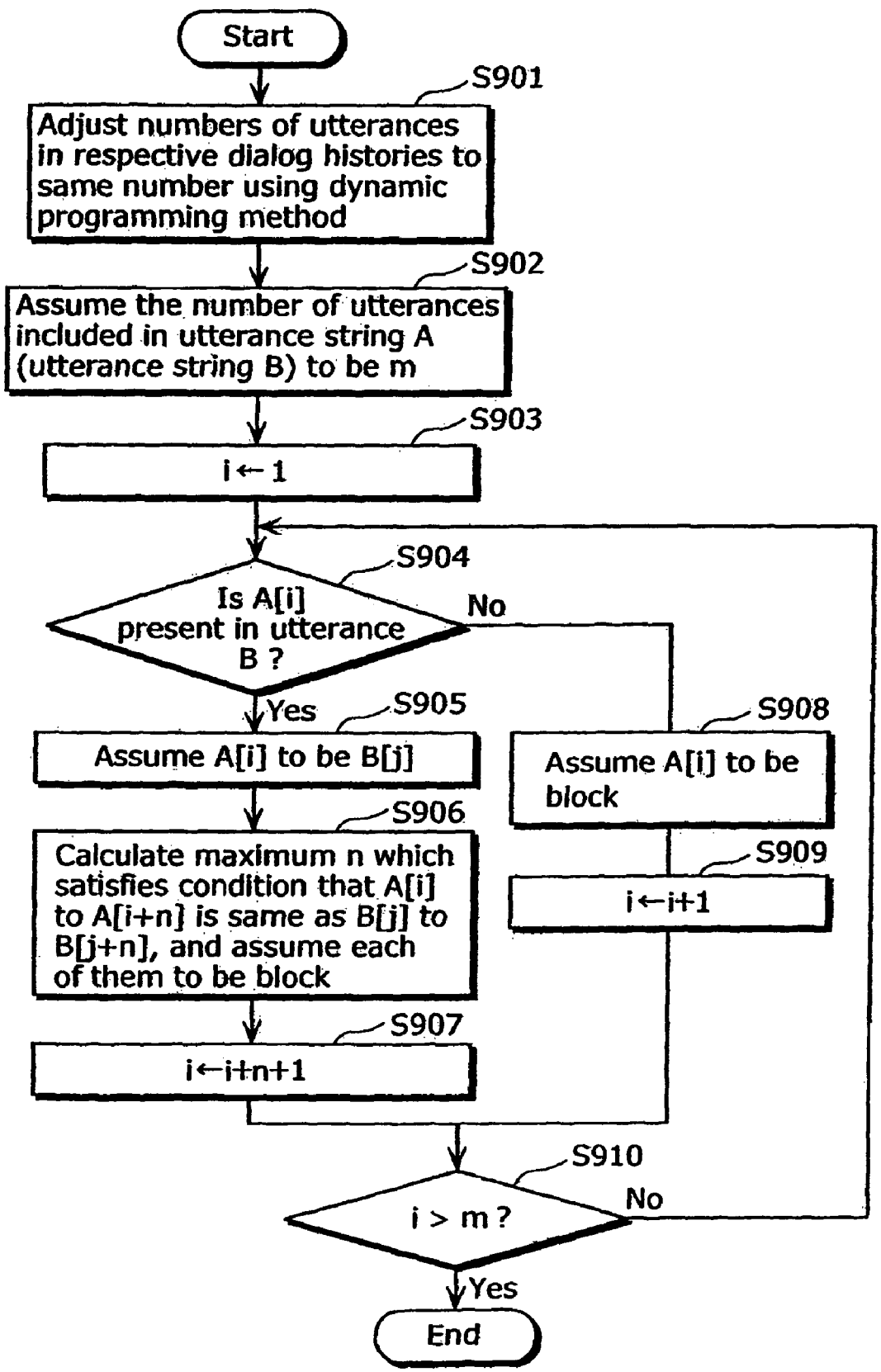
FIG. 9 is a flow chart showing a generation procedure of prediction stacks.

FIG. 9 is a flow chart showing a procedure of generating a prediction stack. Since a dialog history is made up of utterance strings, these utterance strings are subsets of the dialog history.

Figure 11:
FIG. 11 is a diagram showing an example where the dynamic programming is applied to the dialog history x.

The utterance prediction unit 105a and the utterance prediction unit 105b adjust the numbers of the utterances in the respective dialog histories to the same number using a dynamic programming shown in FIG. 10 (Step S901). Here is an example case of adjusting the dialog history d1 (the number of utterances is 8) in FIG. 5 and the dialog history x (the number of utterances is 6) in FIG. 11. When the dynamic programming shown in FIG. 10 is applied to the dialog history x, the dialog history x is adjusted to become a dialog history x'. In the adjusted dialog history x', the utterances assigned φ are empty utterances added so that the dialog history x' includes the same number of utterances as the utterances in the dialog history d1. Since the dialog history d1: E1, J2, E3, J4, E5, J6, E7, E8 and the dialog history d3: E1, E3, J4, J2, E8, E5, J6, E7 have the same utterance number of 8, the result is the same irrespective of the dynamic programming applied to them.

Next, the utterance prediction unit 105a and the utterance prediction unit 105b respectively determine the utterance blocks of the dialog histories. An utterance block is an assembly which corresponds to successive utterances and is commonly included in each history. Here, such utterance blocks that include the maximum numbers of utterances are determined so that the number of utterance blocks included in each dialog history becomes the minimum. In other words, the number of utterances included in the utterance string A (utterance string B) is assumed to be m (Step S902). Next, 1 is substituted to i (Step S903). Whether or not A[i] is present in the utterance string B is judged (Step S904). Note that A[i] shows ith utterance in the utterance string A. In addition, as for φ, when A[i]=φ, and B[j]=φ, A[i] and B[j] are not assumed to be the same. As a result of this judgment, in the case where A[i] is present in the utterance string B (Step S904: YES), the utterance is assumed to be B[j] (Step S905). After that, the maximum n which satisfies the condition that A[i] to A[i+n] is the same as B[j] to B[j+n] is calculated, and each of them is assumed to be a block (Step S906). Next, i+n+1 is substituted to i (Step S907).

In the case where the judgment of whether or not A[i] is present in the utterance string B showed that A[i] is not present in the utterance string B (Step S904: NO), A[i] is assumed to be a block (Step S908). After that, i+1 is substituted to i (Step S909).

Next, whether or not i is greater than m is judged (Step S910). In the case where the judgment showed that i is greater than m (Step S907: NO), the processing step of judging whether or not A[i] is present in the utterance string B and the following processing steps (Steps S904 to S907) are repeated. In the other case where the judgment showed that i is greater than m (Step S907: YES), the processing is completed.

In an example case of dialog history d1: E1, J2, E3, J4, E5, J6, E7, E8 and the dialog history d3: E1, E3, J4, J2, E8, E5, J6, E7, the dialog history d1: E1, J2, (E3, J4), (E5, J6, E7), E8 and the dialog history d3: E1, (E3, J4), J2, E8, (E5, J6, E7) are obtained by performing the above operation. Each utterance label enclosed by parentheses corresponds to an utterance block. Note that utterance blocks made up of only a single utterance are not provided with parentheses in order to simplify the transcription. The dialog history d1: E1, J2, (E3, J4), (E5, J6, E7), E8 becomes the prediction stack J: E1, J2, (E3, J4), (E5, J6, E7), E8 of the utterance prediction unit 105a, and the dialog history d3: E1, (E3, J4), J2, E8, (E5, J6, E7) becomes the prediction stack E: E1, (E3, J4), J2, E8, (E5, J6, E7) of the utterance prediction unit 105b.

The processing of judging whether or not these two utterances are the same (Steps S901, S904 and S906) is performed in the procedure of generating each prediction stack, but it should be noted that the judgment may be made performing at least one of the following matching: a matching based on utterance information which is an utterance number for identifying the utterance; a matching based on a surface expression using natural language processing; and a matching based on a content word. In an example case where one of the dialog histories includes the utterance of「ありがとう。」 and the other dialog history includes the utterance of「ありがとうございます。」, it is possible to judge these utterances as included in common in the two dialog histories even in the case where each of them is provided with a different utterance number, because the surface expressions of the respective utterances are similar. This is true of another example case where one of the dialog histories includes the utterance of "Thank you." and the other dialog history includes the utterance of "Thank you very much.". Furthermore, here is another case where one of the dialog histories includes the utterance of「これを3セット贈答用に包んでください。」 and the other dialog history includes the utterance of「贈答用に3セット、これを包んでください。」

In this case, it is possible to judge these utterances as the utterance included in both the two dialog histories as long as both「これ」「包む」「3セット」「贈答用」 are defined as content words. This is because many content words are commonly included in the dialog histories. In addition, these judgment methods may be used in combination. To employ a flexible utterance judgment like this makes it possible to control the number of utterance blocks even in the case where the number of blocks is required to be increased when performing only a matching based on an utterance number.

Here, the flow chart shown in FIG. 7 will be described again.

After structuring an utterance prediction stack, the utterance prediction unit 105a and the utterance prediction unit 105b judge whether or not the respective prediction stacks are empty (Step S603). In the case where one of the prediction stacks is empty for the reason that the utterance prediction unit 105a or the utterance prediction unit 105b cannot structure an appropriate prediction stack or for another reason (Step S603: YES), the utterance prediction unit 105a or the utterance prediction unit 105b completes the processing without performing any utterance prediction operation, and follows the operation of the other party's utterance prediction unit which is the utterance prediction unit 105a or the utterance prediction unit 105b.

Figure 12A:
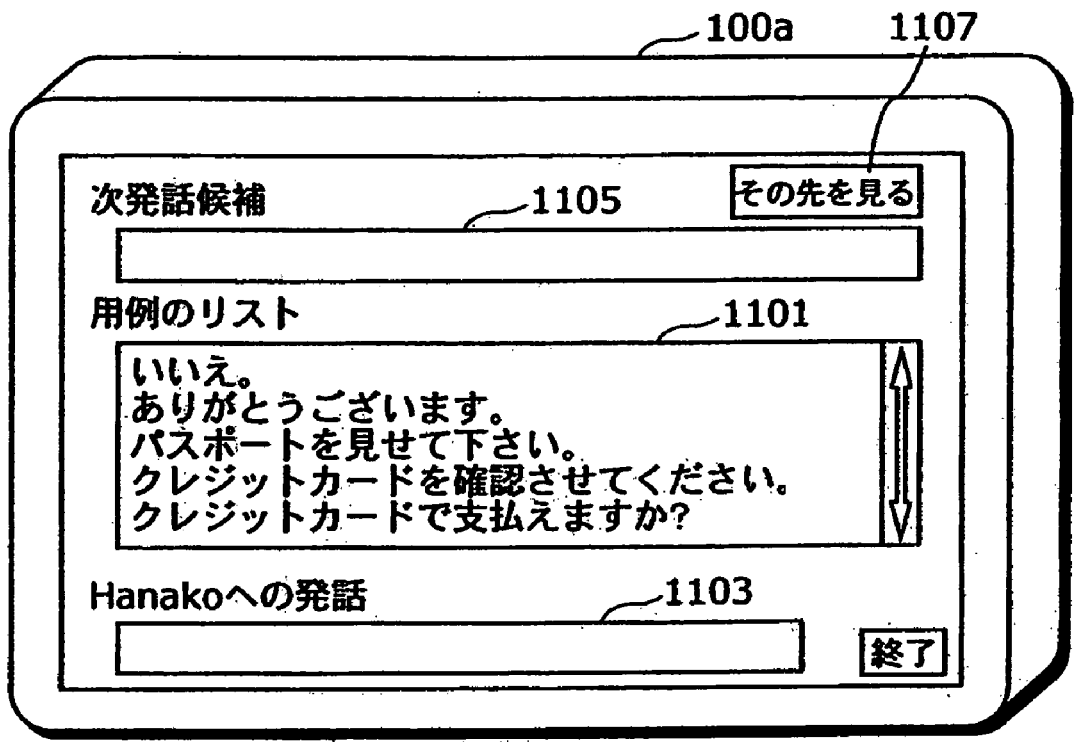
FIGS. 12A and 12B are each a diagram showing a display example of the dialog supporting apparatus of the present invention.
Figure 12B:
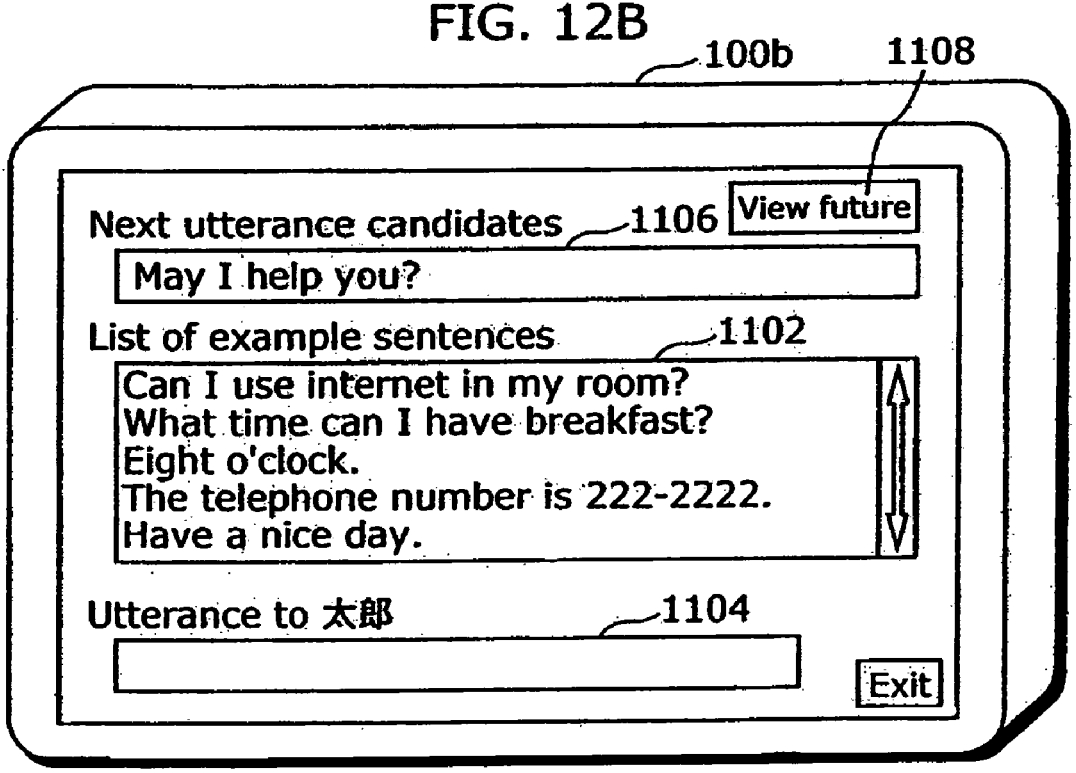

On the other hand, in the case where the prediction stack is not empty (Step S603: NO), the utterance prediction unit 105a and the utterance prediction unit 105b each displays the opening utterance of the prediction stack as the candidate next utterance (Step S604). FIG. 12 is a diagram showing a display state on the dialog supporting apparatus 100 at the time when a dialog is started.

The dialog participant 1 and the dialog participant 2 can select an arbitrary utterance from among all the utterances defined in FIG. 3 and FIG. 4 using an example usage list 1101 and an example usage list 1102, respectively, and they can communicate the selected utterances to each other. The utterance transformed in the utterance processing unit 102a is outputted to the utterance output unit 1103 of the dialog participant 1, and the utterance transformed in the utterance processing unit 102b is outputted to the utterance output unit 1104 of the dialog participant 2, and the outputted utterances are read out using the speech synthesis processing installed in PDAs or the like at the same time they are displayed. The utterance for the dialog participant 1 predicted by the utterance prediction unit 105a is displayed on the prediction display area 1105, and the utterance for the dialog participant 2 predicted by the utterance prediction unit 105b is displayed on the prediction display area 1106. The dialog participant 1 and the dialog participant 2 can omit the operation for searching an example usage list 1105 and an example usage list 1106 for the utterance to be selected, by selecting the candidate prediction utterance displayed on the prediction display area 1105 and the prediction display area 1106, respectively. In other words, the dialog participants 1 and 2 can input utterances to the other party immediately.

Figure 13A:
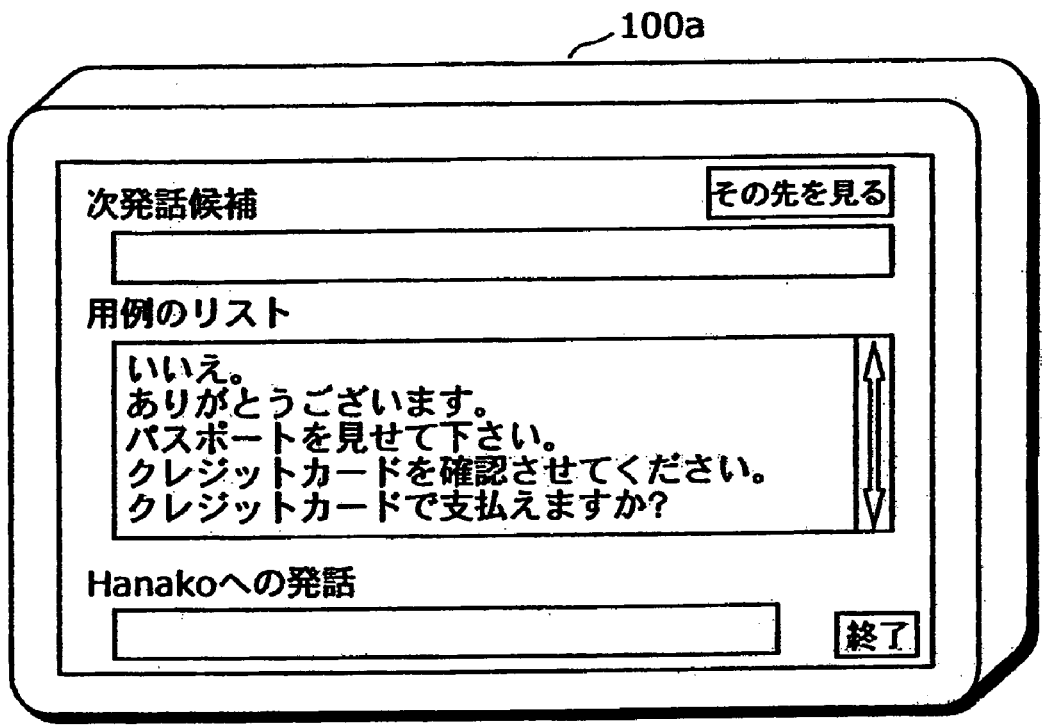
FIGS. 13A and 13B are each a diagram showing a display example of the dialog supporting apparatus of the present invention.
Figure 13B:
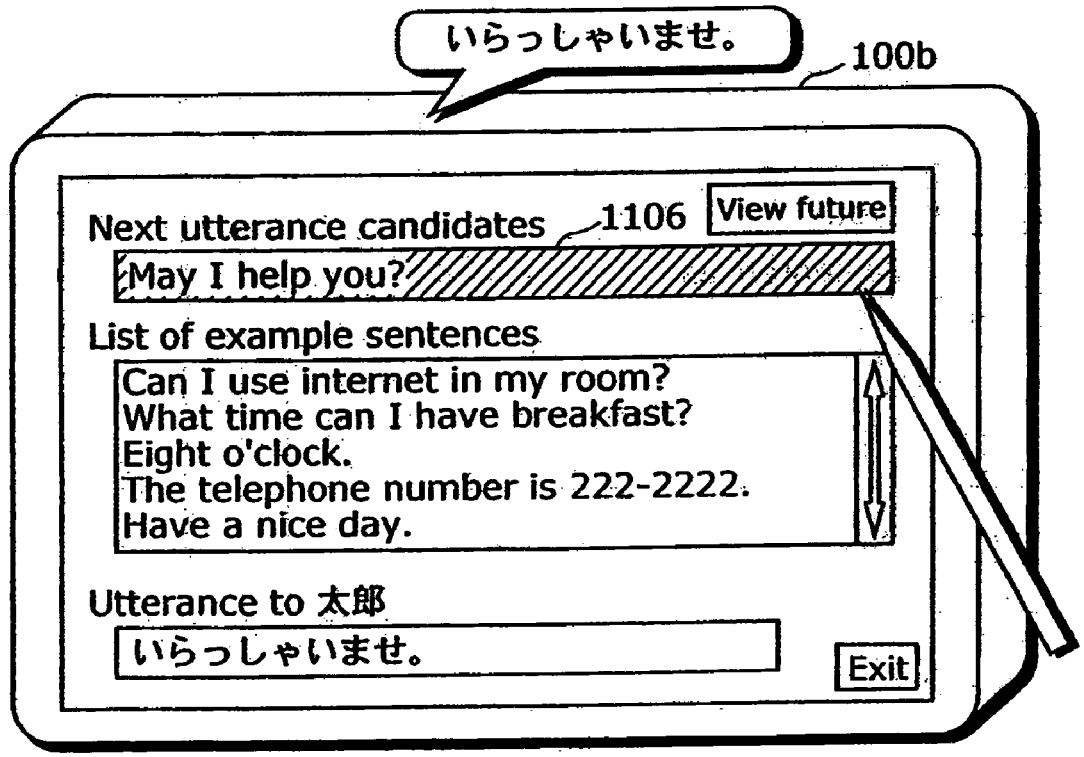
Figure 14A:
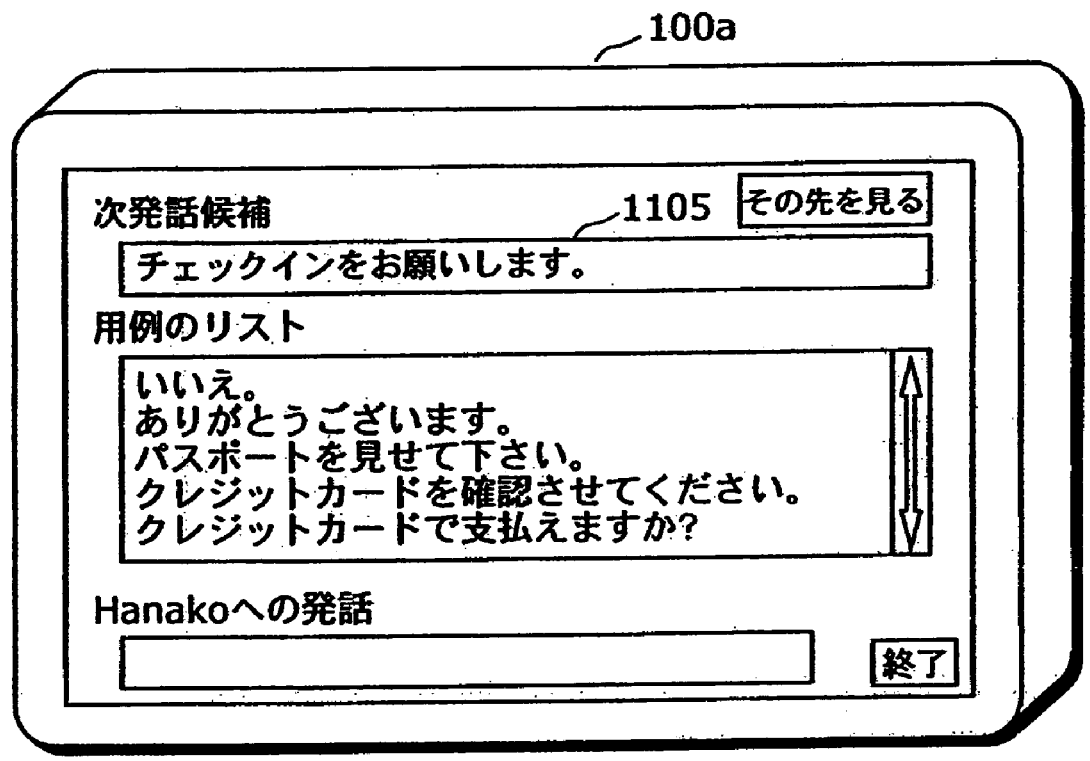
FIGS. 14A and 14B are each a diagram showing a display example of the dialog supporting apparatus of the present invention.
Figure 14B:
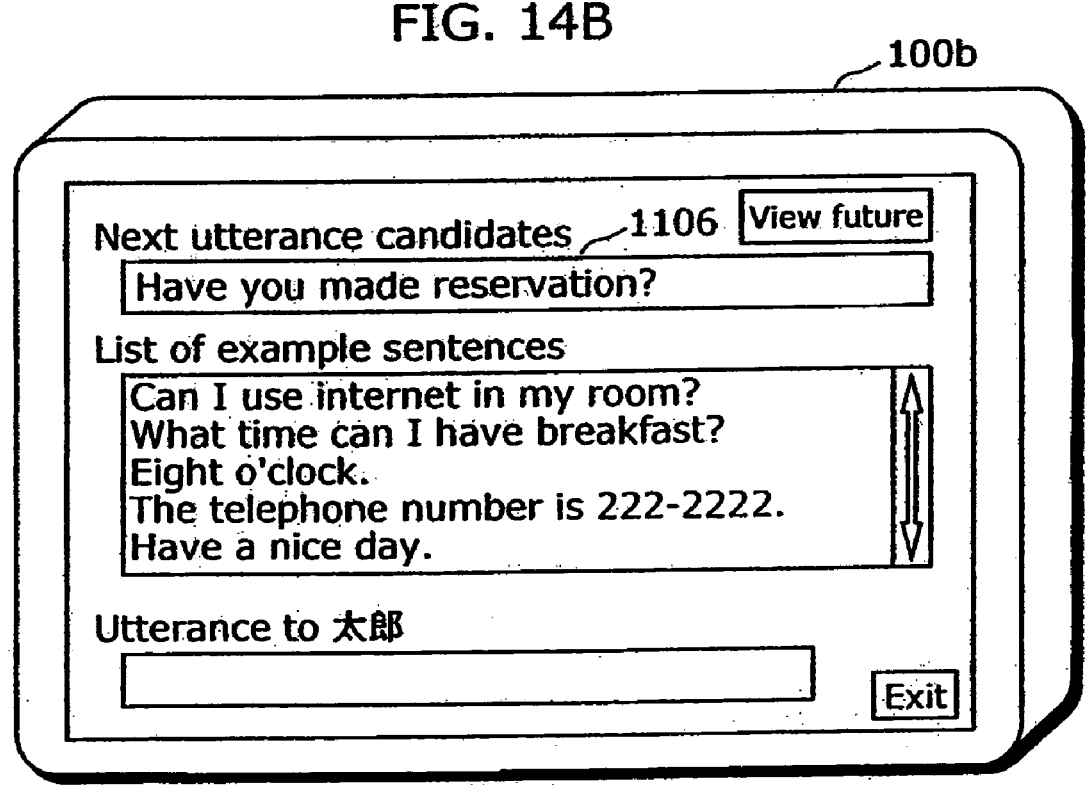
Figure 15A:
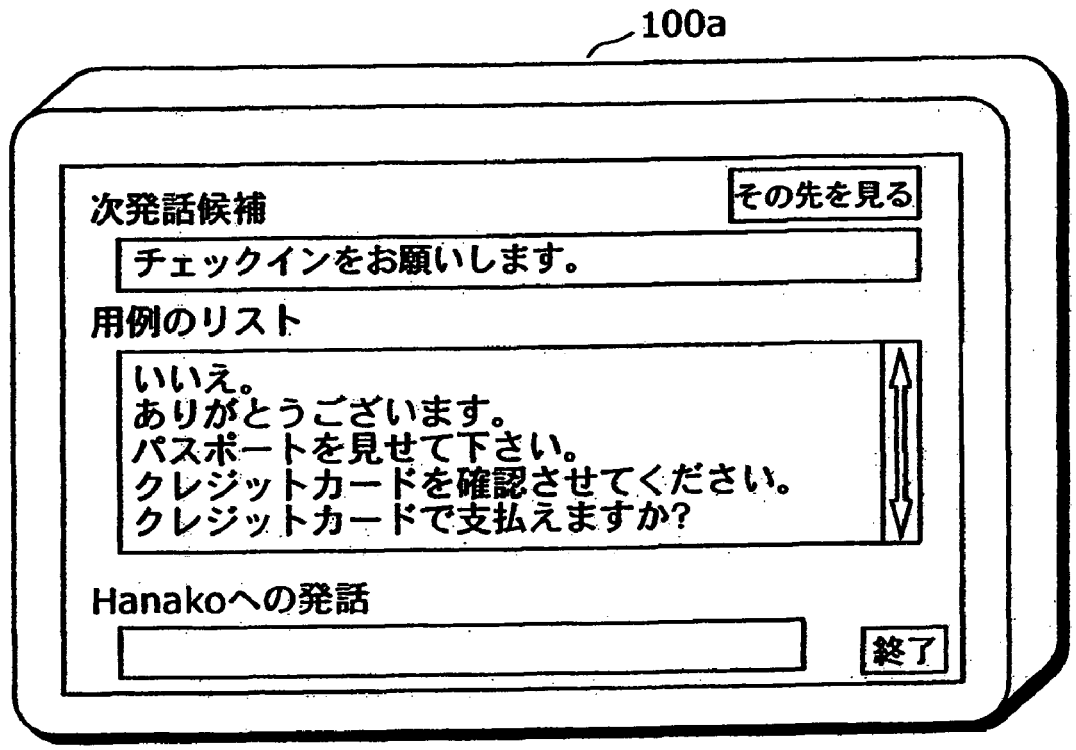
FIGS. 15A and 15B are each a diagram showing a display example of the dialog supporting apparatus of the present invention.
Figure 15B:
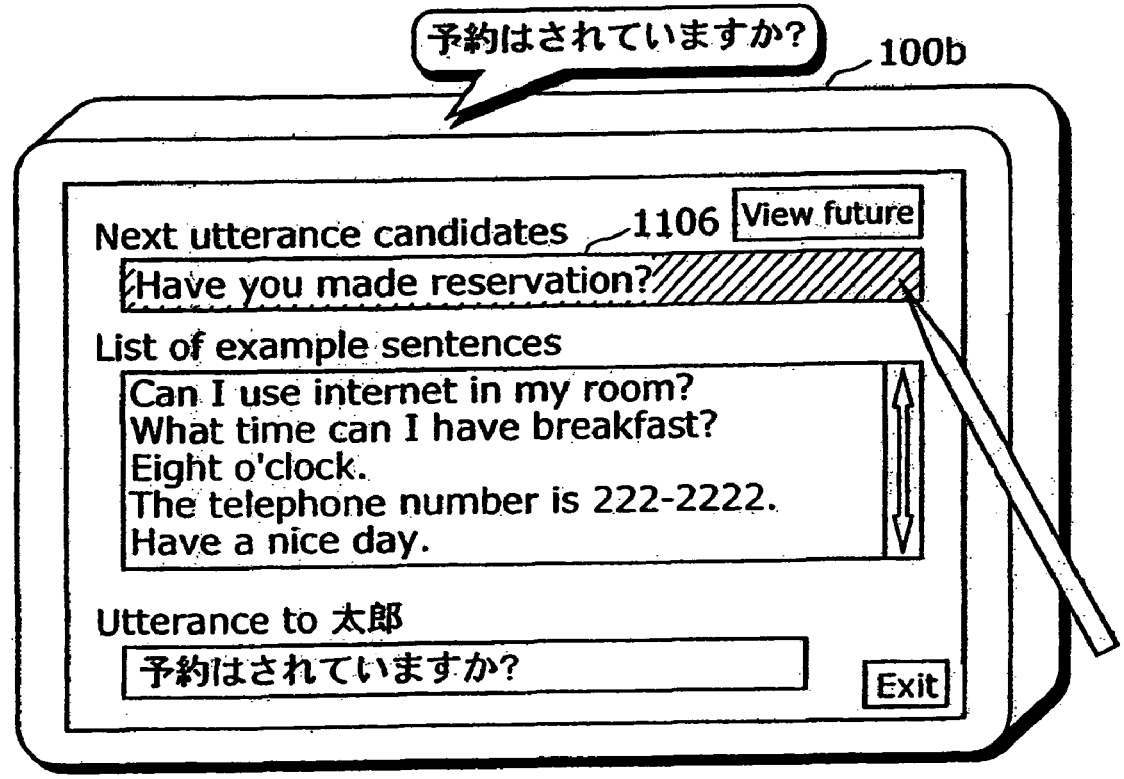

In FIG. 12, the utterance prediction unit 105a and the utterance prediction unit 105b have already completed display (Step S604) of the candidate next utterance (Step S605). In other words, the utterance prediction unit 105a does not display a prediction candidate on the prediction display area 1105. This is because the utterance for use in the case where the prediction stack J: E1, J2, (E3, J4), (E5, J6, E7), E8 is started with the utterance assigned with E, and thus the utterance is not for the use as the utterance assigned with J. On the other hand, the utterance prediction unit 105b has displayed a prediction candidate of "May I help you?" on the prediction display area 1106. This is because the utterance for use in the case where the prediction stack E: E1, (E3, J4), J2, E8, (E5, J6, E7) is started with the utterance assigned with E and thus the utterance is for the use as the utterance assigned with E. The dialog participant 2 may select an utterance in the example usage list 1102. However, since a desired utterance has already been displayed on the prediction display area 1106, the dialog participant 2 selects a prediction candidate as shown in FIG. 13. The utterance E1 is transformed into Japanese in the utterance processing unit 102b, and the utterance of「いらっしゃいませ。」is communicated to the dialog participant 1.

At this time, the utterance prediction unit 105a and the utterance prediction unit 105b judge whether or not an utterance is inputted by the respective dialog participants (Step S605). When utterances are inputted by the respective dialog participants (Step S605: YES), the utterance prediction unit 105a and the utterance prediction unit 105b search the respective prediction stacks for a matching utterance starting with the opening utterances (Step S606), and judge whether or not a matching utterance is present (Step S607). In the case where a matching utterance is present (Step S607: YES), the utterance prediction unit 105a and the utterance prediction unit 105b judge whether or not the matching utterance is the opening utterance of the prediction stacks (Step S608). In the case where the matching utterance is the opening utterances (Step S608: YES), they delete the opening utterances in the prediction stacks so as to update the prediction stacks (Step S609). After that, in the case where there emerge utterance blocks which can be combined with each other after the utterance is deleted, they -combine utterance blocks which can be combined in the prediction stacks (Step S611). In contrast, in the case where the matching utterance is not the opening utterances (Step S608: NO), they move the block including the matching utterance to the opening part of the prediction stacks (Step S610), and delete the utterances from the opening utterance to the matching utterance so as to update the prediction stacks. After that, they return to the processing of judging whether or not the prediction stacks are empty (Step S603).

Since the utterance of one of the dialog participant is E1 in the above example, the utterance prediction unit 105a and the utterance prediction unit 105b delete the utterance E1 which is the opening utterances in the prediction stacks so as to update the prediction stacks to the prediction stack J: J2, (E3, J4), (E5, J6, E7), E8 and the prediction stack E: (E3, J4), E8, (E5, J6, E7). Since no utterance blocks which can be combined are present in the prediction stacks J: J2, (E3, J4), (E5, J6, E7), E8 and E: (E3, J4), J2, E8, (E5, J6, E7), these prediction stacks do not change. After that, those prediction stacks are still not empty, the utterance prediction unit 105a assumes the utterance J2, which is the opening utterance of the prediction stack J: J2, (E3, J4), (E5, J6, E7), E8, to be a prediction candidate. More specifically, the utterance prediction unit 105a displays the utterance J2 of 「チェックインをお願いします。」 on the prediction display area 1105. In addition, the utterance prediction unit 105b displays the utterance E3 of "Have you made reservation?" on the prediction display area 1106 assuming the utterance E3, which is the opening utterance of the prediction stack E: (E3, J4), J2, E8, (E5, J6, E7) to be a prediction candidate. The utterance prediction unit 105a and the utterance prediction unit 105b wait for an utterance by the other dialog participant.

The dialog participant 1 or the dialog participant 2 may, respectively, select an utterance in the usage example list 1101 or the usage example list 1102. However, since a desired utterance has already been displayed on the prediction display area 1105 or the prediction display area 1106, it is a good idea for the dialog participant to select the next utterance from among the prediction candidates. Here, in the case where the dialog participant 2 selected the prediction display area 1106 earlier than the time when the dialog participant 1 selects the prediction display area 1105 or the like, the utterance E3 is translated into Japanese in the utterance processing unit 102b, and the utterance of 「予約はされていますか？」 is notified to the dialog participant 1. Since the utterance E3 from the dialog participant is not present in the opening utterance block of the prediction stack J: J2, (E3, J4), (E5, J6, E7), E8, the utterance prediction unit 105a changes the prediction stack 3 into J: (E3, J4), 32, (E5, J6, E7), E8 (Step S610), and updates to J: J4, J2, (E5, J6, E7), E8 (Step S609). On the other hand, since the utterance E3 is present in the opening utterance block of the prediction stack E: (E3, 34), J2, E8, (E5, J6, E7), the utterance prediction unit 105b updates the prediction stack E to E: J4, J2, E8, (E5, 37, E7). At this time, the successive utterances of J4 and J2 are commonly included in the respective prediction stacks (Step S611). Therefore, the utterance prediction unit 105b updates the prediction stack J to J: (J4, J2), (E5, J6, E7), E8 and the prediction stack E to E: (J4, J2), E8, (E5, J6, E7) by combining J4 and J2 with each other so as to include them in an utterance block.

Figure 16A:
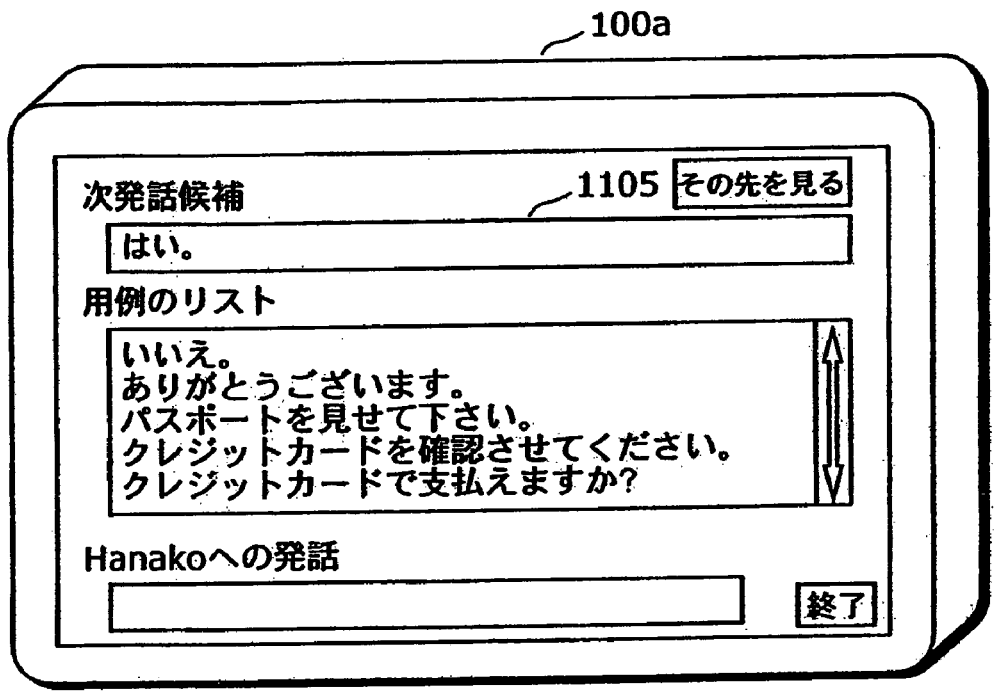
FIGS. 16A and 16B are each a diagram showing a display example of the dialog supporting apparatus of the present invention.
Figure 16B:
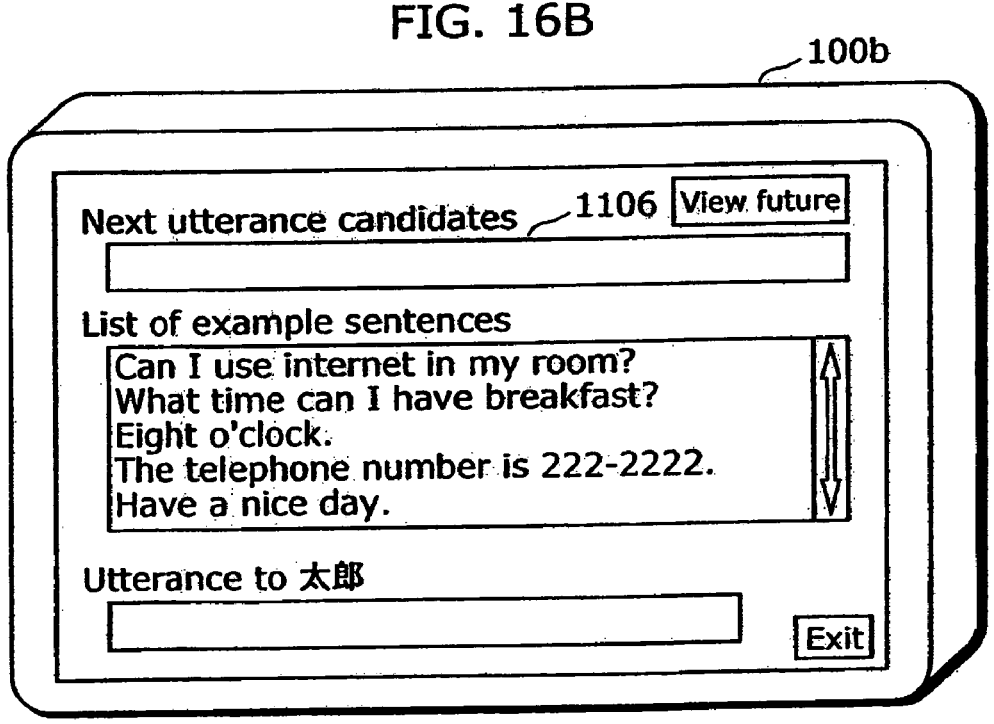
Figure 17A:
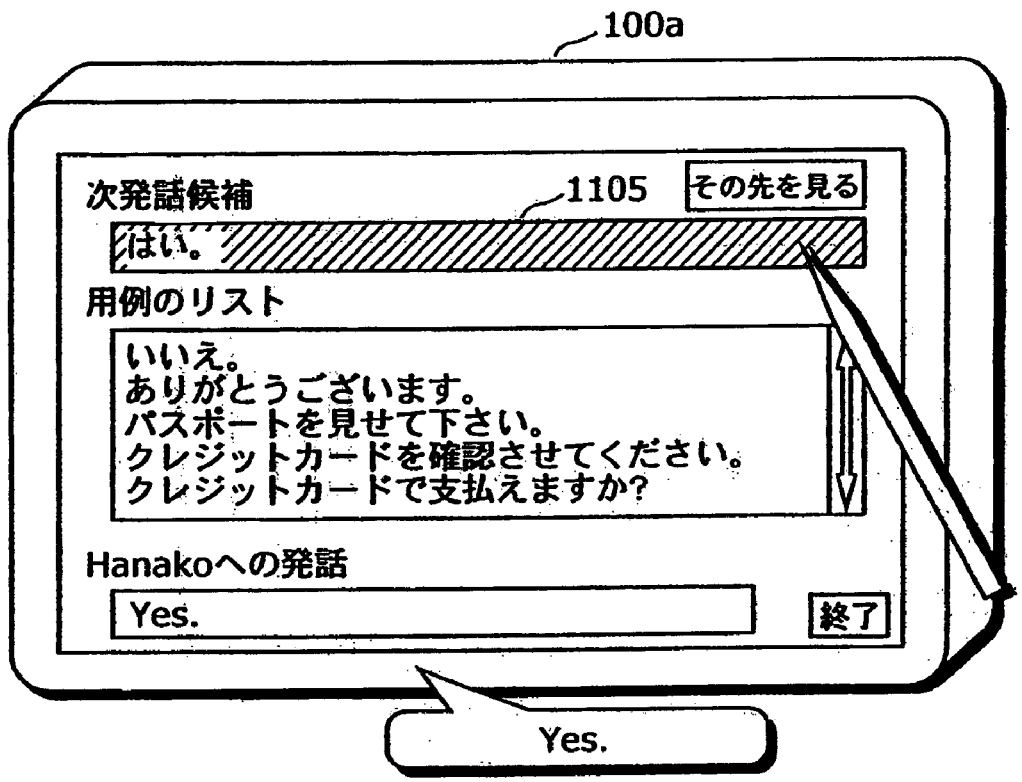
FIGS. 17A and 17B are each a diagram showing a display example of the dialog supporting apparatus of the present invention.
Figure 17B:
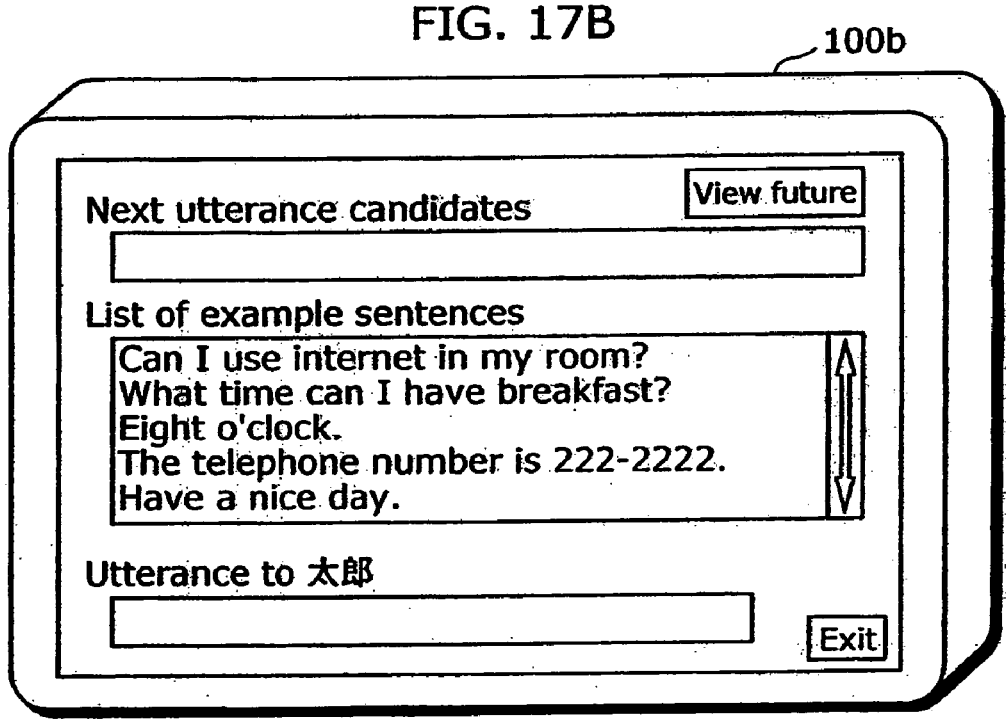

Likewise, since the prediction stack J is J: (J4, J2), (E5, J6, E7), E8 and the prediction stack E is E: (J4, J2), E8, (E5, J6, E7), the utterance prediction unit 105a displays the prediction candidate 34 of 「はい。」 on the prediction display area 1105 as shown in FIG. 16. The utterance prediction unit 105b does not display any prediction candidates on the prediction display area 1106 because they are not intended for the dialog participant.

Figure 18A:
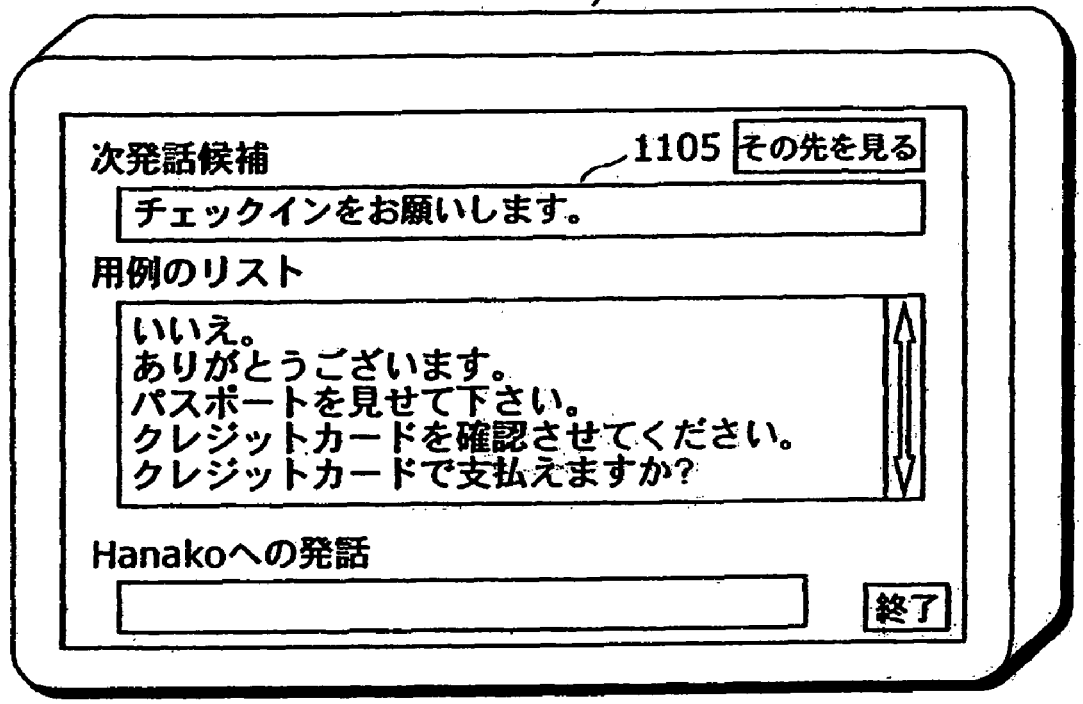
FIGS. 18A and 18B are each a diagram showing a display example of the dialog supporting apparatus of the present invention.
Figure 18B:
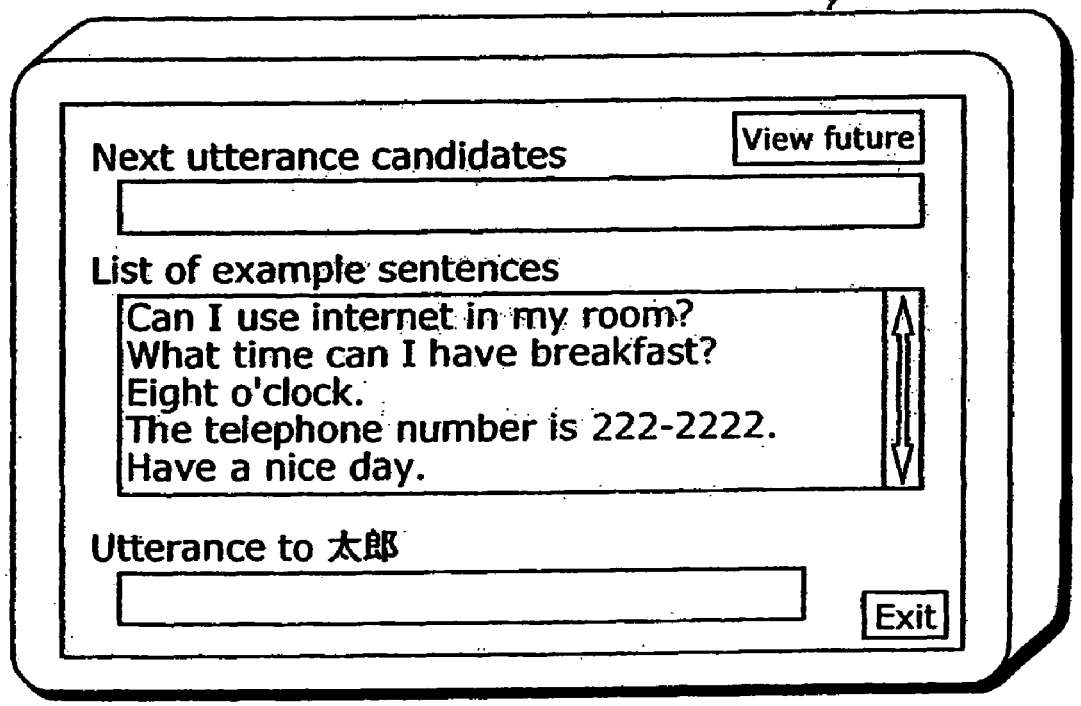

The dialog participant 1 may select an utterance in the example usage list 1101. However, since a desired utterance has already been displayed on the prediction display area 1105, the dialog participant 1 selects the utterance on the prediction display area 1105. In response to this, the utterance 34 is translated into English by the utterance processing unit 102a and the utterance of "Yes." is notified to the dialog participant 2. Likewise, the utterance prediction unit 105a updates the prediction stack J to J: J2, (E5, J6, E7), E8 and displays the utterance J2 of 「チェックインをお願いします。」 on the prediction display area 1105 as shown in FIG. 18. In contrast, the utterance prediction unit 105b updates the prediction stack E to E: J2, E8, (E5, J6, E7), but does not display any utterance on the prediction display area 1106. In this way, the dialog participant 1 or the dialog participant 2 does not have to search the example usage list 1101 or the example usage list 1102 for a desired utterance. Therefore, they can notify their intentions to the other party immediately, and thus it becomes possible to reduce the time to complete the on-going dialog.

Figure 19:
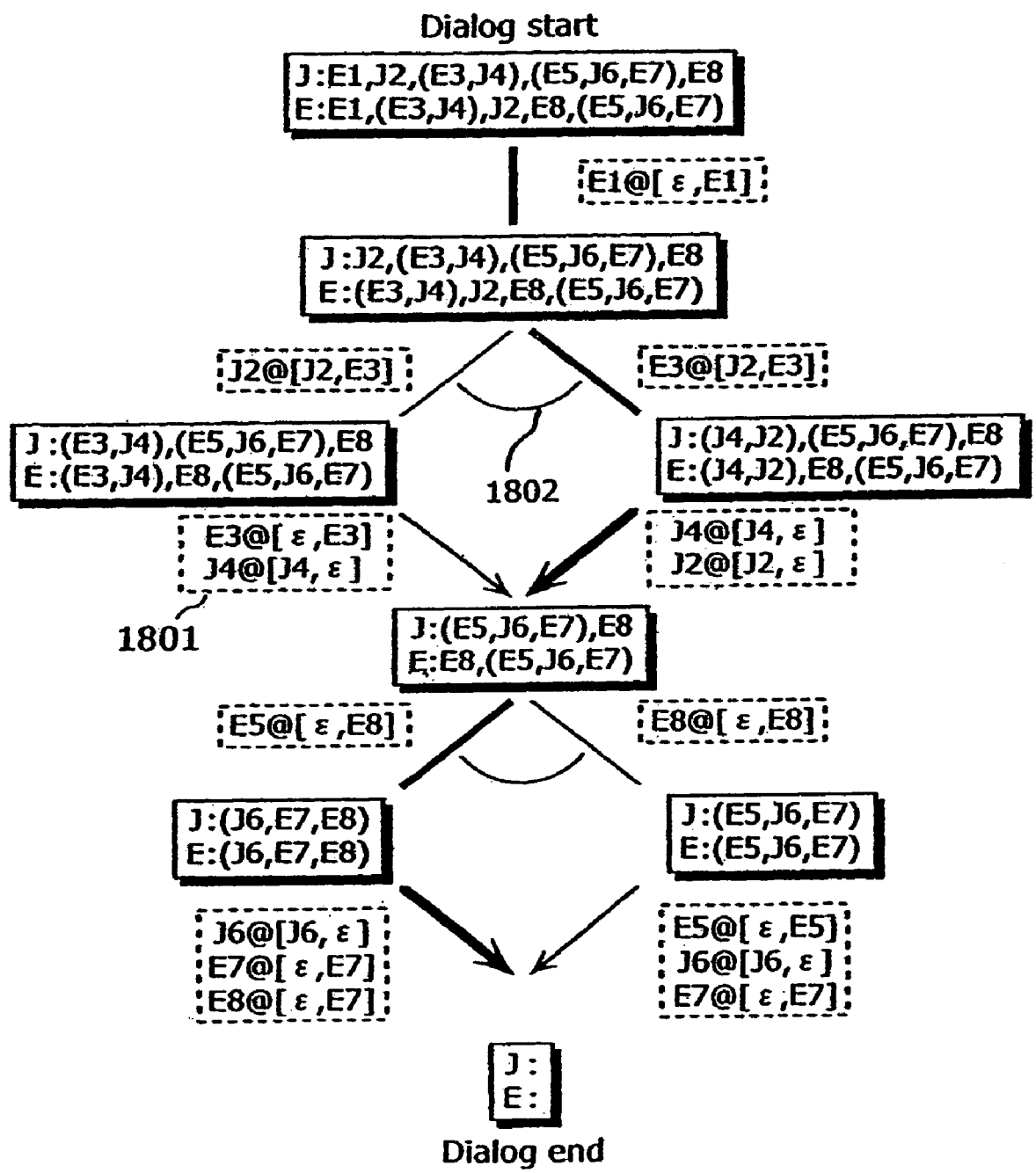
FIG. 19 is a schematic diagram of an on-going dialog supported by the present invention.

Next, an effect of the present invention will be described from an objective standpoint. FIG. 19 is a schematic diagram of an on-going dialog supported by the present invention. The dialog advances in the direction shown by the arrows. Here, a current prediction stack is shown in each solid rectangle. Further, a pair of a prediction candidate presented to the dialog participants and an utterance inputted by the dialog participant is shown in the respective dotted rectangles which appear in time sequence. For example, the dotted-line rectangle 1801 shows that: no prediction candidate was displayed on the prediction display area 1105, the utterance E3 of "Have you made reservation?" was displayed on the prediction display area 1106, the dialog participant 2 inputted the utterance E3, and then the utterance J4 of 「はい。」 was displayed on the prediction display area 1105, nothing was displayed on the prediction display area 1106, and the dialog participant 1 inputted the utterance J4. FIG. 19 also shows that prediction candidates change depending on an utterance inputted by a dialog participant. In particular, the diversions of arrows show that there were plural utterances that the dialog participants inputted to the prediction candidates. Here is an example case where the utterance J2 of 「チェックインをお願いします。」 which is a prediction candidate is displayed on the prediction display area 1105, and the utterance E3 of "Have you made reservation?" is displayed on the prediction display area 1106. Here, Branches 1802 are in the dialog showing the following two cases: the case where the dialog participant 1 inputted the utterance J2 earlier than the time when the dialog participant 2 inputs the utterance E3; and the case where the dialog participant 2 inputted the utterance E3 earlier than the time when the dialog participant 1 inputs the utterance 32. An example taken next is the case of the dialog which advances in the direction shown by the bold arrows in the advancement patterns of dialogs like this. In this example, the dialog d' shown in FIG. 20 has been made between the dialog participants. The dialog d' is a newly generated dialog history since it is not present in the dialog history database shown in FIG. 5.

Here, a degree of similarity of dialog histories is defined. For example, r(da|db) is the degree of similarity of the dialog history da with respect to the dialog history db, and it is defined by an equation 2001 of FIG. 21A. As for the dialog history da and the dialog history db, it should be noted that the utterance blocks in the respective dialog histories are predetermined using the processing like the procedure of generating a prediction stack defined in FIG. 9. Here, size(d) is the number of utterance blocks included in a dialog history, and size(b) is the number of utterances included in the utterance block b. In an example of calculating a degree of similarity 2002 in FIG. 21B, since the dialog history da is made up of four utterance blocks, size(da)=4. In addition, the numbers of utterances included in the respective utterance blocks are: size(b1)=5; size(b2)=2; size(b3)=4; and size(b4)=1, r(da|db) is calculated as approximately 0.424. According to the above equations, the greater the value of r, the higher the similarity degree of two dialog histories becomes. In addition, the degree of similarity is inversely proportional to the number of the assemblies. The fewer the number of utterance blocks included in common, the higher the similarity degree becomes. Additionally, the degree of similarity is proportional to the mean of the numbers of utterances included in the respective assemblies. The greater the number of utterances included in each utterance block, the higher the similarity degree becomes. Hence, the higher the degree of similarity of the dialog histories of the dialog participants the more smoothly the on-going dialog advances, since the advancement patterns for the dialog made between the two persons are similar to each other.

Figure 22:
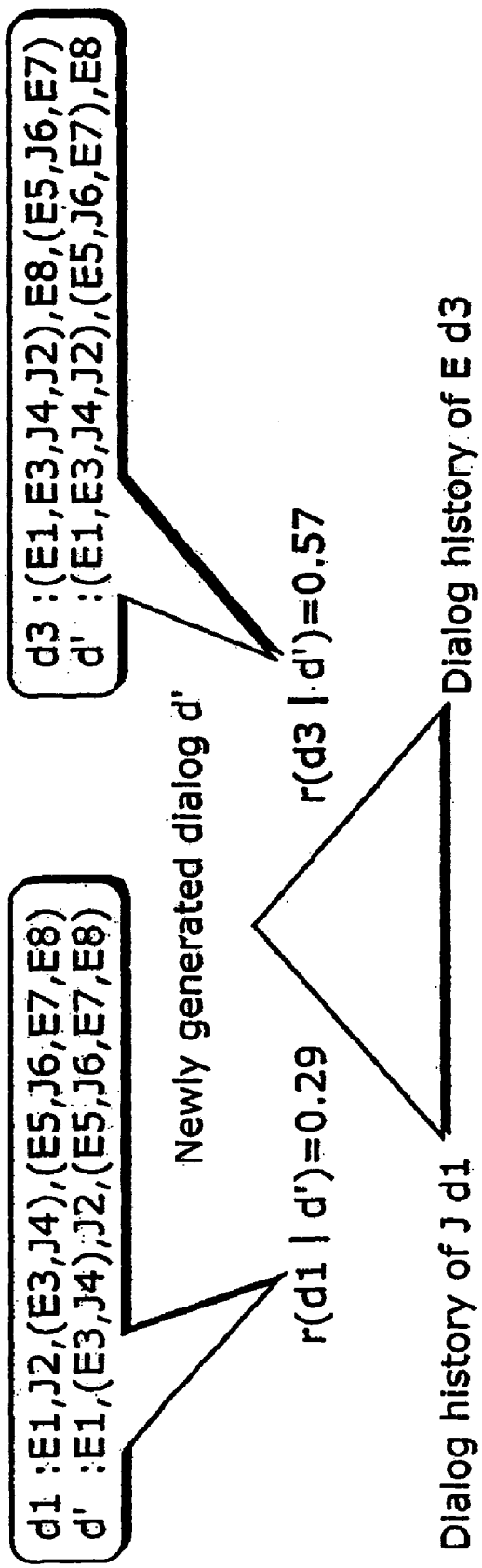
FIG. 22 is a diagram showing the degrees of similarity of dialog histories when compared to each other.

As shown in FIG. 22, the similarity degree of the dialog history d1 and the dialog history d3 of the dialog participants before the dialog d' is started is 0.16. However, the similarity degrees with respect to the dialog d' supported by the present invention are 0.29 in the case of the dialog history d1 and 0.57 in the case of the dialog history d3, respectively. Therefore, it is obvious that the on-going dialog is made more smoothly than the case where the dialog is made making one of the dialog participants to use a dialog history of the other dialog participant.

Figure 23:
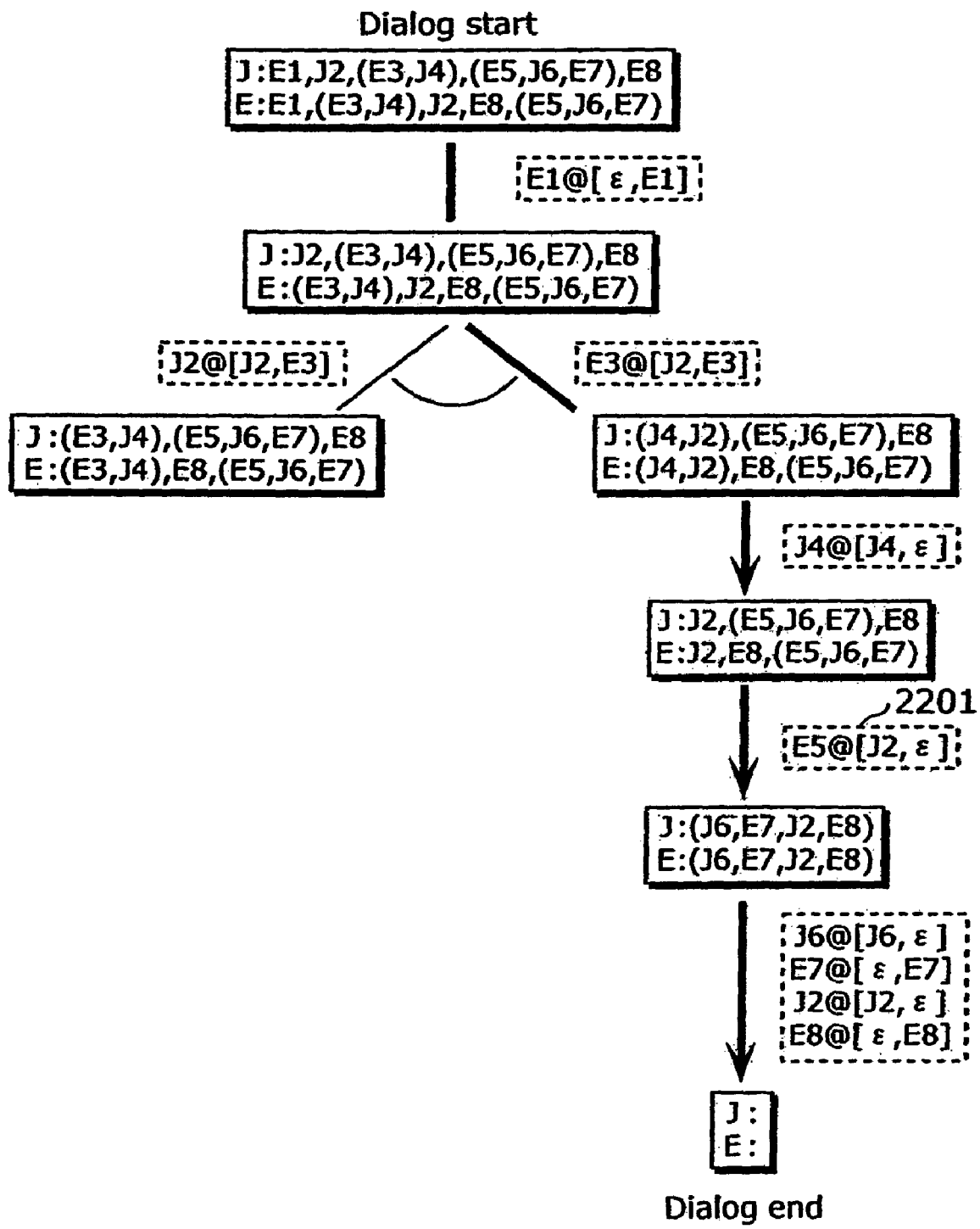
FIG. 23 is a schematic diagram of an on-going dialog supported by the present invention.

Here will be shown that the present invention can provide an effect even in the case where a dialog is continued without a dialog participant selecting a part of prediction candidates. FIG. 23 is a schematic diagram of the dialog supported by the present invention. FIG. 23 can be interpreted as the same as FIG. 19. The dotted-line rectangle 2201 shows that: the prediction candidate J2 was displayed on the prediction display area 1105; and the dialog participant 2 inputted the utterance E5 using the example usage list 1102 although nothing was displayed on the prediction display area 1106. The dialog advanced in the direction shown by the bold arrows is the dialog d" shown in FIG. 24. The dialog d" is a newly generated dialog history since it is not present in the dialog history database shown in FIG. 5.

As shown in FIG. 24, the degree of similarity of the dialog history d1 and the dialog history d3 before the dialog d" is started is 0.16. However, the degrees of similarity with respect to the made dialog are 0.33 in the case of the dialog history d1 and 0.52 in the case of the dialog history d3, respectively. Hence, it is obvious that the dialog is made more smoothly than the case where the dialog is made making one of the dialog participants to use a dialog history of the other dialog participant, although a dialog participant did not select a part of prediction candidates. In this way, the present invention can predict the development of a dialog as much as possible even in the case where a dialog participant disregards a part of the prediction candidates. Therefore, the present invention enables to provide the dialog participants with flexibility in a dialog and support the flexible dialog.

The case of assuming that the dialog participant 1 who speaks Japanese uses the dialog supporting apparatus 100a and the dialog participant 2 who speaks English uses the dialog supporting apparatus 100b has already been described up to this point. In the case described next, it is assumed that a dialog participant 1 who speaks Chinese uses a dialog supporting apparatus 100a and a dialog participant 2 who speaks English uses a dialog supporting apparatus 100b. FIG. 25 is a diagram showing an example of the interrelationship among the utterance numbers, the input utterances and the output utterances in the dialog supporting apparatus 100a.

The utterance receiving unit 101a transforms the received utterance of the dialog participant 1 into the corresponding utterance information. The utterance information is, for example, an utterance number in FIG. 25. The utterance processing unit 102a translates the utterance (Chinese) of the dialog participant 1 into the corresponding utterance (English) of the dialog participant 2, and outputs the corresponding character string. For example, in the case where the utterance number 1 is inputted, the utterance processing unit 102a outputs the character string of "May I help you?" to the utterance output unit 103a as the utterance information.

In contrast to the dialog supporting apparatus 100a, the utterance receiving unit 102b of the dialog supporting apparatus 100b translates the received utterance of the dialog participant 2 into the corresponding utterance information. FIG. 26 shows a diagram showing an example of the interrelationship among the utterance numbers, the input utterances and the output utterances of the dialog participant 2 in the dialog supporting apparatus 100b. The utterance numbers are common in FIG. 25 and FIG. 26, but the language directions are different. Utterance information is, for example, an utterance number in FIG. 26. The utterance receiving unit 101b translates the utterance (English) of the dialog participant 2 into the corresponding utterance (Chinese) of the dialog participant 1, and outputs the character string. For example, in the case where the utterance number 1 is inputted, the utterance processing unit 105 outputs the following character string of 欢迎光临。 which is the utterance information to the receiving unit 103b. After that, in order to simplify the following description considering the language directions, the utterance number 1 inputted by the dialog participant 1 is abbreviated as C1 and the utterance number 1 inputted by the dialog participant 2 is abbreviated as E1.

The utterance receiving unit 101a allows the dialog participant 1 to directly select an utterance in the list of Chinese utterances in FIG. 25, and outputs the utterance number which is the utterance information. In addition, the utterance receiving unit 101b allows the dialog participant 2 to directly select an utterance in the list of English utterances in FIG. 26, and outputs the utterance number as the utterance information. As for the configuration of the utterance receiving unit 101a or the utterance receiving unit 101b, it may be realized by the processing of projecting the speech of a dialog participant to one of the utterance numbers using a speech recognition processing. In addition, it is realized by the processing of allowing a dialog participant to input a transcription or a character string corresponding to the pronunciation of the utterance through a keyboard, and projecting the speech to one of the utterance numbers.

FIGS. 27A and 27B are each a diagram showing an example of a dialog history stored in the dialog history database 104a and the dialog history database 104b. A dialog history is a history of utterances made in the past by dialog participants, and in the dialog history the utterances of the dialog participants are placed in time sequence. Each utterance corresponds to one of the utterances defined in FIG. 25 or FIG. 26. There is a need to distinguish even the same utterance number depending on a dialog participant. Thus, C is assigned to the utterances made in Chinese and E is assigned to the utterances made in English, and the C and E each is defined as a label of the utterance in the dialog history. After that, in order to simplify the following description, a dialog history is described using column labels. For example, the dialog history d5 is described as d5: E1, C2, E3, C4, E5, C6, E7 and E8. The authentication information of the dialog participants who made the dialog and the topic of the dialog are recorded in the dialog history. For example, the dialog history d5 includes the information indicating that the utterances provided with C are the dialog participant 1's and the topic relates to checking in to a hotel.

As shown in FIG. 6, here will be described an example case where the dialog participant 1 is a traveler who speaks Chinese, the dialog participant 2 is a clerk of a hotel who speaks English, and the topic for the dialog is to check in the hotel. Note that the operation flows of the utterance prediction unit 105a and utterance prediction unit 105b are the same as the operation flows described above. Thus, they will be described with reference to the flow chart shown in FIG. 7, but the descriptions of the same parts are omitted here.

Figure 28A:
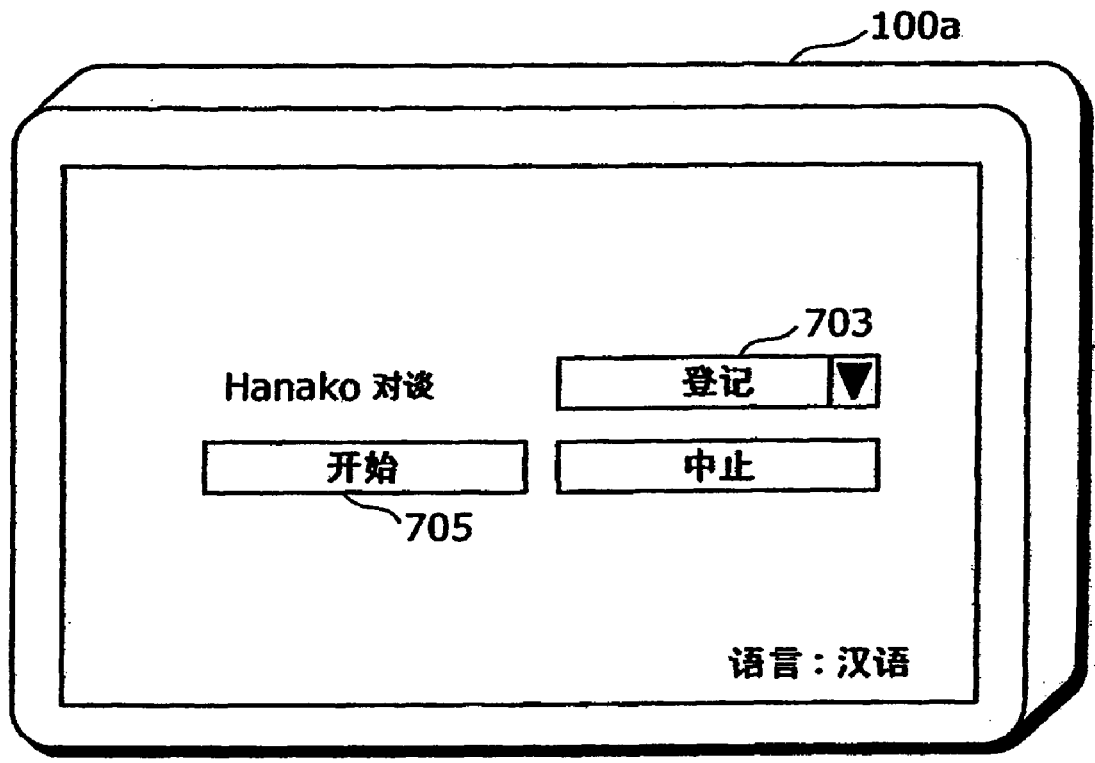
FIGS. 28A and 28B are each a diagram showing a display example of the dialog supporting apparatus of the present invention.
Figure 28B:
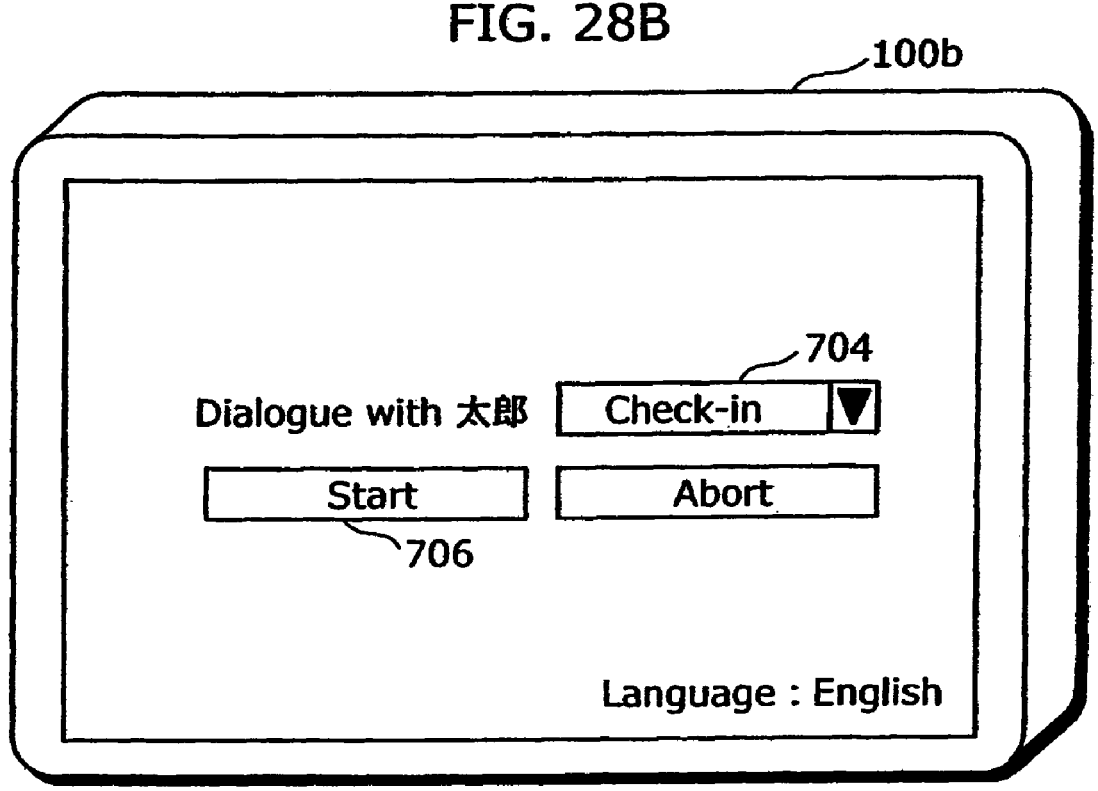

The utterance prediction unit 105a and the utterance prediction unit 105b specify the topic of the dialog in order to search the dialog history database 104a and the dialog history database 104b for the dialog history needed for predicting utterances first (Step S601). The utterance prediction unit 105a searches the dialog history database 104a for the utterance, and the utterance prediction unit 105b searches the dialog history database 104b for the utterance. The dialog participant 1 uses the dialog supporting apparatus 100a realized as a PDA or the like shown in FIG. 28, and the dialog participant 2 uses the dialog supporting apparatus 100b. The information on the topic of the dialog is obtained by allowing each dialog participant to directly input the information on the topic input area 703 and the topic input area 704 of the touch panel.

When the dialog start button 705 and the dialog start button 706 are pressed by the respective dialog participants, the utterance prediction unit 105a selects the dialog history d5 for the dialog participant 1, and the utterance prediction unit 105b selects the dialog history d7 for the dialog participant 2. This is because the topics of the dialogs of the dialog history d5 and the dialog history d7 relate to a hotel. The dialog history d6 and the dialog history d8 are not selected because their topics are different. After that, the utterance prediction unit 105a notifies the dialog history d5 as a first prediction information to the utterance prediction unit 105b, and the utterance prediction unit 105b notifies the dialog history d7 as a second prediction information to the utterance prediction unit 105a.

Likewise, the utterance prediction unit 105a makes a prediction stack using the dialog history d5: E1, C2, E3, C4, E5, C6, E7, E8, and also the utterance prediction unit 105b makes a prediction stack using the dialog history d7: E1, E3, C4, C2, E8, E5, C6, E7 (Step S602). After that, for example, the utterance prediction unit 105a makes the prediction stack C: E1, C2, (E3, C4), (E5, C6, E7), E8, and the utterance prediction unit 105b makes the prediction stack E: E1, (E3, C4), C2, E8, (E5, C6, E7), respectively.

After generating the prediction stack, each of the utterance prediction unit 105a and the utterance prediction unit 105b judges whether or not the prediction stack is empty (Step S603). In the case where the utterance prediction unit 105a or the utterance prediction unit 105b cannot structure any appropriate prediction stack for some reason and the prediction stack is empty (Step S603: YES), the utterance prediction unit 105a or the utterance prediction unit 105b completes the processing without performing utterance prediction operation, and follows the operation of the other party's utterance prediction unit which is the utterance prediction unit 105a or the utterance prediction unit 105b.

Figure 29A:
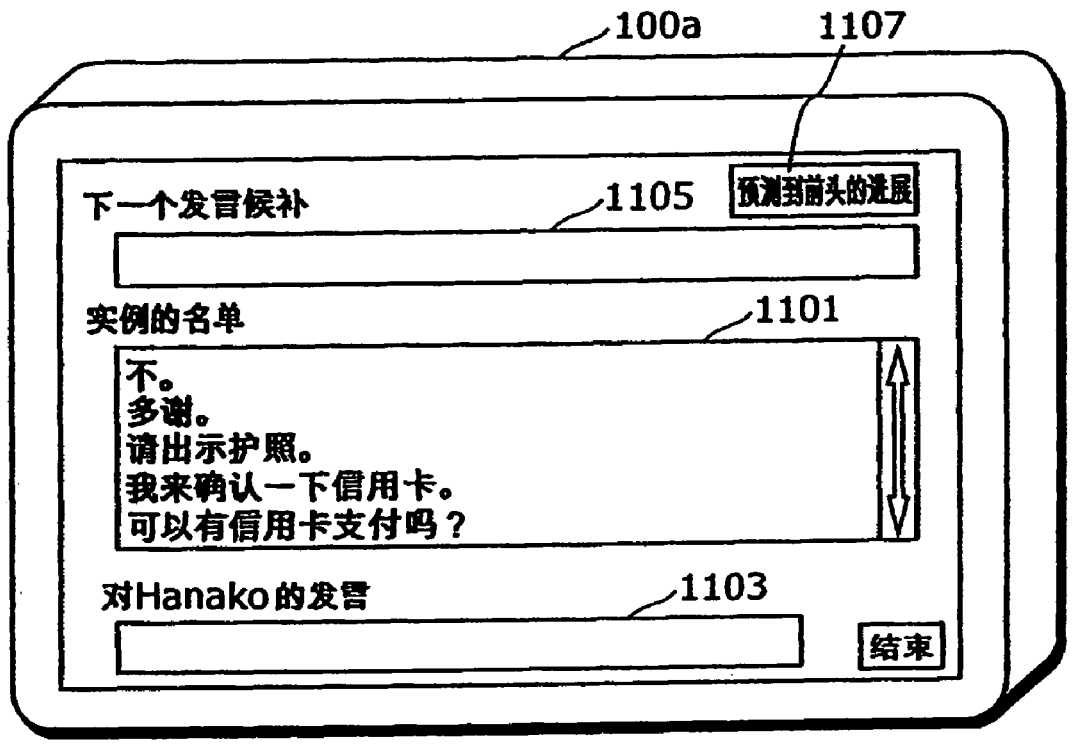
FIGS. 29A and 29B are each a diagram showing a display example of the dialog supporting apparatus of the present invention.
Figure 29B:
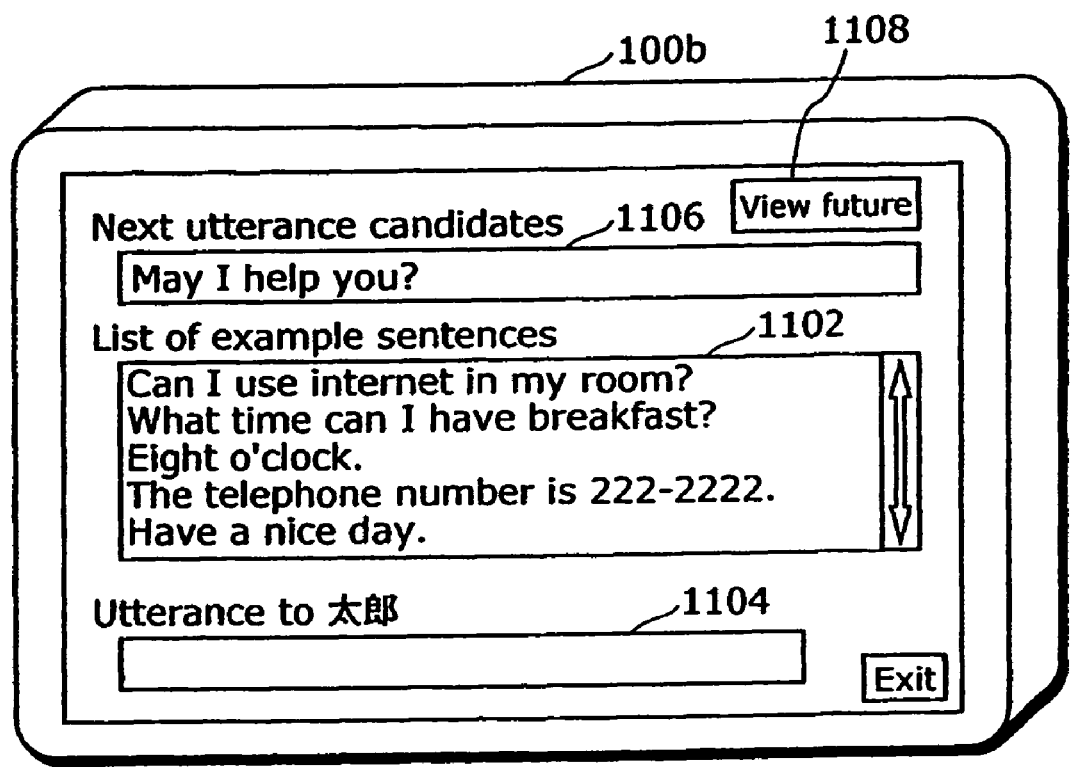

On the other hand, in the case where the prediction stack is not empty (Step S603: NO), the utterance prediction unit 105a and the utterance prediction unit 105b display the opening utterance of the prediction stack as the candidate next utterance (Step S604). FIG. 29 is a diagram showing the status of the display of the dialog supporting apparatus 100 at the time when the dialog is started.

The dialog participant 1 and the dialog participant 2 can select an arbitrary utterance from among all the utterances defined in FIG. 25 and FIG. 26 using the respective example usage list 1101 and example usage list 1102, and notify the utterance to the other dialog participant. The utterance translated by the utterance processing unit 102a is outputted to the utterance output unit 1103 for the dialog participant 2, and the utterance translated by the utterance processing unit 102b is outputted to the utterance output unit 1104 for the dialog participant 1, respectively. After that, these utterances are read out using speech synthesis processing installed in PDAs or the like at the same time when they are displayed. The utterances for the dialog participant 1 predicted by the utterance prediction unit 105a is displayed on the prediction display area 1105, and the utterance for the dialog participant 2 predicted by the utterance prediction unit 105b is displayed on the prediction display area 1106. The dialog participant 1 or the dialog participant 2 can omit the operation for searching an example usage list 1101 or an example usage 1102 for the utterance to be selected, by selecting the utterance displayed on the prediction display area 1105 or the prediction display area 1106, respectively. In other words, the dialog participants 1 and 2 can input utterances immediately.

Figure 30A:
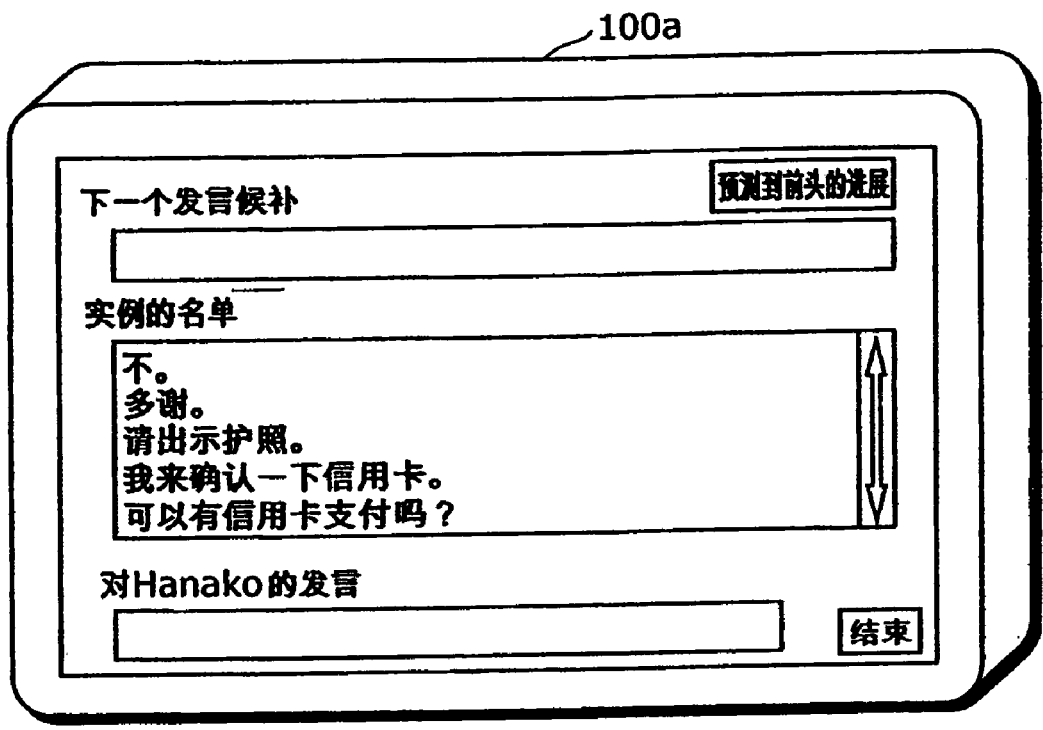
FIGS. 30A and 30B are each a diagram showing a display example of the dialog supporting apparatus of the present invention.
Figure 30B:
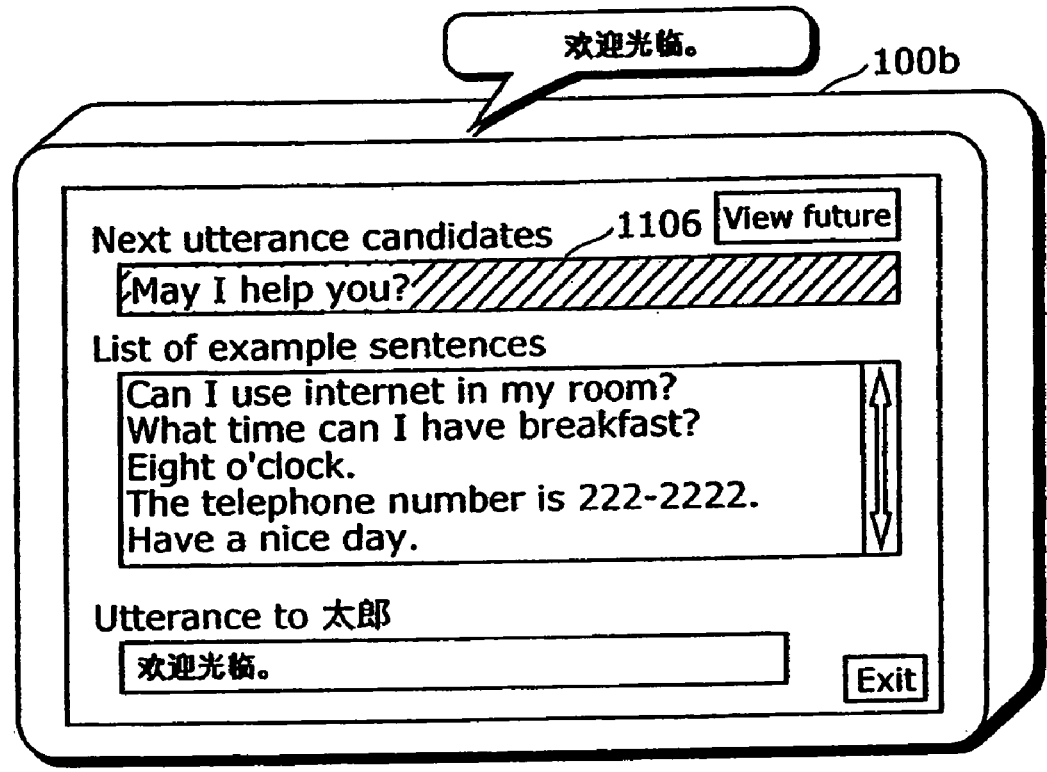

In FIG. 29, the utterance prediction unit 105a and the utterance prediction unit 105b have already completed the display (Step S604) of the candidate next utterance (Step S605). In other words, the utterance prediction unit 105a does not display any prediction candidate on the prediction display area 1105 because the opening utterance of the prediction stack C: E1, C2, (E3, C4), (E5, C6, E7), E8 is for E and thus is not for C. In addition, the utterance prediction unit 105b displays the utterance E1 of "May I help you?" on the prediction display area 1106 as a prediction candidate for the dialog participant 2 because the opening utterance of the prediction stack E: E1, (E3, C4), C2, E8, (E5, C6, E7) is for E and thus available. The dialog participant 2 may select an utterance in the example usage list 1102. However, since a desired utterance has already been displayed on the prediction display area 1106, the dialog participant 2 selects a prediction candidate as shown in FIG. 30. The utterance E1 is translated into Chinese by the utterance processing unit 102b and the utterance of 「いらっしゃいませ。」is notified to the dialog participant 1.

At this time, the utterance prediction unit 105a and the utterance prediction unit 105b judge whether or not the utterance is inputted by a dialog participant (Step S605). When the utterance is inputted by the dialog participant (Step S605: YES), the utterance prediction unit 105a and the utterance prediction unit 105b search the prediction stacks for a matching utterance starting with the opening utterances (Step S606), and judges whether or not there is a matching utterance (Step S607). In the case where there is a matching utterance (Step S607: YES), the utterance prediction unit 105a and the utterance prediction unit 105b judge whether or not the matching utterance is the opening utterances of the prediction stacks (Step S608). In the case where it is the opening utterance (Step S608: YES), each of them deletes the opening utterance of the prediction stack so as to update the prediction stack (Step S609). After that, in the case where utterance blocks which can be combined with each other emerge after the utterance is deleted, it combines the utterance blocks which can be combined in the prediction stack (Step S611). On the other hand, in the case where the utterance is not the opening utterance (Step S608: NO), it moves the block including the matching utterance to the opening part of the prediction stack, deletes the matching utterance and the utterances placed before the matching utterance so as to update the prediction stack (Step S610). After that, the utterance prediction unit 106 returns to the processing of judging whether or not the prediction stack is empty (Step S603).

Figure 31A:
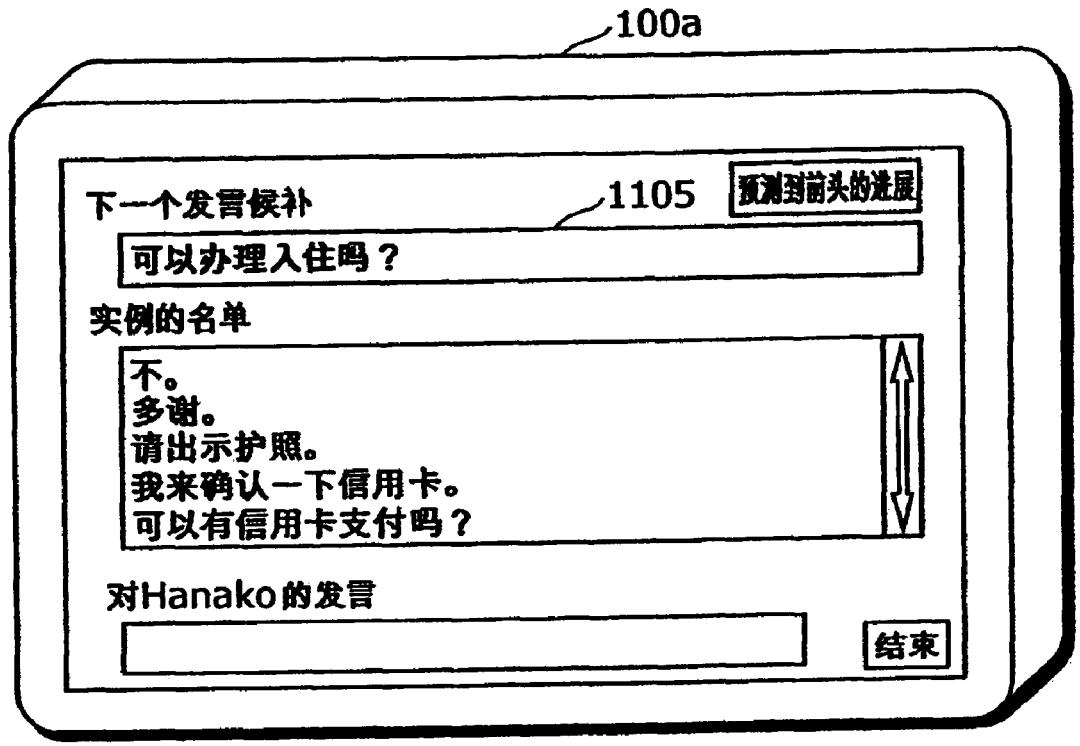
FIGS. 31A and 31B are each a diagram showing a display example of the dialog supporting apparatus of the present invention.
Figure 31B:
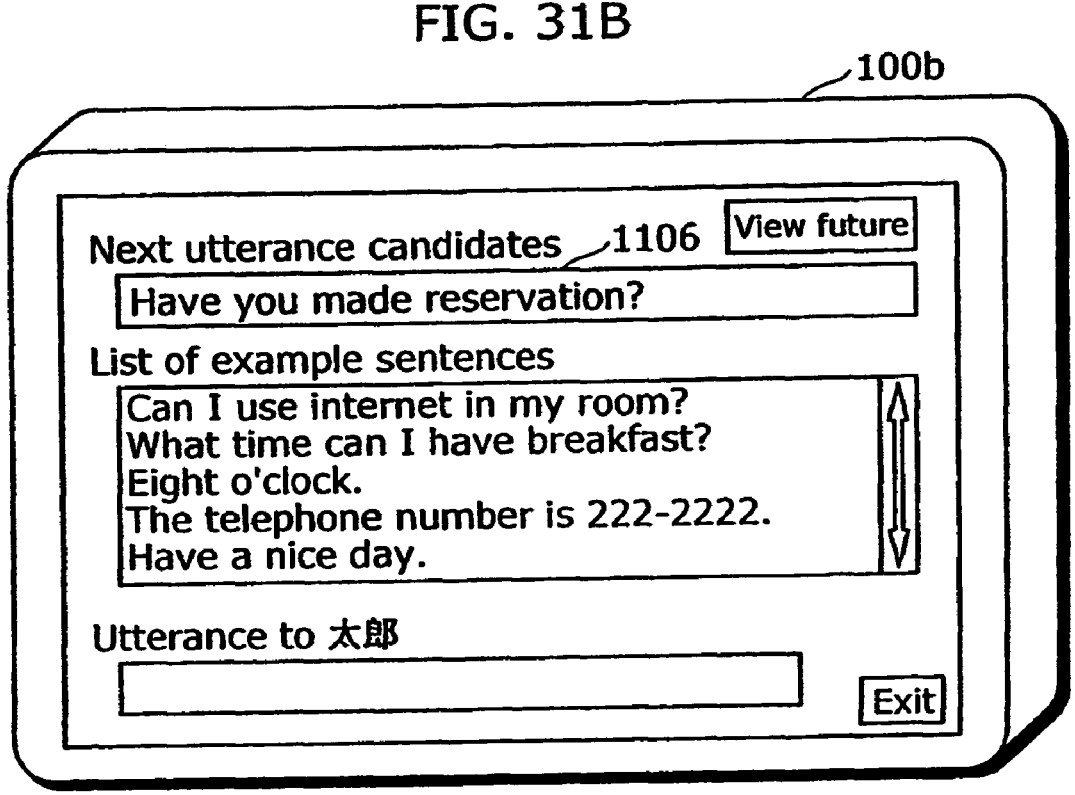

Since the utterance of a dialog participant is E1 in the above example, the respective utterance prediction units 105a and 105b delete the utterance E1 which is the opening utterance of the prediction stacks so as to update the prediction stacks to the prediction stack C: C2, (E3, C4), (E5, C6, E7), E8 and the prediction stack E: (E3, C4), C2, E8, (E5, C6, E7), respectively. Note that the prediction stack C: C2, (E3, C4), (E5, C6, E7), and E8 and the prediction stack E: (E3, C4), C2, E8, and (E5, C6, E7) do not change. This is because no utterance blocks which can be combined are present in the prediction stacks. Since the prediction stack is still not empty, the utterance prediction unit 105a assumes the utterance C2 to be a prediction candidate. Here, the utterance C2 is the opening utterance of the prediction stack C: C2, (E3, C4), (E5, C6, E7), and E8. In other words, the utterance prediction unit 105a displays the utterance C2 of 可以办理入住吗？ on the prediction display area 1105 as shown in FIG. 31. In addition, the utterance prediction unit 105b assumes the utterance E3 which is the opening utterance of the prediction stack E: (E3, C4), C2, E8, (E5, C6, E7) as the prediction candidate, and displays the utterance E3 of "Have you made reservation?" on the prediction display area 1106. The utterance prediction unit 105a and the utterance prediction unit 105b wait for the utterance from one of the dialog participants, respectively.

The dialog participant 1 or the dialog participant 2 may select an utterance from the example usage list 1101 or the example usage list 1102. However, desired utterances have already been displayed on the prediction display area 1105 or the prediction display area 1106. Therefore, it is good for them to select an utterance from among the prediction candidates. In the case where the dialog participant 2 selected the prediction area 1106 earlier than the time when the dialog participant 1 selects the prediction area 1105 or the like, the utterance E3 is transformed into Chinese by the utterance processing unit 102b and the utterance of「您预定过了吗?」 is notified to the dialog participant 1. Here, the utterance E3 from the dialog participant is not present in the opening utterance block of the prediction stack C: C2, (E3, C4), (E5, C6, E7), and E8. Therefore, the utterance prediction unit 105a makes the prediction stack C into C: (E3, C4), C2, (E5, C6, E7) and E8 (Step S610), and updates the prediction stack C to C: C4, C2, (E5, C6, E7) and E8 (Step S609). On the other hand, the utterance E3 from the dialog participant is present in the opening utterance block of the prediction stack E: (E3, C4), C2, E8, (E5, C6, E7), and the utterance prediction unit 105b updates the prediction stack E to E: C4, C2, E8, and (E5, C6, E7). At this time, successive utterances of C4 and C2 are commonly included in the prediction stacks (Step S611). Thus, the utterance prediction unit 105b updates the prediction stack C to C: (C4, C2), (E5, C6, E7), and E8, and the prediction stack E to E: (C4, C2), E8, and (E5, C6, E7) by combining these utterances of C4 and C2 with each other and including them in an utterance block.

Figure 33A:
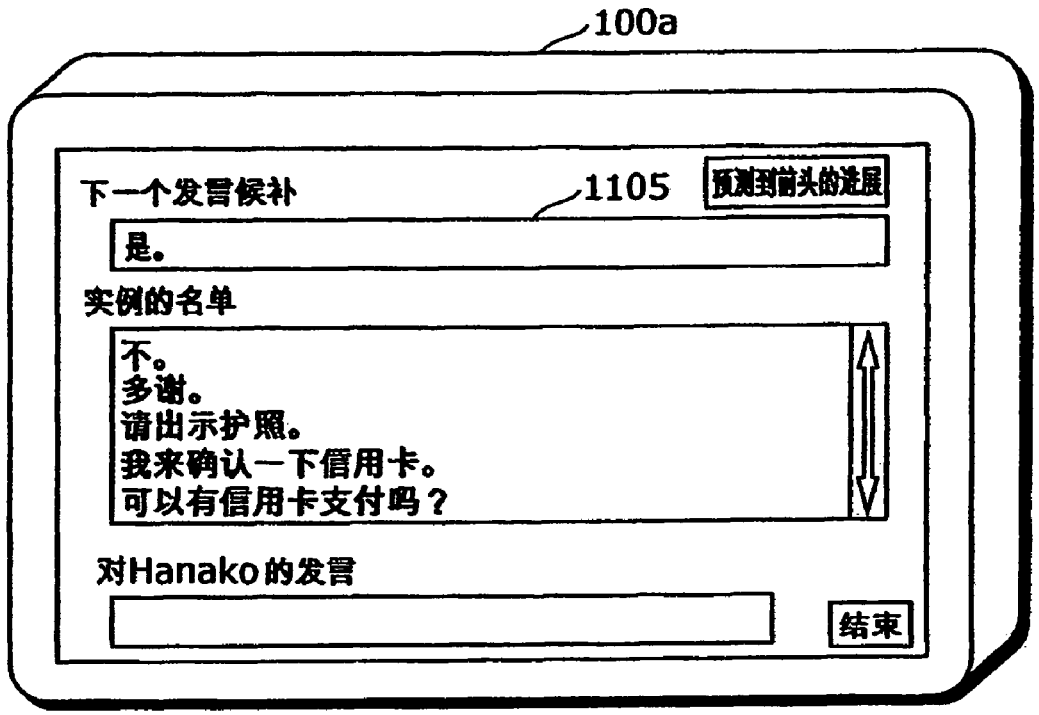
FIGS. 33A and 33B are each a diagram showing a display example of the dialog supporting apparatus of the present invention.
Figure 33B:
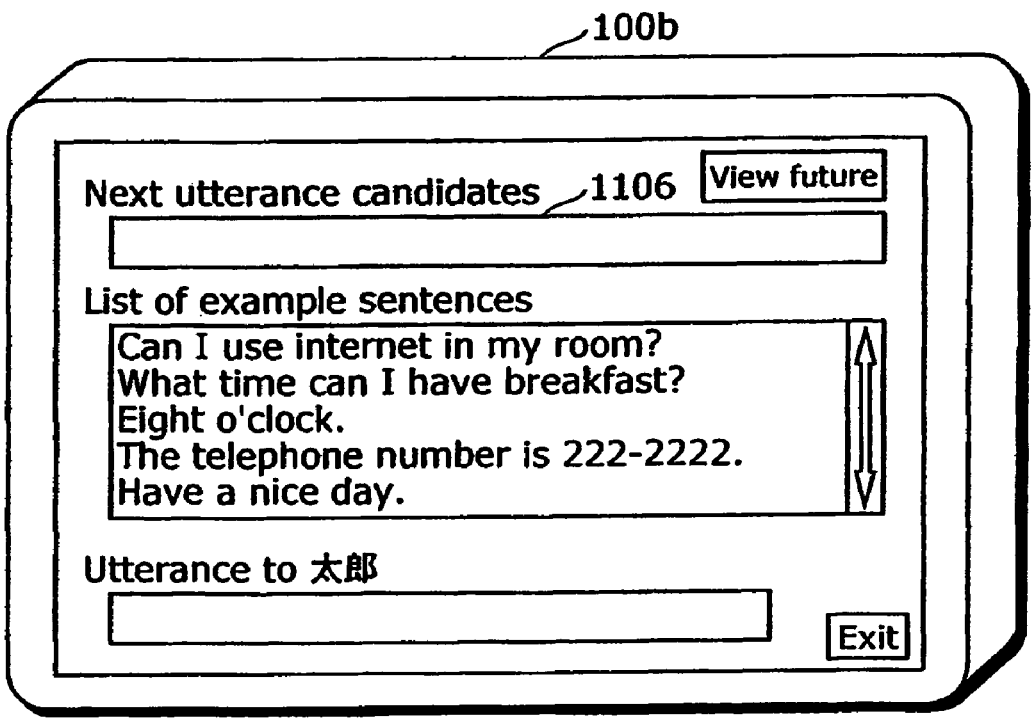

Likewise, since the prediction stack C has been updated to C: (C4, C2), (E5, C6, E7) and E8, and the prediction stack E has been updated to E: (C4, C2), E8 and (E5, C6, E7), the utterance prediction unit 105a displays the candidate prediction utterance C4 of「是」 on the prediction display area 1105 as shown in FIG. 33. The utterance prediction unit 105b does not display any prediction candidate on the prediction display area 1106 because it is for the other dialog participant.

Figure 34A:
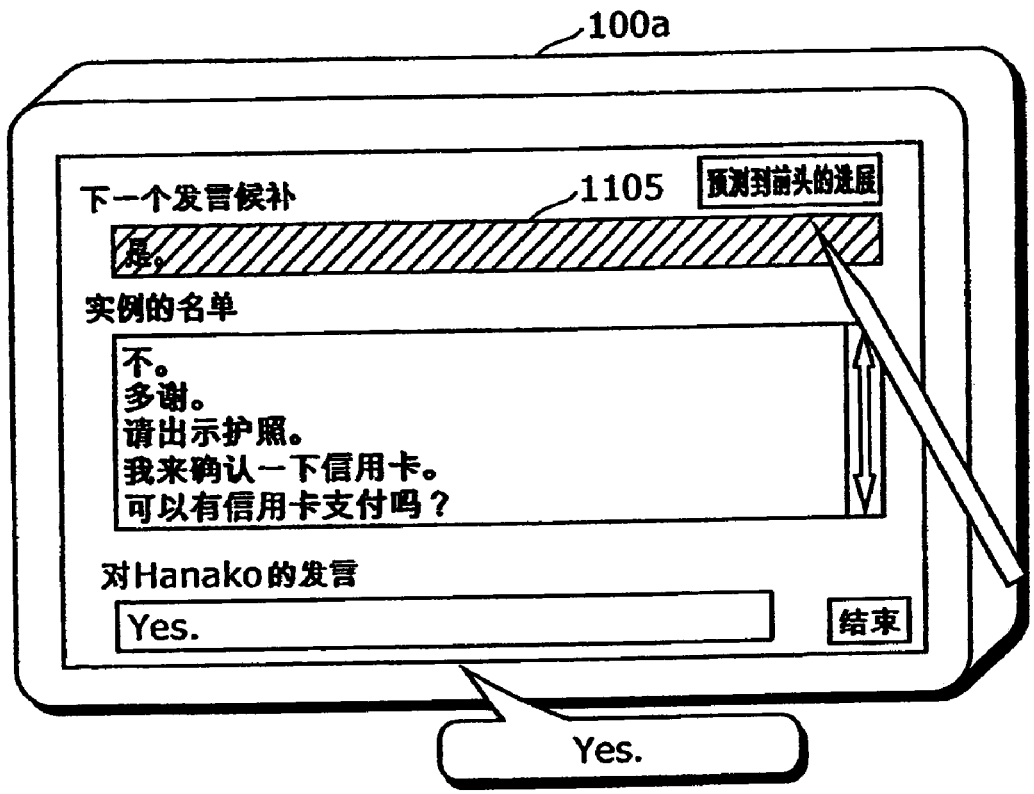
FIGS. 34A and 34B are each a diagram showing a display example of the dialog supporting apparatus of the present invention.
Figure 34B:
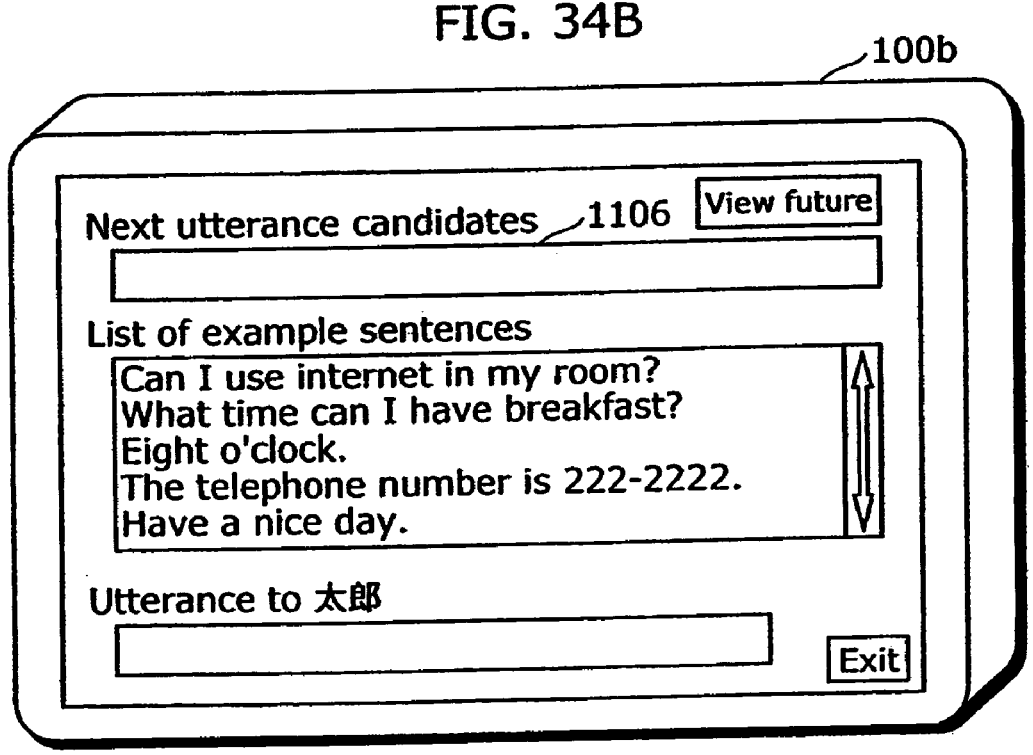
Figure 35A:
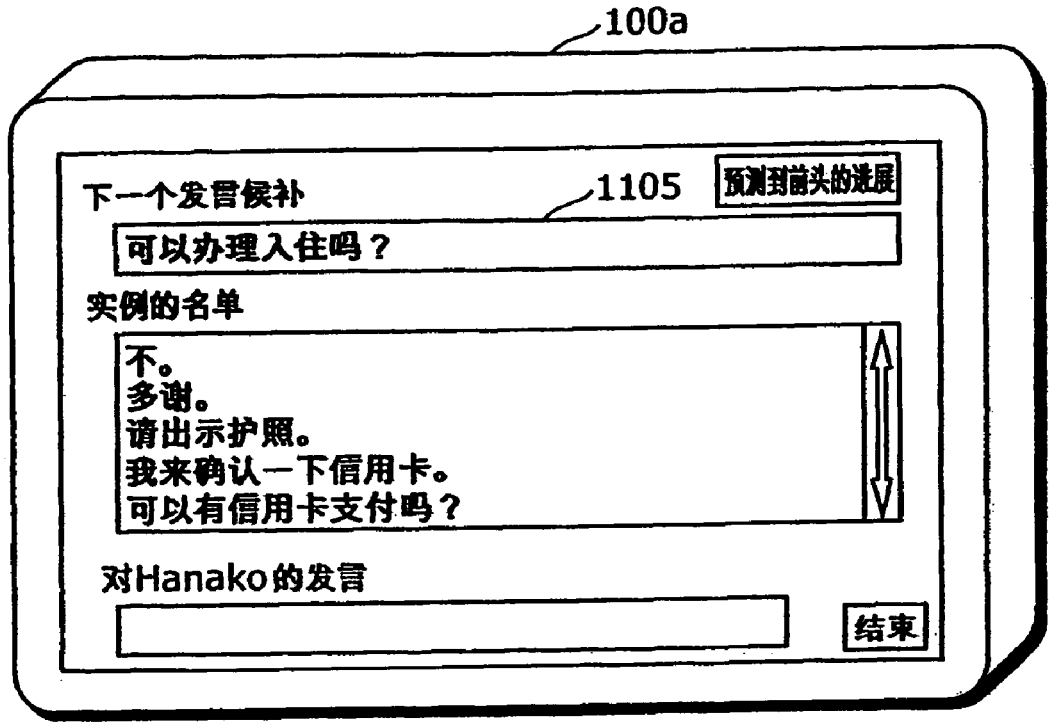
FIGS. 35A and 35B are each a diagram showing a display example of the dialog supporting apparatus of the present invention.
Figure 35B:
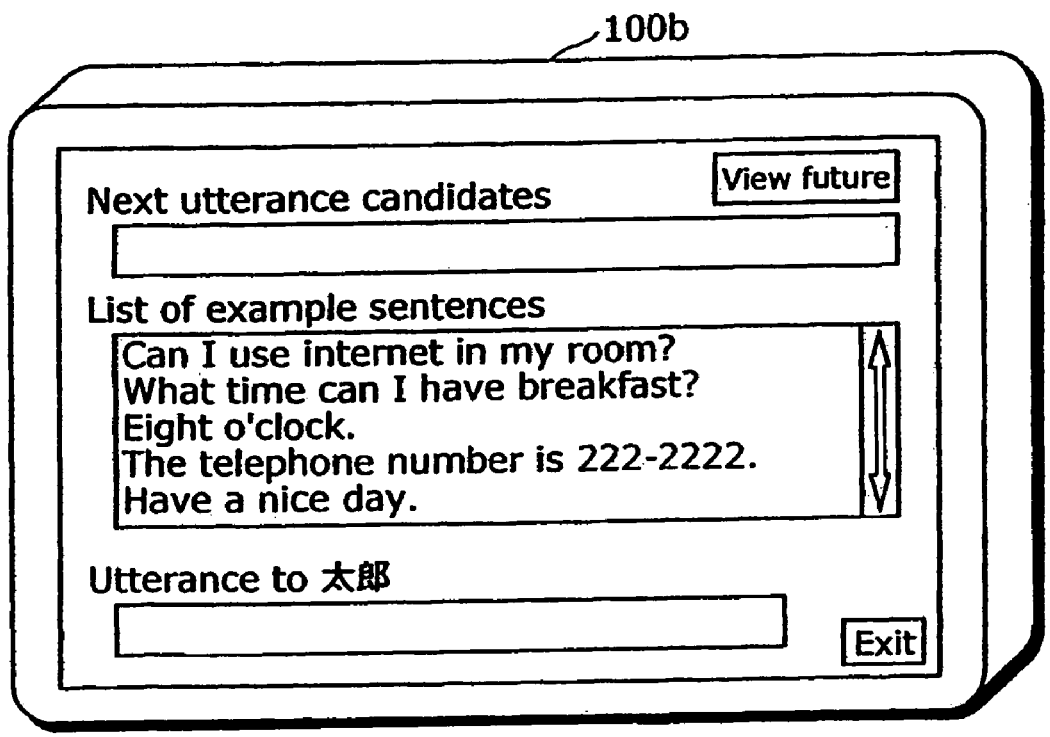

The dialog participant 1 may select an utterance in the example usage list 1101. However, desired utterances have already been displayed on the prediction display area 1105. When the prediction display area 1105 is selected as shown in FIG. 34, the utterance C4 is translated into English by the utterance processing unit 102a, and the utterance of "Yes" is notified to the dialog participant 2. Likewise, the utterance prediction unit 105a updates the prediction stack C to C: C2, (E5, C6, E7) and E8, and displays the utterance C2 of 可以办理入住吗？ on the prediction display area 1105 as shown in FIG. 35. On the other hand, the utterance prediction unit 105b updates the prediction stack E to E: C2, E8, (E5, C6, E7), but does not display anything on the prediction display unit 1106. In this way, the dialog participant 1 or the dialog participant 2 do not have to search the example usage list 1101 or the example usage list 1102 for a desired utterance, and they can notify their intentions to each other immediately. Therefore, the time to complete the dialog is reduced.

Figure 32A:
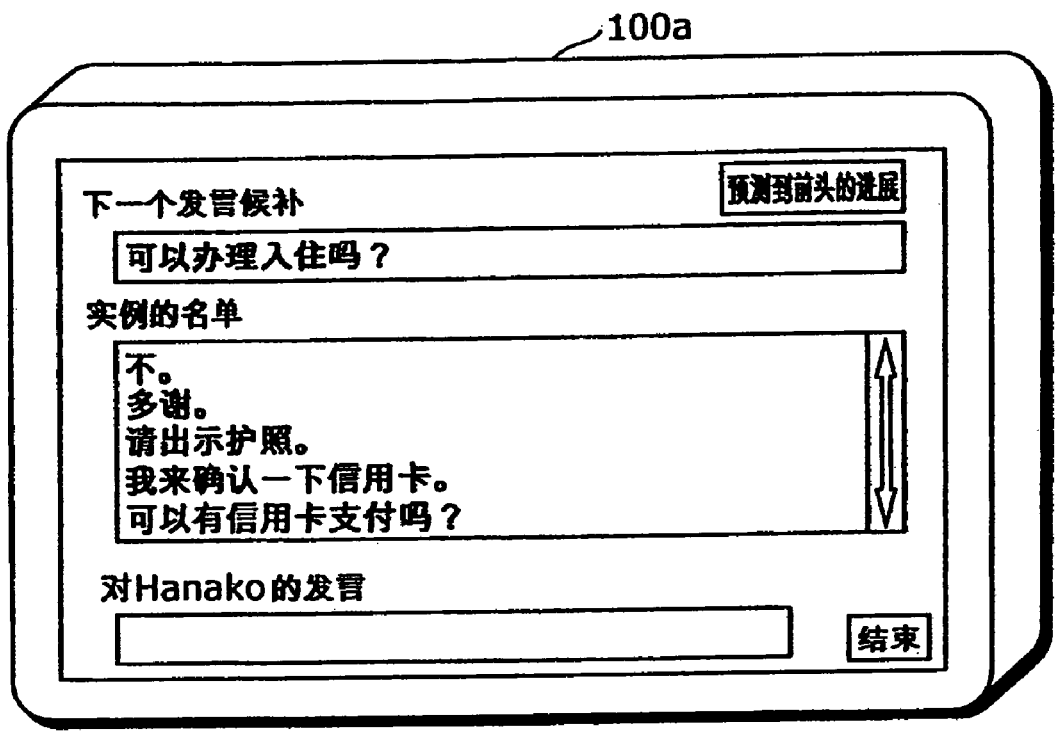
FIGS. 32A and 32B are each a diagram showing a display example of the dialog supporting apparatus of the present invention.
Figure 32B:
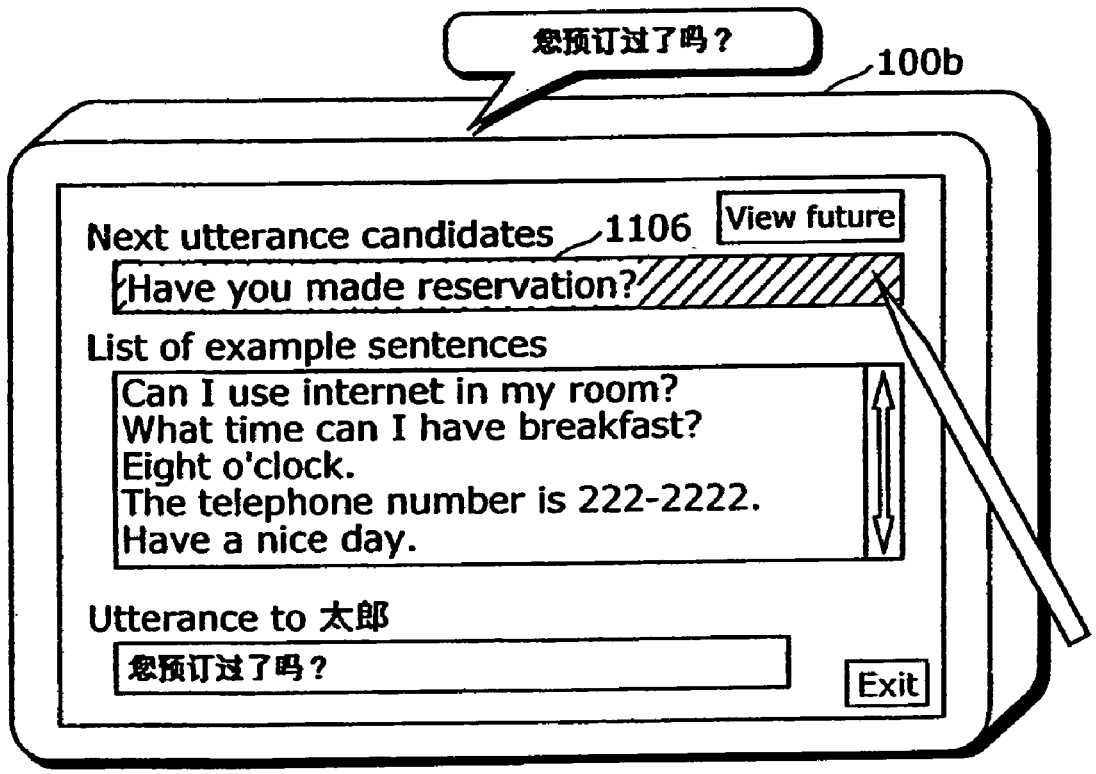
Figure 36:
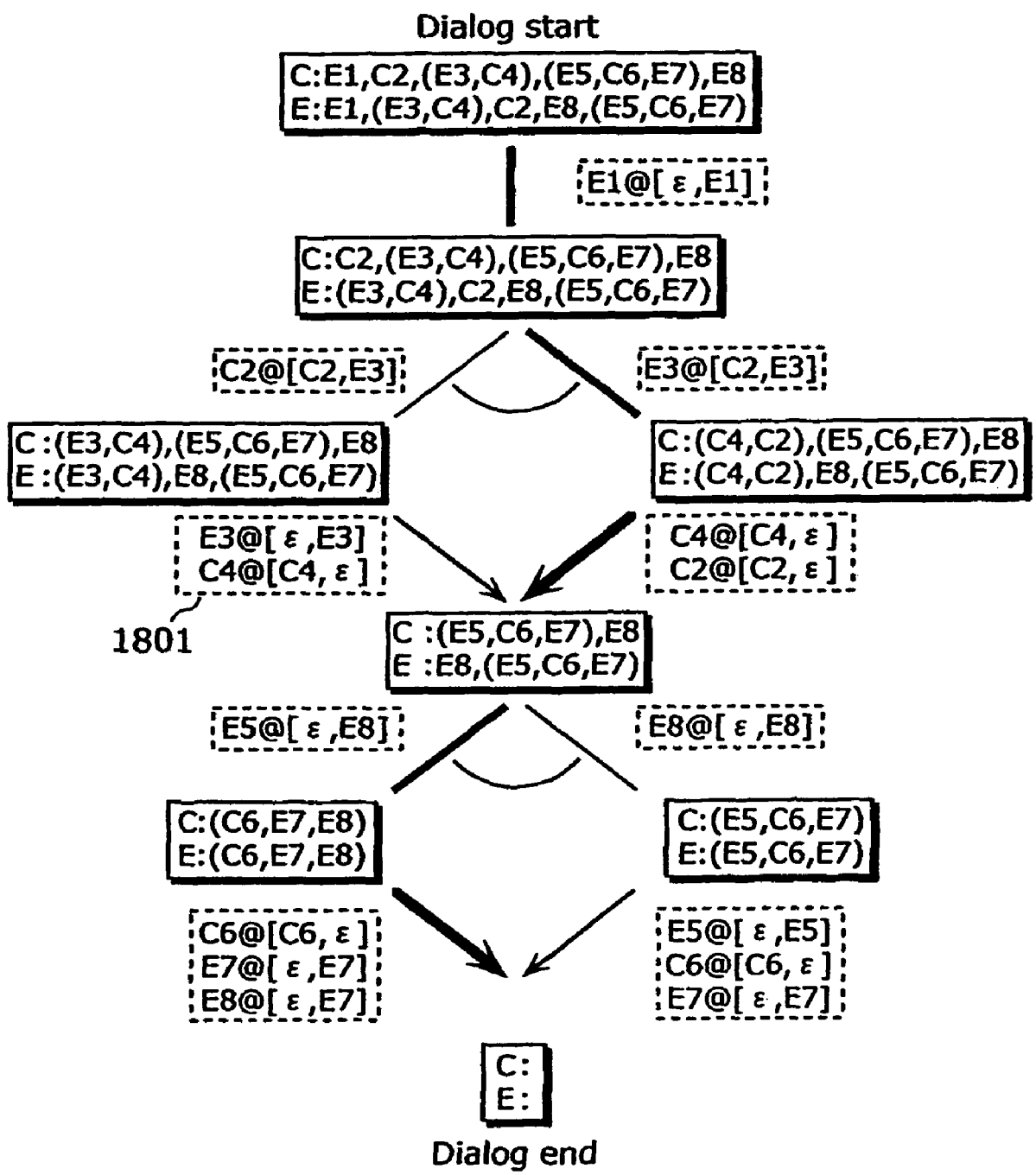
FIG. 36 is a schematic diagram of an on-going dialog supported by the present invention.

Next, the effect which is obtained also in the case of Chinese and English as well as the above-described case of Japanese and English will be described in an objective manner. FIG. 36 is a schematic diagram of an on-going dialog (in the case of Chinese and English) supported by the dialog supporting apparatus 100 of the embodiment. The interpretation of the figure is the same as the interpretation of FIG. 19. For example, the dotted rectangle 3601 shows that nothing was displayed as a prediction candidate on the prediction display area 1105, the utterance E3 of "Have you made reservation?" was displayed on the prediction display area 1106, and thus the dialog participant 2 inputted the utterance E3. After that, the utterance C4 of「是」 was displayed on the prediction display area 1105, after that nothing is displayed on the prediction display area 1106, and thus the dialog participant 1 inputted the utterance C4. FIG. 36 also shows that prediction candidates change depending on the utterance that a dialog participant inputs. In particular, diversion of arrows shows that the dialog participant selected plural utterances from among the prediction candidates, and inputted these utterances. For example, the diversion of arrows 3602 is a divergence point of the dialog, and these arrows respectively show the case where the dialog participant 1 inputted the utterance C2 of 可以办理入住吗？ earlier than the time when the dialog participant 2 inputs the utterance E3 while the utterance E3 of "Have you made reservation?" is displayed on the prediction display area 1106, and the case where the dialog participant 2 inputted the utterance E3 earlier than the time when the dialog participant 1 inputs the utterance C2 while the utterance E3 of "Have you made reservation?" is displayed on the prediction display area 1106 also. An example to be taken here is an advancement pattern of a dialog which advances along with the bold arrow among plural advancement patterns of the dialog. In this case, a dialog f shown in FIG. 37 is made between the dialog participants. Since the dialog f is not present in the dialog history database shown in FIG. 32, the dialog f is a newly generated dialog history.

Figure 38:
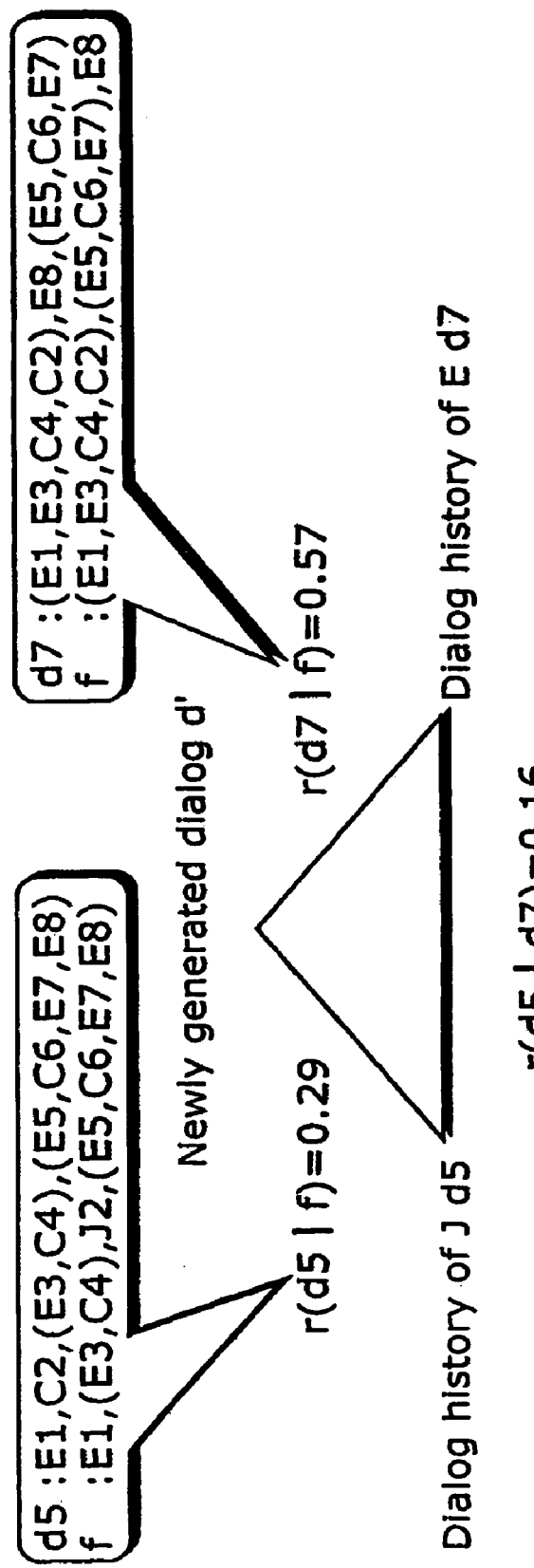
FIG. 38 is a diagram showing the degrees of similarity of dialog histories when compared to each other.

As shown in FIG. 38, the degree of similarity of the dialog history d5 and the dialog history d7 before the dialog participants start to make the dialog f is 0.16. However, the degrees of similarity with respect to the dialog f made by being supported by the present invention are 0.29 in the case of the dialog history d5 and 0.57 in the case of the dialog history d7. Therefore, it is obvious that the dialog was made more smoothly than making a dialog by making one of the dialog participants use a dialog history of the other dialog participant.

Figure 39:
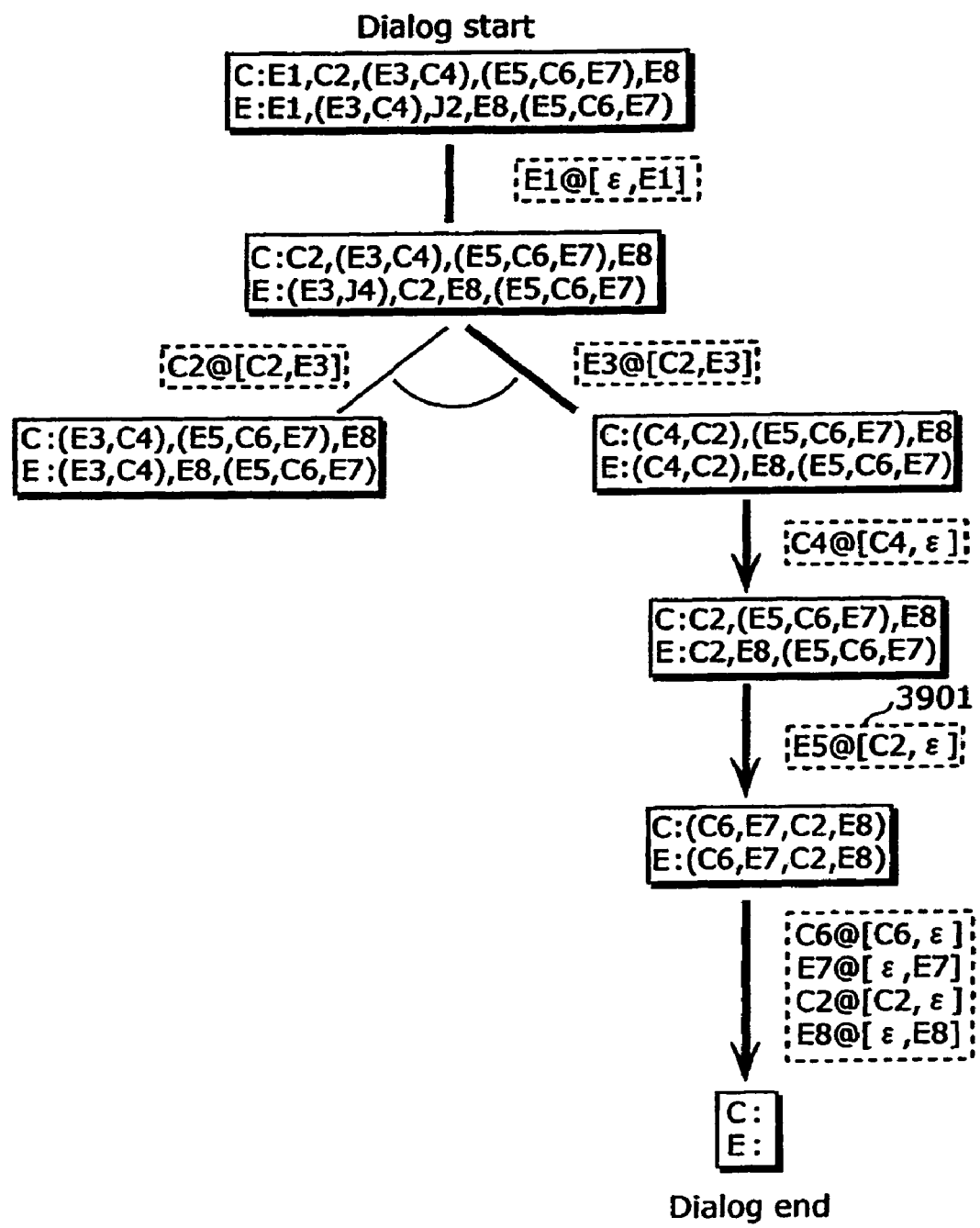
FIG. 39 is a schematic diagram of an on-going dialog supported by the present invention.

The thing shown next is that the present invention has an effect even in the case where dialog participants continue a dialog without selecting a part of prediction candidates. FIG. 39 is a schematic diagram of an on-going dialog (in the case of Chinese and English) supported by the dialog supporting apparatus 100 of the embodiment. The interpretation of the figure is the same as the interpretation of FIG. 19. For example, the dotted rectangle 3901 shows that a prediction candidate C2 was displayed on the prediction display area 1105 and dialog participant 2 inputted an utterance E5 selected in the example usage list 1102, although nothing was displayed on the prediction display area 1106. The dialog advanced along with the bold arrow is a dialog f' shown in FIG. 40A. Since the dialog f' is not present in the dialog history database shown in FIG. 32, the dialog f' is a newly generated dialog history.

Figure 40:
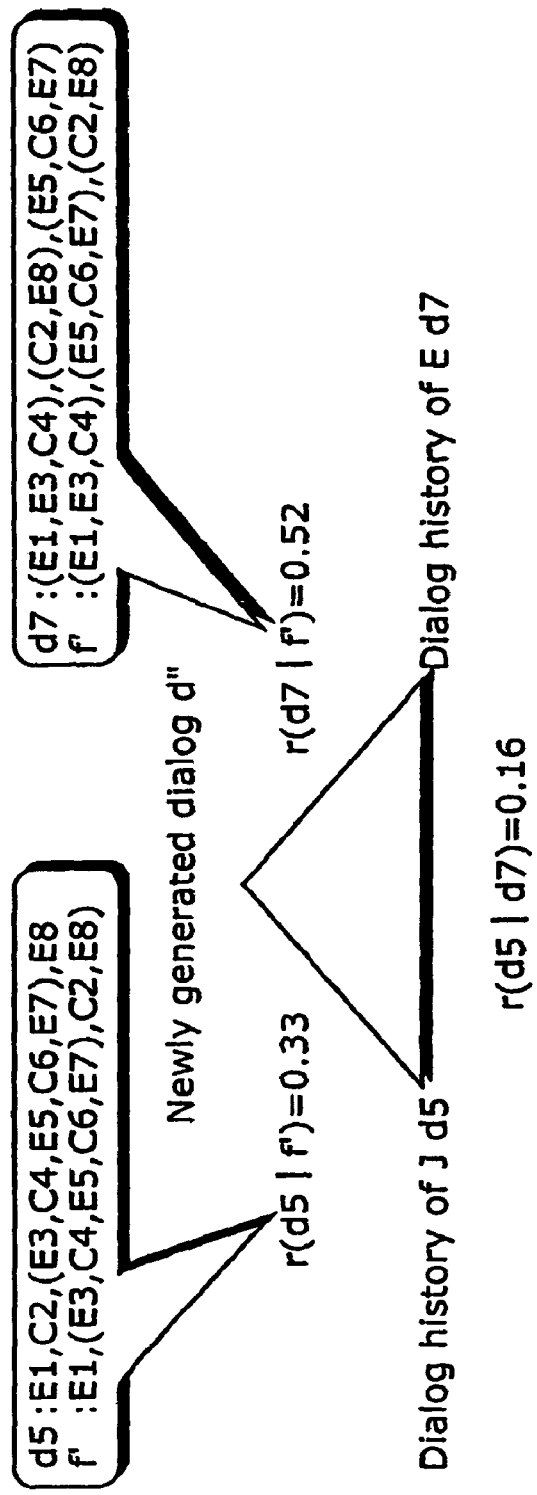
FIG. 40A is a diagram showing the newly generated dialog f"
FIG. 40B is a diagram showing the degrees of similarity of dialog histories when compared with each other.

As shown in FIG. 40, the degree of similarity of the dialog history d5 and the dialog history d7 before the dialog participants start to make the dialog f' is 0.16. However, the degrees of similarity with respect to the made dialog are 0.33 in the case of the dialog history d5 and 0.52 in the case of the dialog history d7. Therefore, it is obvious that the dialog was made more smoothly than making a dialog by making one of the dialog participants to use a dialog history of the other dialog participant, although the dialog participants do not use a part of prediction candidates. In this way, the present invention can predict the development of a dialog as much as possible even in the case where a dialog participant disregards a part of the prediction candidates. Therefore, the present invention enables to provide the dialog participants with flexibility in a dialog and support the flexible dialog.

Note that the dialog supporting apparatus can be configured so that it has a history registration unit in addition to the configuration shown in FIG. 1, all the pieces of utterance information made between the dialog participants are stored in its utterance processing unit, and the utterance information is moved from the utterance processing unit to the dialog history database for storage at the time when the dialog is completed. This makes it possible to automatically increase the number of dialog histories which are effective for future utterance prediction. For example, a dialog d' or a dialog d" are, respectively, stored in the dialog history database 104a and the dialog history database 104b. In particular, in the case where a dialog is made without following a prediction by the utterance prediction unit, the dialog is not present in the dialog history database in many cases. Thus, storing the dialog makes it possible to perform the next utterance prediction more accurately.

Figure 41:
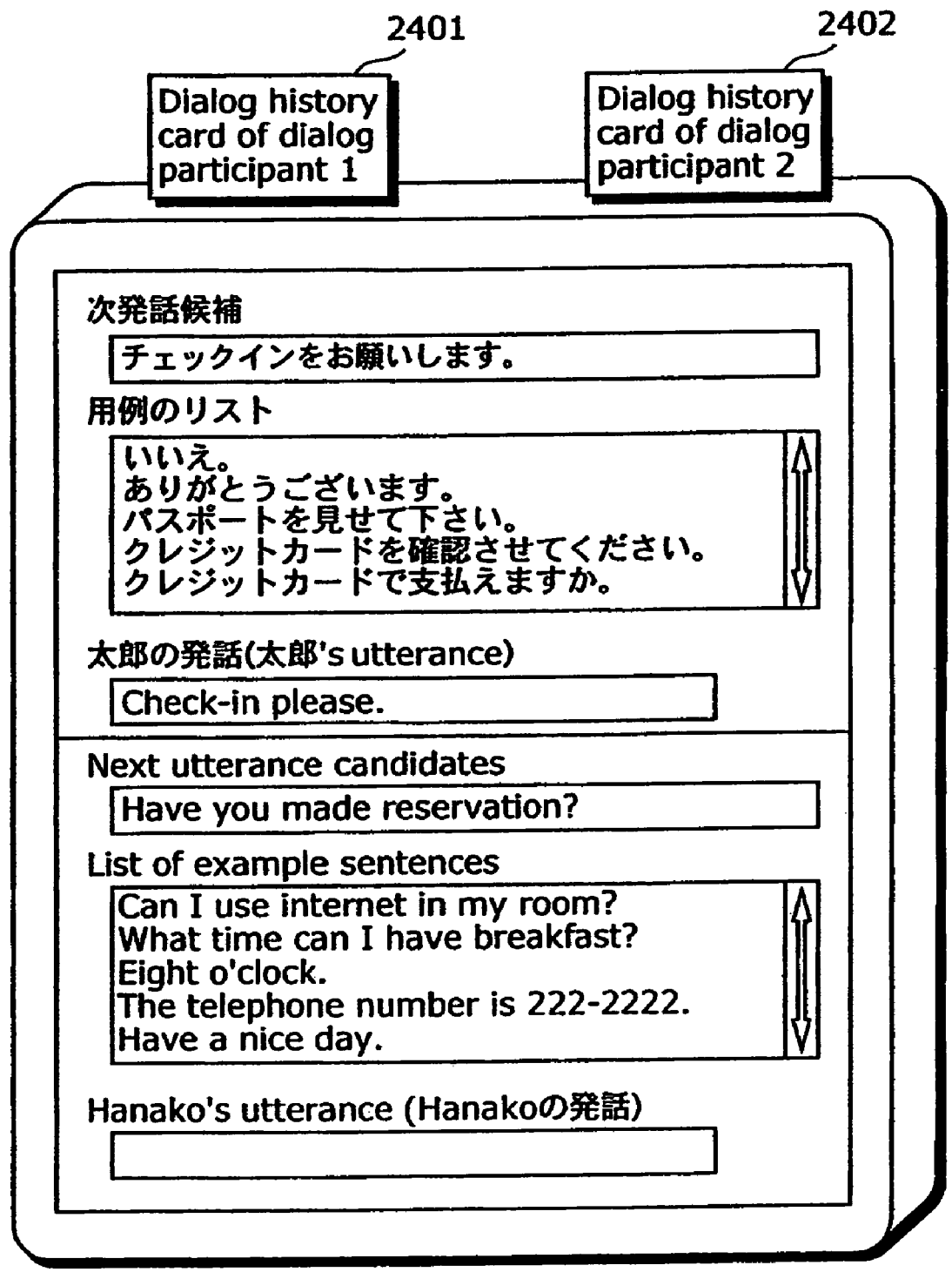
FIG. 41 is a diagram showing the dialog supporting apparatus shared between the dialog participants.
Figure 42:
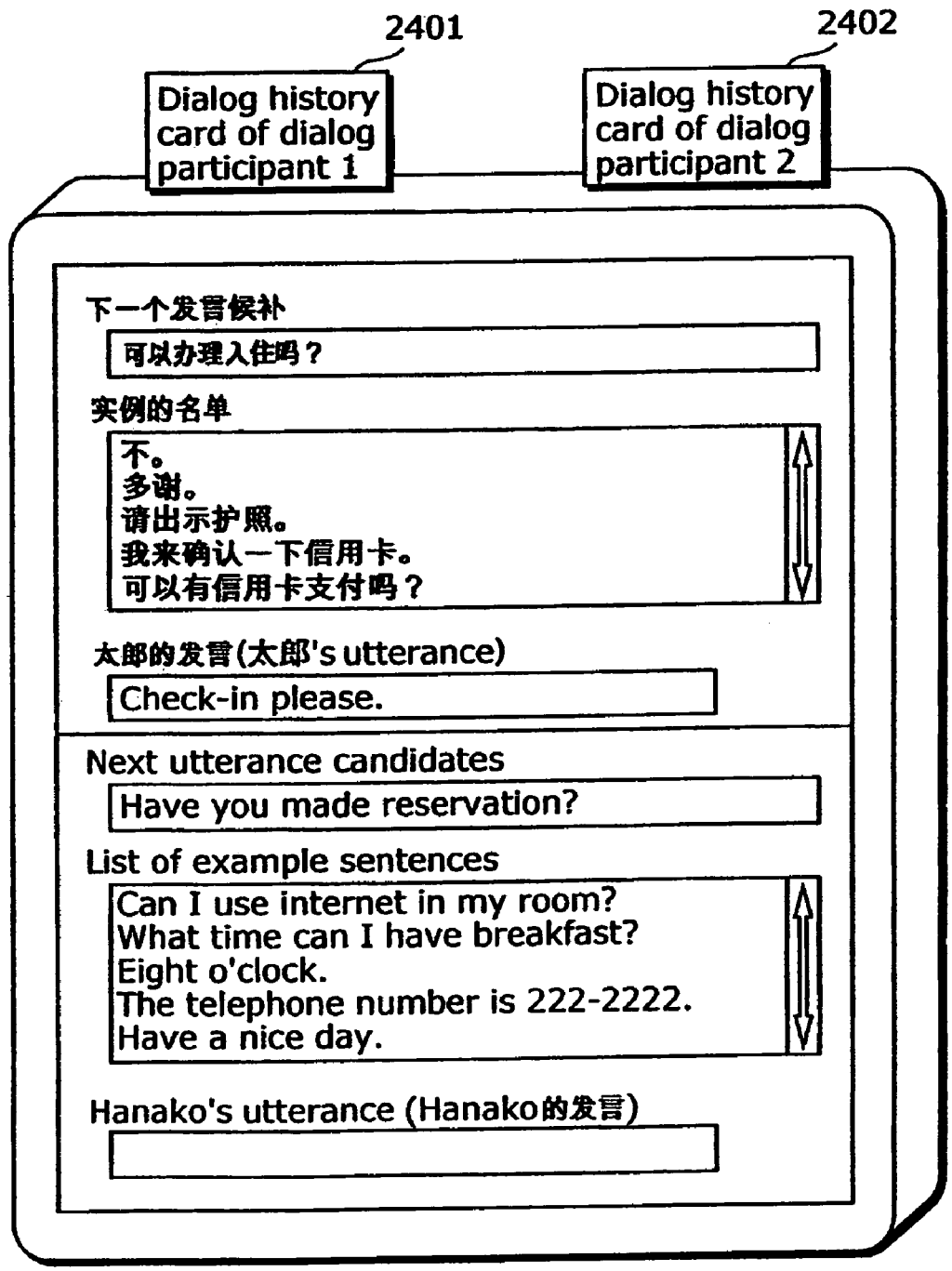
FIG. 42 is a diagram showing the dialog supporting apparatus shared between the dialog participants.
Figure 43:
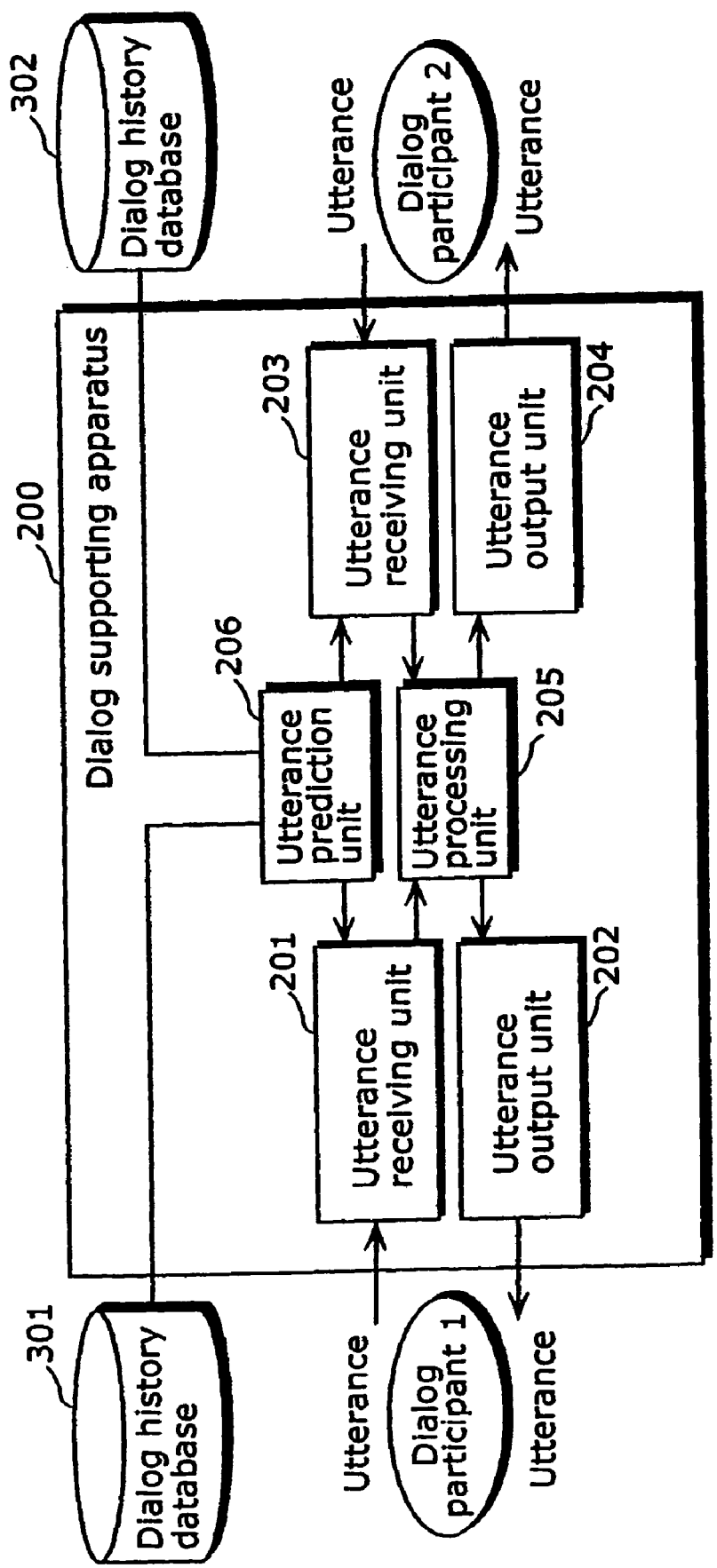
FIG. 43 is a block diagram showing the configuration of a variation of the embodiment of the dialog supporting apparatus of the present invention.

In addition, the dialog supporting system can be configured so that one dialog supporting system is shared with the dialog participants as shown in FIG. 41 and FIG. 42. It is possible to insert a memory card 2401 and a memory card 2402 into the dialog supporting apparatus and use them as dialog history databases. FIG. 43 is a diagram showing the configuration of the embodiment of the dialog supporting apparatus in this case. More specifically, FIG. 43 shows a dialog supporting apparatus 200 including an utterance receiving unit 201, an utterance output unit 202, an utterance receiving unit 203, an utterance output unit 204, an utterance processing unit 205, and an utterance prediction unit 206. Dialog history database 301 and dialog history database 302 each communicate with utterance prediction unit 206. Dialog history databases may be configured as memory cards as shown in FIG. 41 and FIG. 42, or as databases on the network which is accessible via a communication circuit. To realize a configuration like in FIG. 43 makes it possible to use hardware of the dialog supporting apparatus as a public apparatus.

Figure 44:
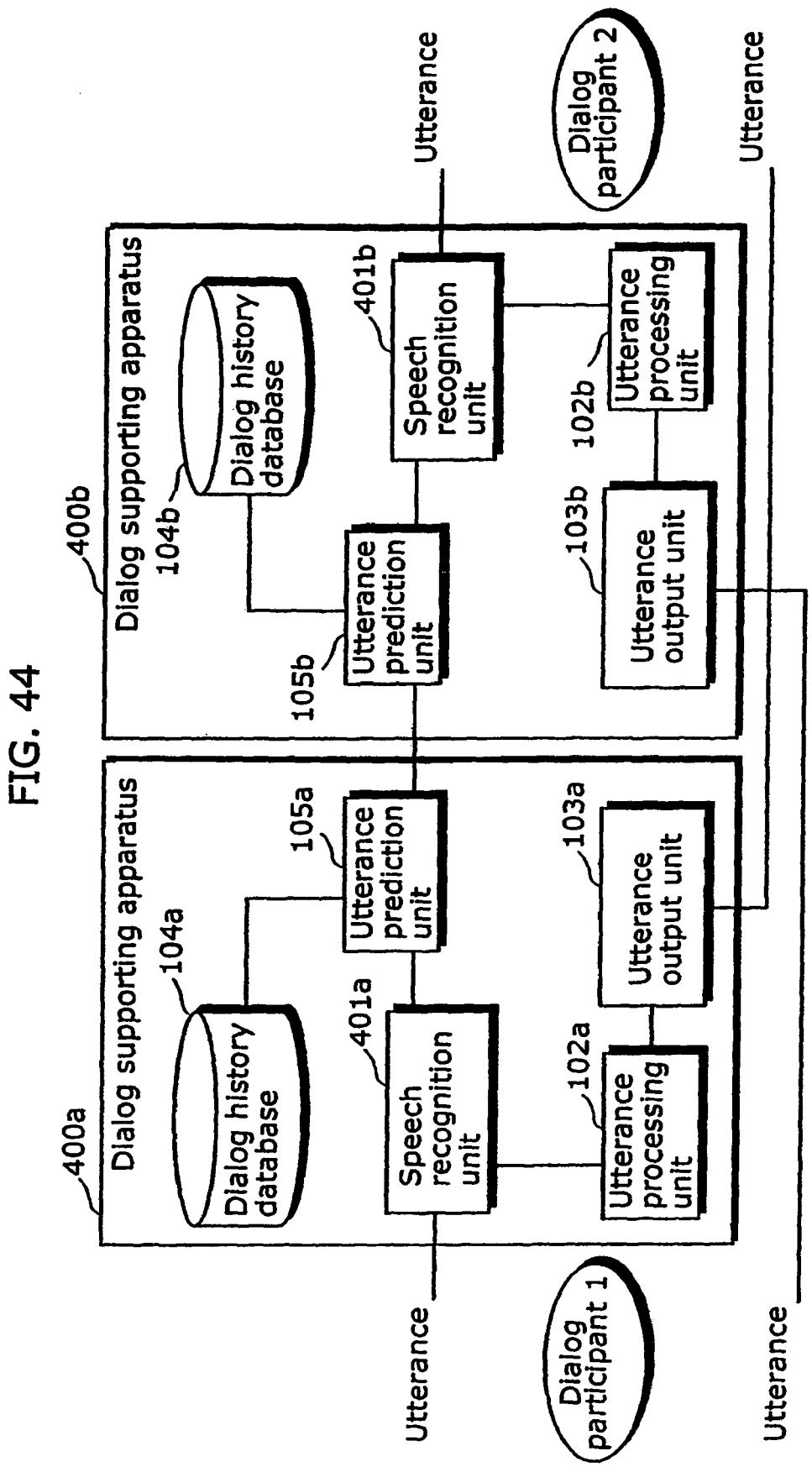
FIG. 44 is a block diagram showing the configuration of a variation of the embodiment of the dialog supporting apparatus of the present invention.

In addition, dialog supporting apparatuses can be configured to have a speech recognition unit 401a and a speech recognition unit 402b, respectively, shown in FIG. 44, instead of the utterance receiving unit 101a and the utterance receiving unit 101b. In this case, it becomes possible to improve the accuracy of speech recognition by preferably handling the vocabularies relating to utterances to be predicted by the utterance prediction unit 105a and the utterance prediction unit 105b, among the vocabularies stored in the speech recognition unit 401a and the speech recognition unit 401b. Relating vocabularies may be the following: the prediction utterances themselves to be outputted by the utterance prediction unit 105a and the utterance prediction unit 105b; sentences which are similar to the prediction utterances; words included in the prediction utterances; and words associating with the prediction utterances.

Figure 45:
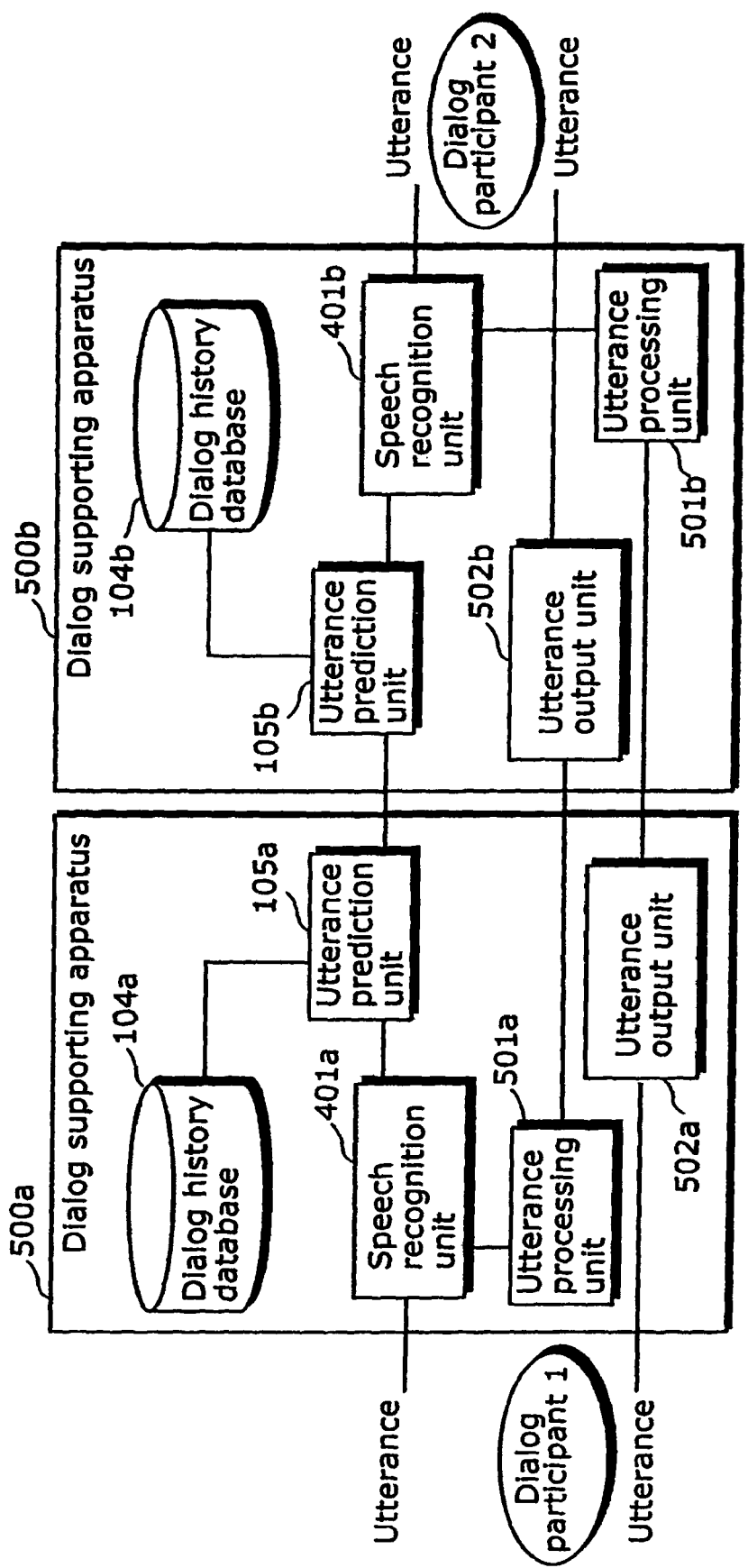
FIG. 45 is a block diagram showing the configuration of a variation of the embodiment of the dialog supporting apparatus of the present invention.

Note that it is possible to implement an utterance output unit 502a and an utterance output unit 502b so that they use the utterance processing unit of the other party's dialog supporting apparatus as shown in FIG. 45 so as to output a character string and speech corresponding to an utterance which has been processed. In this case, a dialog participant can view and listen to the other party's utterance on and from his or her own dialog supporting apparatus, and thus wrong listening occurs less. This makes it possible to advance a dialog more smoothly.

Figure 46A:
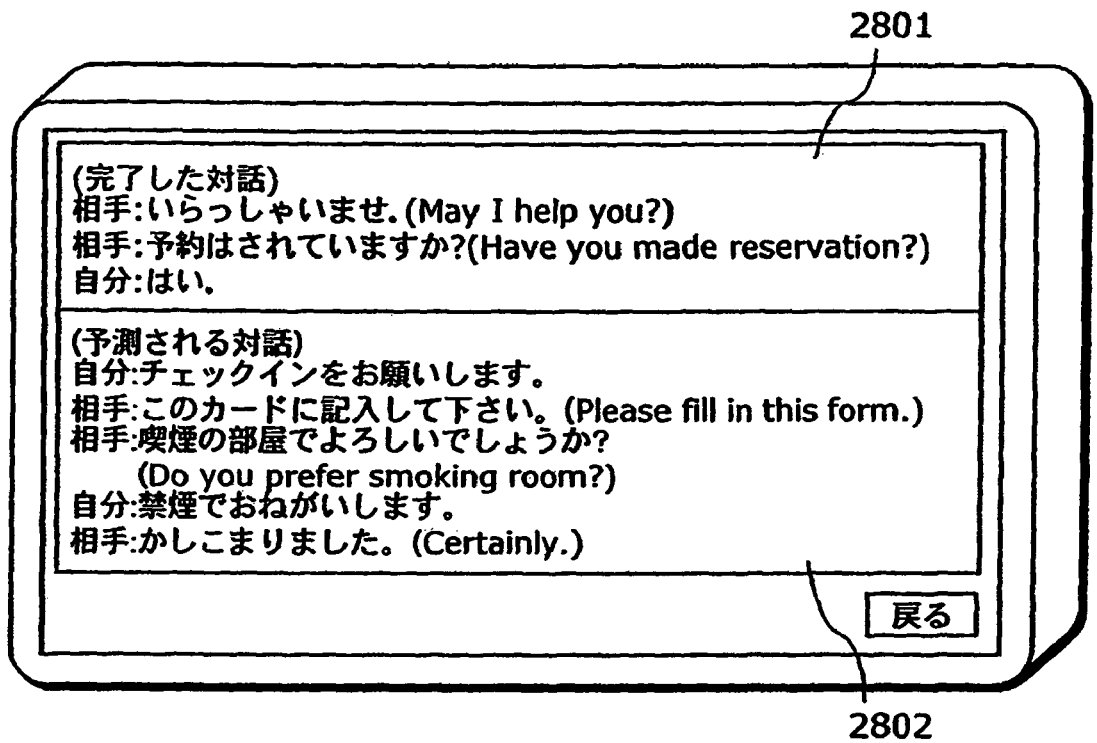
FIGS. 46A and 46B are each a display example of the dialog supporting apparatus of the present invention.
Figure 46B:
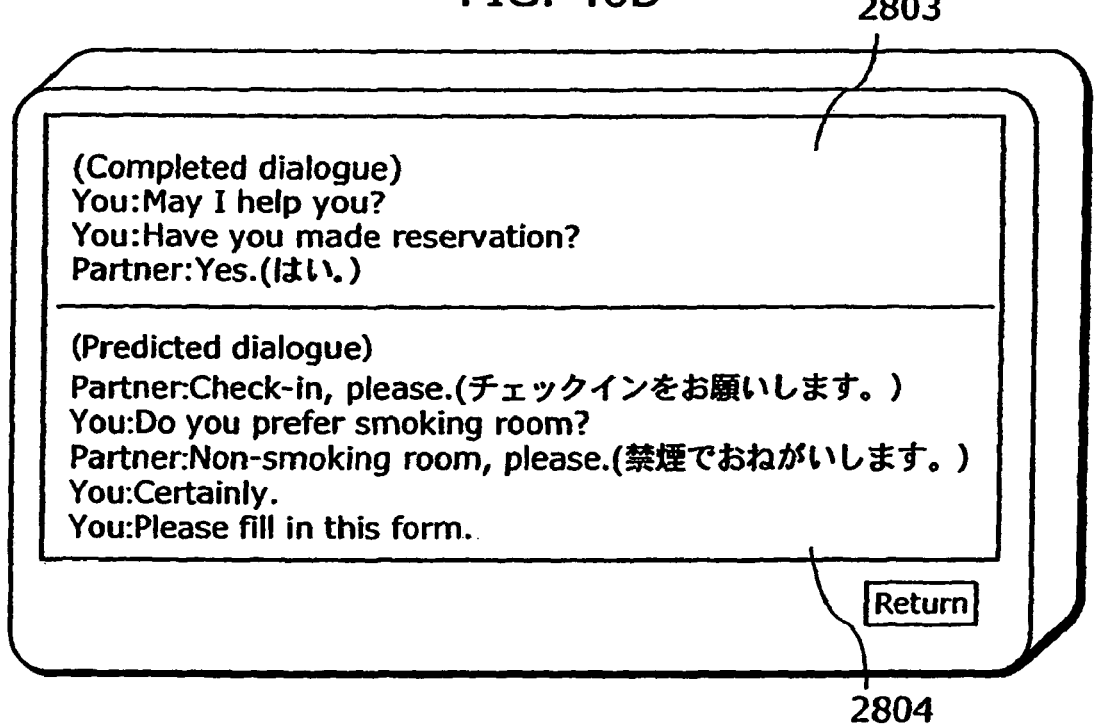

In addition, a button 1107 and a button 1108 shown in FIG. 12 or FIG. 35 are intended for enabling the respective dialog participants 1 and 2 to view prediction development of the dialog. More specifically, when these buttons are pressed, the utterance prediction unit 105a and the utterance prediction unit 105b display all the utterances made so far and the contents of the current prediction stacks. Note that each utterance is converted into the other party's language so as to be displayed. In addition, as for the prediction development of the dialog, the contents of the other party's prediction stack are displayed. FIG. 46 shows a diagram showing an example (in the case of Japanese and English) of the prediction development of the dialog. The utterances made so far are E1, E3, and 34, and the current prediction stacks are J: J2, (E5, J6, E7)

and E8, and E: J2, E8, (E5, J6, E7). For the dialog participant 1, E1, E3 and 34 are displayed on the display area 2801 as the utterances made so far. Additionally, J2, E8, E5, J6 and E7 are displayed on the display area 2802 as future prediction development. On the other hand, for the dialog participant 2, E1, E3 and 34 are displayed on the display area 2803 as the utterances made so far. Additionally, J2, E5, E6, E7 and E8 are displayed on the display area 2804 as future prediction development.

Figure 47A:
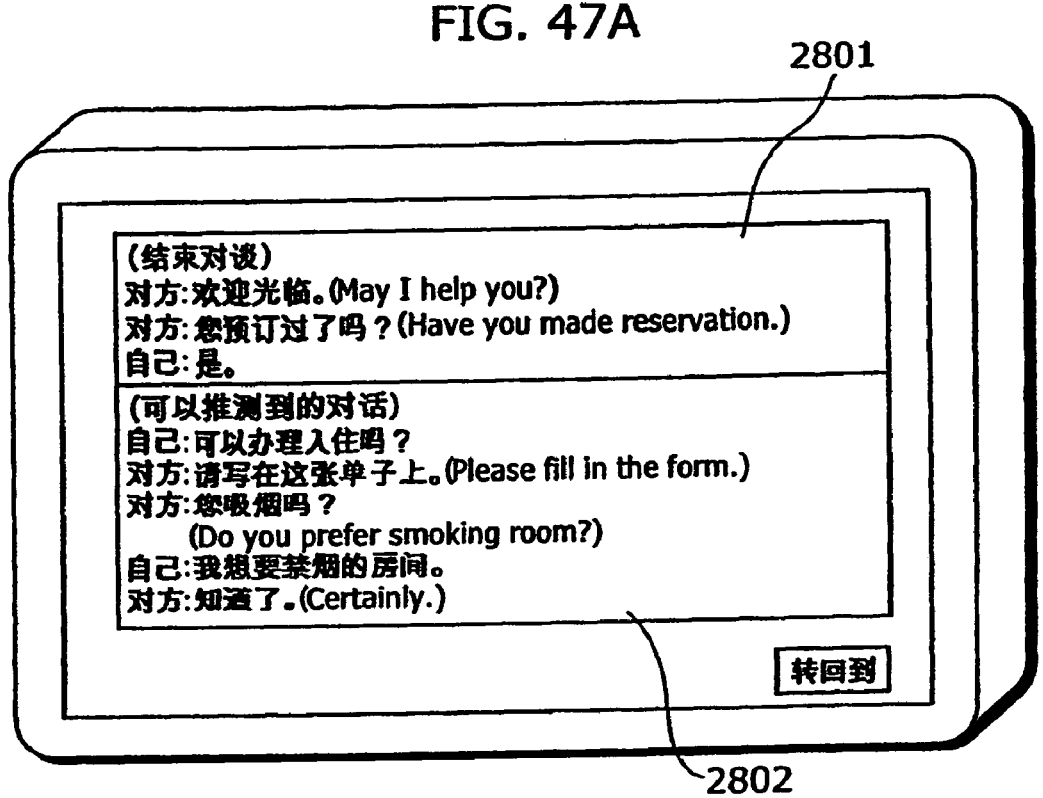
FIGS. 47A and 47B are each a display example of the dialog supporting apparatus of the present invention.
Figure 47B:
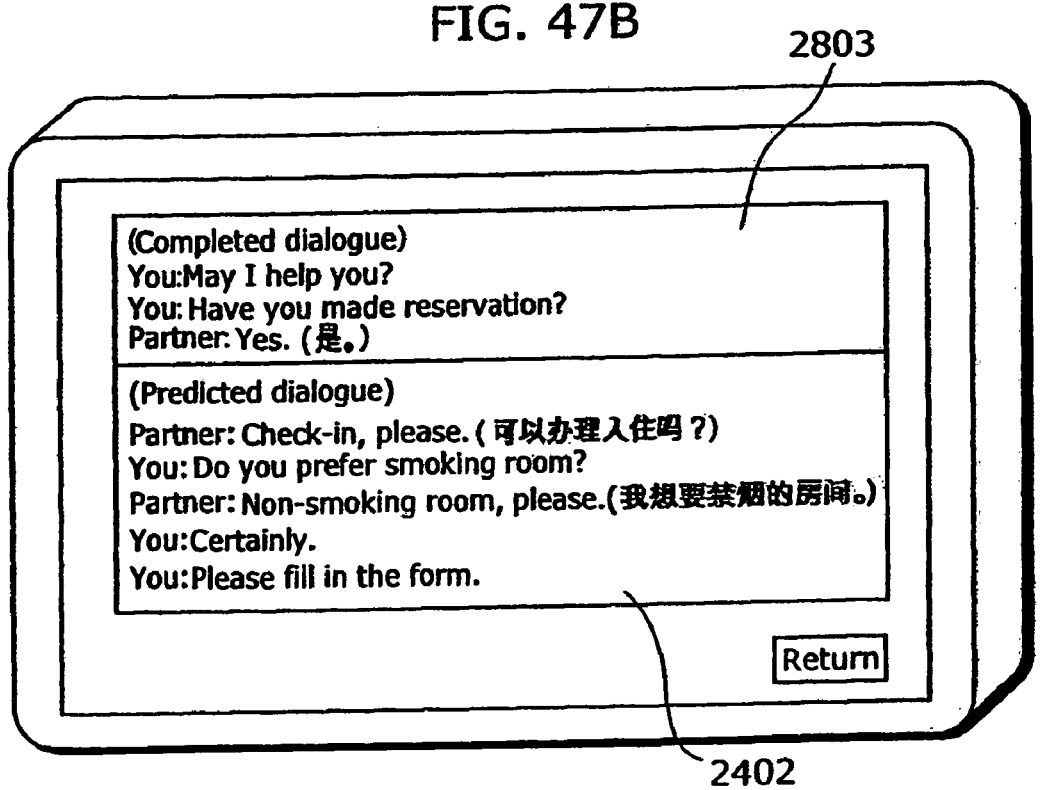

In addition, FIG. 47 is a diagram showing an example (in the case of Chinese and English) of prediction development of the dialog. The utterances made so far are E1, E3 and C4, and the current prediction stacks are C: C2, (E5, C6, E7) and E8, and E: C2, E8, (E5, C6, E7). For the dialog participant 1, E1, E3 and C4 are displayed on the display area 2801 as the utterances made so far. Additionally, C2, E8, E5, C6 and E7 are displayed on the display area 2802 as future prediction development. On the other hand, for the dialog participant 2, E1, E3 and C4 are displayed on the display area 2803 as the utterances made so far. Additionally, C2, E5, E6, E7 and E8 are displayed on the display area 2804 as future prediction development. The presentation of prediction development like this enables the dialog participants to know the other party's utterances and the development pattern of the dialog and to organize their thoughts during the dialog. Therefore, the dialog may advance smoothly.

An example of Japanese and English and an example of Chinese and English have been taken in the embodiment. However, the other languages such as French are also available. It should be noted that the present invention does not depend on language.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

The dialog supporting apparatus of the present invention has a function for inputting utterances of dialog participants smoothly. It is useful as translation application software or the like of mobile phones and mobile terminals. In addition, it is applicable in the use of public town terminals and guidance terminals and the like. Further, it is applicable in the use of, for example, a chat system where typical sentences are used.

What is claimed is:

1. A dialog supporting apparatus which supports a present dialog between dialog participants, said dialog supporting apparatus comprising:
   a dialog history database for storing a previous dialog of a first dialog participant, the previous dialog of the first dialog participant including utterances;
   an utterance prediction unit for (a) generating first utterance prediction information based on the utterances of the previous dialog stored in said dialog history database, (b) obtaining, from another dialog supporting apparatus, second utterance prediction information including utterances of a previous dialog of a second dialog participant, and (c) predicting a next utterance in the present dialog of the first dialog participant using said dialog supporting apparatus, such that the next utterance is predicted based on an utterance that (i) matches an opening utterance included in the second utterance prediction information, and (ii) is a replacement for an opening utterance included in the first utterance prediction information, the utterance that is the replacement for the opening utterance included in the first utterance prediction information being used for the prediction of the next utterance when a first utterance included in the first prediction information and a second utterance included in the second prediction information do not match by comparison; and
   a display unit for displaying the next utterance predicted by said utterance prediction unit.

2. The dialog supporting apparatus according to claim 1, wherein said utterance prediction unit transmits the generated first utterance prediction information to the other dialog supporting apparatus.

3. The dialog supporting apparatus according to claim 1, wherein said dialog history database stores a plurality of previous dialogs, each previous dialog of the plurality of previous dialogs including utterances, and
   wherein said utterance prediction unit extracts, from the plurality of previous dialogs, a previous dialog most similar to the present dialog, such that the generated first utterance prediction information is based on the utterances of the extracted previous dialog.

4. The dialog supporting apparatus according to claim 3, wherein said utterance prediction unit generates a first prediction stack based on an assembly of successive utterances included in the first utterance prediction information and based on an assembly of successive utterances included in the second utterance prediction information obtained from the other dialog supporting apparatus.

5. The dialog supporting apparatus according to claim 4, wherein said utterance prediction unit predicts the next utterance of the first dialog participant as an opening utterance of the first prediction stack.

6. The dialog supporting apparatus according to claim 4, wherein, when an utterance of the first dialog participant or an utterance of the second dialog participant appears in an assembly of utterances included in the first prediction stack, said utterance prediction unit moves the assembly including the utterance of the first dialog participant or the utterance of the second dialog participant to an opening part of the first prediction stack and deletes, from the first prediction stack, any utterances previously located ahead of the assembly moved to the opening part of the first prediction stack.

7. The dialog supporting apparatus according to claim 3, wherein said utterance prediction unit adjusts a number of utterances included in the first utterance information and a number of utterances included in the second utterance information to a same number using dynamic programming.

8. The dialog supporting apparatus according to claim 1, further comprising:
   an utterance receiving unit for receiving an utterance of the first dialog participant;
   an utterance processing unit for transforming the utterance received by said utterance receiving unit into another utterance form; and
   an utterance output unit for outputting the utterance of the other utterance form transformed by said utterance processing unit.

9. The dialog supporting apparatus according to claim 8, wherein said utterance receiving unit performs speech recognition of speech inputted thereto, after narrowing down a speech recognition dictionary to one of predicted utterances predicted by said utterance prediction unit, sentences which are similar to the predicted utterances, words included in the predicted utterances, and words associated with the predicted utterances, and receives a result of the speech recognition as the utterance of the first dialog participant.

10. The dialog supporting apparatus according to claim 8, wherein said utterance receiving unit receives the predicted next utterance as the utterance of the first dialog participant, when the predicted next utterance is selected by the first dialog participant.

11. The dialog supporting apparatus according to claim 8, wherein said utterance prediction unit predicts a development of the utterances made by the first and second dialog participants, based on the first utterance prediction information and the second utterance prediction information, and displays the predicted development on said display unit.

12. The dialog supporting apparatus according to claim 11, wherein said utterance prediction unit transmits the predicted development of the utterances to the other dialog supporting apparatus.

13. The dialog supporting apparatus according to claim 1, wherein said dialog supporting apparatus further comprises a history registration unit for registering the present dialog between the first and second dialog participants in said dialog history database.

14. A dialog supporting system for supporting a present dialog between dialog participants, said dialog supporting system comprising:
a first dialog supporting apparatus; and
a second dialog supporting apparatus,
wherein said first dialog supporting apparatus includes:
a first dialog history database for storing a previous dialog of a first dialog participant, the previous dialog of the first dialog participant including utterances;
a first utterance prediction unit for (a) generating first utterance prediction information based on the utterances of the previous dialog stored in said first dialog history database, (b) obtaining, from said second dialog supporting apparatus, second utterance prediction information including utterances included in a previous dialog of a second dialog participant, and (c) predicting a next utterance in the present dialog of the first dialog participant using said first dialog supporting apparatus, such that the next utterance predicted by said first utterance prediction unit is predicted based on an utterance that (i) matches an opening utterance included in the second utterance prediction information, and (ii) is a replacement for an opening utterance included in the first utterance prediction information, the utterance that is the replacement for the opening utterance included in the first utterance prediction information being used for the prediction of the next utterance when a first utterance included in the first prediction information and a second utterance included in the second prediction information do not match by comparison; and
a first display unit for displaying the next utterance predicted by said first utterance prediction unit, and
wherein said second dialog supporting apparatus includes:
a second dialog history database for storing the previous dialog of a second dialog participant;
a second utterance prediction unit for (a) generating the second utterance prediction information based on the utterances of the previous dialog stored in said second dialog history database, (b) obtaining, from said first dialog supporting apparatus, the first utterance prediction information including the utterances included in the previous dialog of the first dialog participant, and (c) predicting a next utterance in the present dialog of the second dialog participant using said second dialog supporting apparatus, such that the next utterance predicted by said second utterance prediction unit is predicted based on an utterance that (i) matches the opening utterance included in the first utterance prediction information, and (ii) is the replacement for the opening utterance included in the second utterance prediction information, the utterance that is the replacement for the opening utterance included in the second utterance prediction information being used for the prediction of the next utterance when the second utterance included in the second prediction information and the first utterance included in the first prediction information do not match by comparison; and
a second display unit for displaying the next utterance predicted by said second utterance prediction unit.

15. A dialog supporting method, performed by a dialog supporting apparatus, for supporting a present dialog between dialog participants, said dialog supporting method comprising:
generating first utterance prediction information based on utterances included in a previous dialog of a first dialog participant;
obtaining, from another dialog supporting apparatus, second utterance prediction information including utterances included in a previous dialog of a second dialog participant;
predicting a next utterance in the present dialog of the first dialog participant using the dialog supporting apparatus, the next utterance being predicted based on an utterance that (i) matches an opening utterance included in the second utterance prediction information, and (ii) is a replacement for an opening utterance included in the first utterance prediction information, the utterance that is the replacement for the opening utterance included in the first utterance prediction information being used for the prediction of the next utterance when a first utterance included in the first prediction information and a second utterance included in the second prediction information do not match by comparison; and
displaying the predicted next utterance.

16. A non-transitory computer-readable recording medium storing a program thereon, the program for supporting a present dialog between dialog participants, said program causing a computer, as a dialog supporting apparatus, to execute a dialog supporting method comprising:
generating first utterance prediction information based on utterances included in a previous dialog of a first dialog participant;
obtaining, from another dialog supporting apparatus, second utterance prediction information including utterances included in a previous dialog of a second dialog participant;
predicting a next utterance in the present dialog of the first dialog participant using the dialog supporting apparatus, the next utterance being predicted based on an utterance that (i) matches an opening utterance included in the second utterance prediction information, and (ii) is a replacement for an opening utterance included in the first utterance prediction information, the utterance that is the replacement for the opening utterance included in the first utterance prediction information being used for the prediction of the next utterance when a first utterance included in the first prediction information and a second utterance included in the second prediction information do not match by comparison; and
displaying the predicted next utterance.

* * * * *